US011843781B2

(12) United States Patent
Huo et al.

(10) Patent No.: US 11,843,781 B2
(45) Date of Patent: Dec. 12, 2023

(54) ENCODING METHOD, DECODING METHOD, AND DECODER

(71) Applicant: GUANGDONG OPPO MOBILE TELECOMMUNICATIONS CORP., LTD., Guangdong (CN)

(72) Inventors: Junyan Huo, Dongguan (CN); Shuai Wan, Dongguan (CN); Yanzhuo Ma, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/858,161

(22) Filed: Jul. 6, 2022

(65) Prior Publication Data
US 2022/0360785 A1     Nov. 10, 2022

Related U.S. Application Data

(63) Continuation of application No. PCT/CN2020/141080, filed on Dec. 29, 2020.
(Continued)

(51) Int. Cl.
*H04N 19/132*        (2014.01)
*H04N 19/105*        (2014.01)
(Continued)

(52) U.S. Cl.
CPC ......... *H04N 19/132* (2014.11); *H04N 19/105* (2014.11); *H04N 19/159* (2014.11); *H04N 19/176* (2014.11); *H04N 19/186* (2014.11)

(58) Field of Classification Search
CPC .. H04N 19/105; H04N 19/135; H04N 19/159; H04N 19/176; H04N 19/186
See application file for complete search history.

(56) References Cited

U.S. PATENT DOCUMENTS

| 2013/0003856 A1* | 1/2013 | Saxena | H04N 19/12 |
| | | | 375/240.18 |
| 2019/0149822 A1* | 5/2019 | Kim | H04N 19/176 |
| | | | 375/240.02 |

(Continued)

FOREIGN PATENT DOCUMENTS

| CN | 102695061 B | 1/2015 |
| CN | 106254883 A | 12/2016 |

(Continued)

OTHER PUBLICATIONS

Janle Chen; Yan Ye; Suent Hwan Kimm; Test Model 5 of Versatile Video Coding (VTM-5); Joint VIdeo Experts Team (JVET); Mar. 27, 2019 (Year: 2019).*

(Continued)

*Primary Examiner* — Jeremiah C Hallenbeck-Huber
(74) *Attorney, Agent, or Firm* — PERKINS COIE LLP

(57) ABSTRACT

An encoding method, a decoding method, and a decoder are provided. The method includes the following. A prediction parameter of a current block is determined, where the prediction parameter includes a prediction mode parameter. Neighbouring sample values of the current block are obtained and matrix-based intra prediction (MIP) input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter. The intra prediction value of the chroma component of the current block is determined by filtering the MIP prediction value.

17 Claims, 10 Drawing Sheets

Related U.S. Application Data

(60) Provisional application No. 62/958,582, filed on Jan. 8, 2020.

(51) Int. Cl.
  *H04N 19/159* (2014.01)
  *H04N 19/176* (2014.01)
  *H04N 19/186* (2014.01)

(56) References Cited

U.S. PATENT DOCUMENTS

| | | | |
|---|---|---|---|
| 2021/0281838 A1* | 9/2021 | Lee | H04N 19/11 |
| 2022/0038691 A1* | 2/2022 | Li | H04N 19/159 |

FOREIGN PATENT DOCUMENTS

| | | | |
|---|---|---|---|
| CN | 110519591 A | 11/2019 | |
| CN | 110546952 A | 12/2019 | |
| WO | 2019172676 A1 | 9/2019 | |

OTHER PUBLICATIONS

Janle Chen; Yan Ye; Suent Hwan Kimm; Test Model 6 of Versatile Video Coding (VTM-6); Joint VIdeo Experts Team (JVET); Jul. 12, 2019 (Year: 2019).*

Janle Chen; Yan Ye; Suent Hwan Kimm; Test Model 7 of Versatile Video Coding (VTM-7); Joint VIdeo Experts Team (JVET); Oct. 11, 2019 (Year: 2019).*

Aklouf, Mourad et al. "Low Complexity Versatile Video Coding (VVC) for Low Bitrate Applications" 2019 8th European Workshop on Visual Information Processing (EUVIP), dated Oct. 31, 2019.

Ramasubramonian, Adarsh K. et al. "Non-CE3 : On signalling of MIP parameters" Joint Video Experts Team (JVET) of ITU-T SG 16 WP 3 and ISO/IEC JTC 1/SC 29/WG 11, JVET-O0755-v1, dated Dec. 7, 2019.

WIPO, International Search Report and Written Opinion for International Application No. PCT/CN2020/141080, dated Mar. 25, 2021.

* cited by examiner

ENCODING METHOD, DECODING METHOD, AND DECODER

CROSS-REFERENCE TO RELATED APPLICATION(S)

This application is a continuation of International Application No. PCT/CN2020/141080, filed Dec. 29, 2020, which claims priority to U.S. Provisional Application No. 62/958,582, filed Jan. 8, 2020, the entire disclosures of which are hereby incorporated by reference.

TECHNICAL FIELD

This disclosure relates to the technical field of video coding, and particularly to an encoding method, a decoding method, and a decoder.

BACKGROUND

As increasing requirements of people on video display quality, new video application forms such as high-definition and ultra-high-definition video emerge. H.265/high efficiency video coding (HEVC) has been unable to meet needs of rapid developing video applications. Joint video exploration team (JVET) proposes the next-generation video coding standard H.266/versatile video coding (VVC).

In H.266/VVC, matrix-based intra prediction (MIP) is an intra prediction mode, for deriving an intra prediction block of a current block, and then a low-frequency non-separable transform (LFNST) technology is used to determine a prediction residual of the current block. However, when the LFNST technology is applied to MIP mode prediction, it has an adverse impact on coding efficiency of VVC.

SUMMARY

In a first aspect, embodiments of the present application provide an encoding method. The method is for an encoder and includes the following.

A prediction parameter of a current block is determined, where the prediction parameter includes a prediction mode parameter. Neighbouring sample values of the current block are obtained and matrix-based intra prediction (MIP) input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. A prediction residual value of the chroma component of the current block is determined according to the intra prediction value of the chroma component of the current block. A low-frequency non-separable transform (LFNST) parameter is determined by performing an LFNST on the prediction residual value. The LFNST parameter is encoded and the encoded LTNST parameter is signalled into a bitstream.

In a second aspect, embodiments of the present application provide a decoding method. The method is for a decoder and includes the following.

A bitstream is parsed to obtain a prediction parameter and an LFNST parameter of a current block, where the prediction parameter includes a prediction mode parameter. Neighbouring sample values of the current block are obtained and MIP input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. Reconstructed transform coefficients of the current block are determined and second transform coefficients are determined by performing an LFNST on at least partial reconstructed transform coefficients of the reconstructed transform coefficients, when the LFNST parameter indicates that the LFNST is to be performed on the current block. A reconstructed residual value of the chroma component of the current block is obtained by performing a first transform on the second transform coefficients. A reconstructed value of the chroma component of the current block is determined according to the intra prediction value of the chroma component of the current block and the reconstructed residual value.

In a third aspect, embodiments of the present application provide a decoder. The decoder includes at least one processor and a memory. The memory is coupled to the at least one processor and stores at least one computer executable instruction thereon which, when executed by the at least one processor, causes the at least one processor to execute the method of the second aspect.

DETAILED DESCRIPTION

Figure 1:
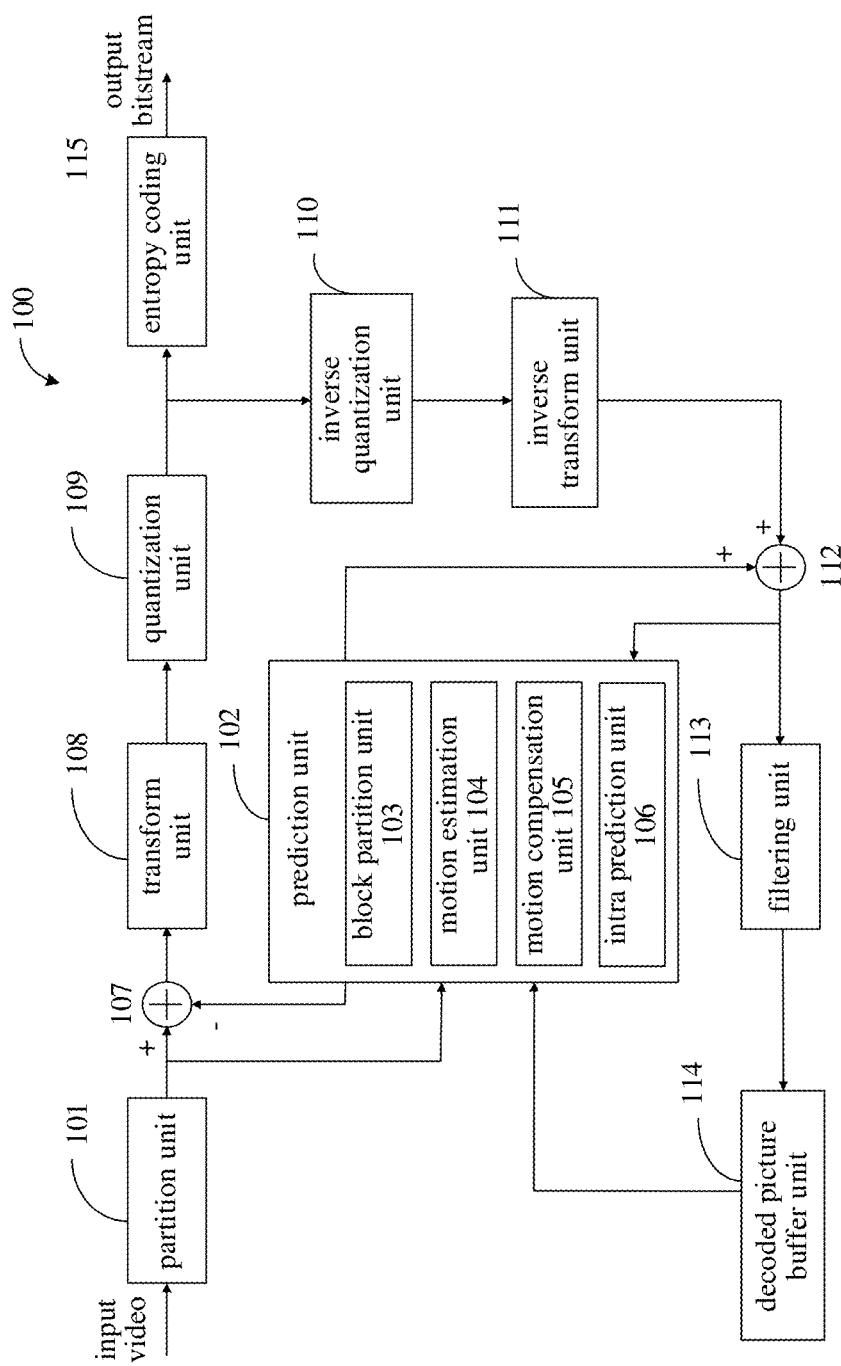
FIG. 1 is a schematic diagram of a structure of an encoder provided in embodiments of the present application.

In order to have a more detailed understanding of features and technical contents of embodiments of the present application, the implementation of the embodiments of the present application will be described in detail below with reference to accompanying drawings. The accompanying drawings are merely for reference and description, but are not used to limit the embodiments of the present application.

Unless otherwise defined, all technical and scientific terms used herein have the same meaning as commonly understood by one of ordinary skill in the technical field to which the present application belongs. The terms used herein are merely for describing the purpose of the implementations of the present application, but are not intended to limit the present application.

In the following description, reference is made to "some implementations", which describe a subset of all possible implementations. It can be understood, however, that "some implementations" may be the same subset or different subsets of all possible implementations, and may be combined without conflict. It should be pointed out that, the terms "first\second\third" involved in the implementations of the present application are merely used to distinguish similar objects, and do not represent a specific ordering of objects. It can be understood that, "first\second\third" can be swapped in a specific order or sequence if permitted, so that the implementations of the present application described herein can be implemented in sequences other than those illustrated or described herein.

With the development of video compression technology, a standardization project namely versatile video coding (VVC) is started by the International telecommunication union-transmission (ITU-T) and the international organization for standardization (ISO)/international electrotechnical commission (IEC) to develop a new-generation video coding standard, aiming at improving VVC performance by about 50% compared with the latest H.265/HEVC standard in encoding a high-quality video with one or more features of high resolution, high frame rate, high bit depth, high dynamic range, wide color gamut, and omnidirectional viewing angle. The joint video experts team (JVET) of ITU-T SG 16 WP 3 and ISO/IEC JTC 1/SC 29/WG 11 is in charge of this standardization project. Various intra prediction modes and inter prediction modes have been verified to achieve high compression efficiency in encoding a high-quality video, and thus adopted in a VVC working draft (WD).

Herein, a matrix-based intra prediction (MIP) mode is an intra prediction mode. In VVC, an encoder or decoder can invoke the MIP mode to derive an intra prediction block of a current block. Then, a low frequency non-separable transform (LFNST), as a secondary transform (or called a second transform), is enabled to be applied to a prediction residual of the current block.

In the related art, although the LFNST can be applied to MIP mode prediction with a fixed configuration of LFNST transform kernel candidate set and LFNST transposition indication parameter, this has an adverse impact on coding efficiency of VVC.

Based on this, an embodiment of the present application provides an encoding method, and the basic idea of the encoding method is as follows. A prediction parameter of a current block is determined, where the prediction parameter includes a prediction mode parameter. Neighbouring sample values of the current block are obtained and MIP input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. A prediction residual value of the chroma component of the current block is determined according to the intra prediction value of the chroma component of the current block. A low-frequency non-separable transform (LFNST) parameter is determined by performing an LFNST on the prediction residual value. The LFNST parameter is encoded and the encoded LTNST parameter is signalled into a bitstream. Another embodiment of the present application provides a decoding method, and the basic idea of the decoding method is as follows. A bitstream is parsed to obtain a prediction parameter and an LFNST parameter of a current block, where the prediction parameter includes a prediction mode parameter. Neighbouring sample values of the current block are obtained and MIP input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. A reconstructed transform coefficient block of the current block is determined and a second transform coefficient block is determined by performing an LFNST on at least partial reconstructed transform coefficients in the reconstructed transform coefficient block, when the LFNST parameter indicates that the LFNST is to be performed on the current block. A reconstructed residual block of the chroma component of the current block is obtained by performing a first transform on the second transform coefficient block. A reconstructed block of the chroma component of the current block is determined according to the intra prediction value of the chroma component of the current block and the reconstructed residual block. In this way, for the MIP mode, in addition to ensuring encoding and decoding performance, complexity can be reduced, a storage space required in the encoding and decoding process can be reduced, and encoding and decoding efficiency can be effectively improved. Furthermore, when the LFNST technology is applied to MIP mode prediction, due to introduction of the MIP parameter, the LFNST can be more flexible, and the encoding and decoding efficiency can be further improved.

The embodiments of the present application will be described in detail below with reference to the accompanying drawings.

Referring to FIG. 1, it illustrates an example of a block diagram of a structure of a system of an encoder provided in embodiments of the present application. The encoder 100 includes a partition unit 101, a prediction unit 102, a first adder 107, a transform unit 108, a quantization unit 109, an inverse quantization unit 110, an inverse transform unit 111, a second adder 112, a filtering unit 113, a decoded picture buffer (DPB) unit 114, and an entropy coding unit 115. Herein, the input of the encoder 100 may be a video consisting of a sequence of pictures or a still picture, and the output of the encoder 100 may be a bitstream representing a compressed version of an input video.

The partition unit 101 partitions a picture in the input video into one or more coding tree units (CTUs). The partition unit 101 partitions the picture into multiple tiles, and may further partition a tile into one or more bricks. Herein, a tile or a brick may contain one or more integral and/or partial CTUs. In addition, the partition unit 101 may form one or more slices, where a slice may contain one or more tiles in a raster order in the picture, or one or more tiles covering a rectangular region in the picture. The partition unit 101 may also form one or more sub-pictures, each of which can contain one or more slices, tiles, or bricks.

In the encoding process of the encoder 100, the partition unit 101 passes CTUs to the prediction unit 102. Generally, the prediction unit 202 can include a block partition unit 103, a motion estimation (ME) unit 104, a motion compensation (MC) unit 105, and an intra prediction unit 106. Specifically, the block partition unit 103 further partitions the input CTU into smaller coding units (CUs) using quadtree split, binary split, and ternary split iteratively. The prediction unit 102 may use the ME unit 104 and the MC unit 105 to obtain an inter prediction block of a CU. The intra prediction unit 106 may obtain an intra prediction block of a CU using various intra prediction modes, including the MIP mode. In an example, a rate distortion optimized motion estimation method may be invoked by the ME unit 104 and the MC unit 105 to obtain the inter prediction block, and a rate distortion optimized mode determination method may be invoked by the intra prediction unit 106 to obtain the intra prediction block.

The prediction unit 102 outputs the prediction block of the CU, and the first adder 107 calculates the difference between the CU in the output of the partition unit 101 and the prediction block of the CU, that is, the residual CU. The transform unit 108 reads the residual CU and performs one or more transform operations on the residual CU to obtain coefficients. The quantization unit 109 quantizes the coefficients and outputs quantized coefficients (i.e., levels). The inverse quantization unit 110 performs a scaling operation on the quantized coefficients to output reconstructed coefficients. The inverse transform unit 111 performs one or more inverse transforms corresponding to the transforms in the transform unit 108 and outputs a reconstructed residual.

The second adder 112 calculates the reconstructed CU by adding the reconstructed residual and the prediction block of the CU from the prediction unit 102. The second adder 112 also sends its output to the prediction unit 102 for use as a reference for intra prediction. After all CUs in the picture or sub-picture have been reconstructed, the filtering unit 113 performs in-loop filtering on the reconstructed picture or sub-picture. Herein, the filtering unit 113 contains one or more filters, such as a deblocking filter, a sample adaptive offset (SAO) filter, an adaptive loop filter (ALF), a luma mapping with chroma scaling (LMCS) filter, and a neural network based filter, etc. Alternatively, when the filtering unit 113 determines that the CU is not used as a reference for encoding other CUs, the filtering unit 113 performs in-loop filtering on one or more target samples in the CU.

The output of the filtering unit 113 is a decoded picture or sub-picture, which is buffered to the DPB unit 114. The DPB unit 114 outputs decoded pictures or sub-pictures according to timing and control information. Herein, the pictures stored in the DPB unit 114 may also be used as a reference for performing inter prediction or intra prediction by the prediction unit 102. Finally, the entropy coding unit 115 converts the parameters (such as control parameters and supplemental information, etc.) from the encoder 100 that are necessary for deriving the decoded picture into binary representations, and writes such binary representations into the bitstream according to the syntax structure of each data unit, that is, the encoder 100 finally outputs the bitstream.

Furthermore, the encoder 100 may have a first processor and a first memory recording a computer program. When the first processor reads and runs the computer program, the encoder 100 reads the input video and generates a corresponding bitstream. In addition, the encoder 100 may also be a computing device having one or more chips. These units, implemented as integrated circuits on a chip, have similar connection and data exchange functions as the corresponding units in FIG. 1.

Figure 2:
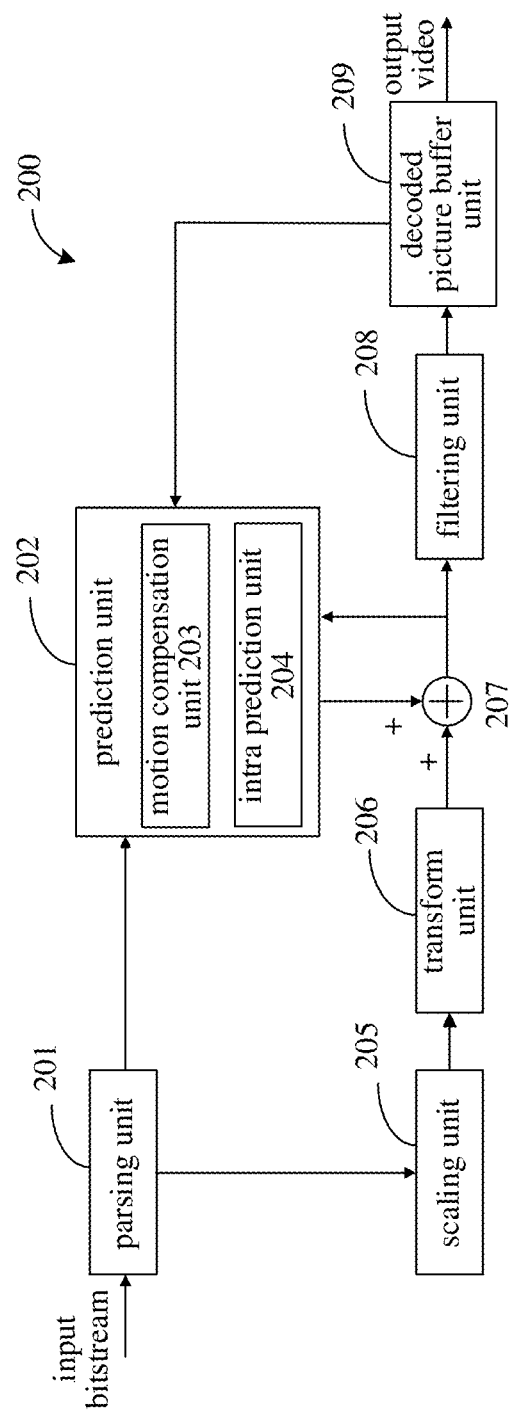
FIG. 2 is a schematic diagram of a structure of a decoder provided in embodiments of the present application.

Referring to FIG. 2, it illustrates an example of a block diagram of a structure of a system of a decoder provided in embodiments of the present application. As illustrated in FIG. 2, the decoder 200 may include: a parsing unit 201, a prediction unit 202, a scaling unit 205, a transform unit 206, an adder 207, a filtering unit 208, and a decoded picture buffer unit 209. Herein, the input of the decoder 200 is a bitstream for representing a compressed version of a video or a still picture, and the output of the decoder 200 may be a decoded video consisting of a sequence of pictures or a decoded still picture.

The input bitstream of the decoder 200 may be the bitstream generated by the encoder 100. The parsing unit 201 parses the input bitstream and obtains values of syntax elements from the input bitstream. The parsing unit 201 converts the binary representations of the syntax elements into numerical values and sends the numerical values to the units in decoder 200 to obtain one or more decoded pictures. The parsing unit 201 may also parse one or more syntax elements from the input bitstream to display decoded pictures.

In the decoding process of the decoder 200, the parsing unit 201 sends the values of the syntax elements, as well as one or more variables set or determined according to the values of the syntax elements, for obtaining one or more decoded pictures to the units in the decoder 200.

The prediction unit 202 determines a prediction block of a current decoding block (e.g., CU). Herein, the prediction unit 202 may include a motion compensation unit 203 and an intra prediction unit 204. Specifically, when it is indicated that the inter decoding mode is for decoding the current decoding block, the prediction unit 202 passes relevant parameters from the parsing unit 201 to the motion compensation unit 203 to obtain the inter prediction block; when it is indicated that the intra prediction mode (including the MIP mode indicated based on the MIP mode index value) is for decoding the current decoding block, the prediction unit 202 transmits the relevant parameters from the parsing unit 201 to the intra prediction unit 204 to obtain the intra prediction block.

The scaling unit 205 has the same function as the inverse quantization unit 110 in the encoder 100. The scaling unit 205 performs scaling operations on the quantized coefficients (i.e., levels) from the parsing unit 201 to obtain reconstructed coefficients.

The transform unit 206 has the same function as the inverse transform unit 111 in the encoder 100. The transform unit 206 performs one or more transform operations (i.e., inverse operations of the one or more transform operations performed by the inverse transform unit 111 in encoder 100) to obtain a reconstructed residual.

The adder 207 performs an addition operation on its inputs (the prediction block from the prediction unit 202 and the reconstructed residual from the transform unit 206) to obtain the reconstructed block of the current decoding block. The reconstructed block is also sent to the prediction unit 202 to be used as a reference for other blocks encoded in the intra prediction mode.

After all CUs in the picture or sub-picture have been reconstructed, the filtering unit 208 performs in-loop filtering on the reconstructed picture or sub-picture. The filtering unit 208 contains one or more filters, such as a deblocking filter, a sample adaptive compensation filter, an adaptive loop filter, a luma mapping with chroma scaling filter, a neural network based filter, and the like. Alternatively, when the filtering unit 208 determines that the reconstructed block is not to be used as a reference for decoding other blocks, the filtering unit 208 performs in-loop filtering on one or more target samples in the reconstructed block. Herein, the output of the filtering unit 208 is a decoded picture or sub-picture, and the decoded picture or sub-picture is buffered in the DPB unit 209. The DPB unit 209 outputs the decoded picture or sub-picture according to timing and control information. The pictures stored in the DPB unit 209 may also be used as a reference for performing inter prediction or intra prediction by the prediction unit 202.

Furthermore, the decoder 200 may have a second processor and a second memory recording a computer program. When the first processor reads and runs the computer program, the decoder 200 reads the input bitstream and generates a corresponding decoded video. Additionally, the decoder 200 may also be a computing device having one or more chips. These units, implemented as integrated circuits on a chip, have similar connection and data exchange functions as the corresponding units in FIG. 2.

It should be noted that, an encoding method provided in embodiments of the present application is mainly applied to the intra prediction unit 106 and the transform unit 108 of the encoder 100, and a decoding method provided in embodiments of the present application is mainly applied to the intra prediction unit 204 and the transform unit 206 of the decoder 200. That is, the embodiments of the present application may be applied to the encoder, or the decoder, or even both the encoder and the decoder, which is not limited herein.

It should also be noted that, in the case that the embodiments of the present application are applied to the encoder 100, the "current block" specifically refers to a picture block (may also be referred to as a "coding block") currently to be encoded in intra prediction; in the case that the embodiments of the present application are applied to the decoder 200, the "current block" specifically refers to a picture block (may also be referred to as a "decoding block") currently to be decoded in intra prediction.

In a case that the encoder 100 can achieve a better prediction effect by using the encoding method provided in the embodiments of the present application, to improve the encoding performance, the decoder 200 can accordingly improve video decoding quality by using the decoding method provided in the embodiments of the present application, thereby improving the decoding performance.

Figure 3:
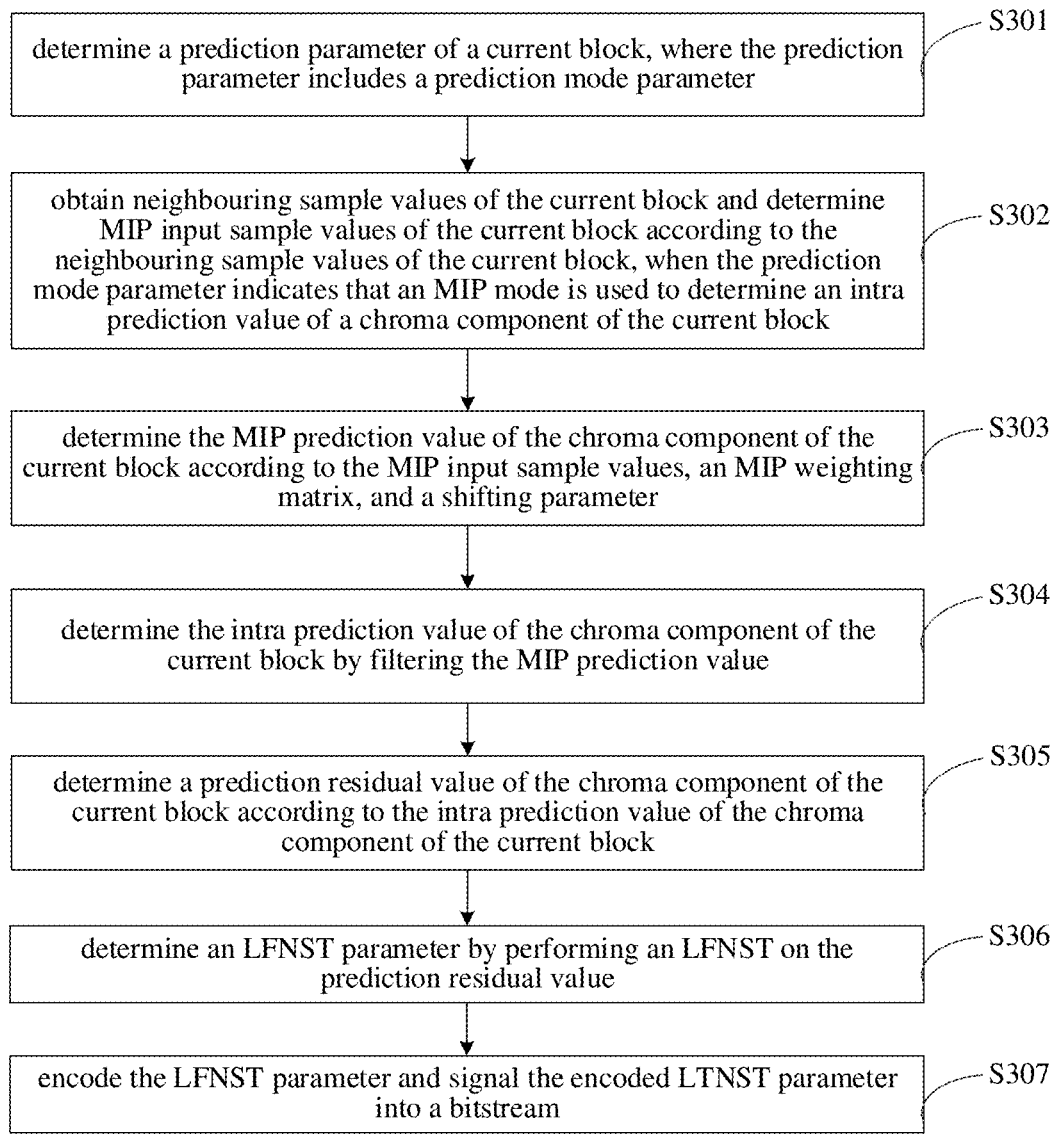
FIG. 3 is a schematic flowchart of an encoding method provided in embodiments of the present application.

In an embodiment of the present application, referring to FIG. 3, it illustrates a schematic flowchart of an encoding method provided in embodiments of the present application. As illustrated in FIG. 3, the method includes the following.

S301, a prediction parameter of a current block is determined, where the prediction parameter includes a prediction mode parameter.

It should be noted that, a picture to be encoded can be partitioned into multiple picture blocks, and each picture block to be encoded can be called a coding block. Herein, each coding block may include a first colour component, a second colour component, and a third colour component. The current block is a coding block in the picture of the video for which prediction of the first colour component, the second colour component, or the third colour component is currently to be performed.

Assuming that prediction of the first colour component is performed for the current block, and the first colour component is a luma component, that is, the colour component to be predicted is a luma component, the current block may also be called a luma block, obtaining a prediction value of the luma component of the current block. Alternatively, assuming that prediction of the second colour component is performed for the current block, and the second colour component is a chroma component, that is, the colour component to be predicted is a chroma component, the current block may also be called a chroma block, obtaining a prediction value of the chroma component of the current block.

It should also be noted that, the prediction parameter may include the prediction mode parameter, where the prediction mode parameter is used to indicate the prediction mode adopted by the current block and different prediction modes correspond to different prediction mode parameters. Herein, for determination of the prediction mode parameter, a simple decision-making strategy may be adopted, for example, the determination is performed according to the magnitude of the distortion value. A complex decision-making strategy may also be adopted, for example, the determination is made according to the result of rate distortion optimization (RDO), which is not limited in any embodiment of the present application. Generally, the RDO method can be adopted to determine the prediction mode parameter of the current block, that is, to determine the prediction parameter of the current block.

Specifically, in some embodiments, the prediction parameter of the current block may be determined as follows.

Multiple prediction modes are used to encode the current block in advance to obtain rate distortion cost values corresponding to the multiple prediction modes.

An optimal rate distortion cost value is selected from the obtained multiple rate distortion cost values, and a prediction parameter in a prediction mode corresponding to the optimal rate distortion cost value is determined as the prediction parameter of the current block.

That is, at the encoder side, for the current block, multiple prediction modes may be used to encode the current block in advance respectively. Herein, the multiple prediction modes generally include an inter prediction mode, a conventional intra prediction mode, and a non-traditional intra prediction mode. The traditional intra prediction mode may include a direct current (DC) mode, a PLANAR mode, an angular intra prediction mode, and the like. The non-traditional intra prediction mode may include an MIP mode, a cross-component linear model prediction (CCLM) mode, an intra block copy (IBC) mode, and a PLT (Palette) mode. The inter prediction mode may include a traditional inter prediction mode and an inter geometric partitioning mode (GPM) for inter blocks, and the like.

In this way, after the current block is encoded with multiple prediction modes in advance, the rate distortion cost values corresponding to the multiple prediction modes can be obtained. Then, the optimal rate distortion cost value is selected from the obtained multiple rate distortion cost values (generally, the minimum rate distortion cost value is the optimal rate distortion cost value), and the prediction parameter in the prediction mode corresponding to the optimal rate distortion cost value is determined as the prediction parameter of the current block.

In addition, the current block may also be encoded by using multiple prediction modes in advance, to obtain distortion values corresponding to the multiple prediction modes. Then, the optimal distortion value is selected from the obtained multiple distortion values, and a prediction parameter in a prediction mode corresponding to the optimal distortion value is determined as the prediction parameter of the current block. In this way, the encoder finally uses the prediction mode indicated by the prediction mode parameter in the determined prediction parameter to perform predictive coding on the current block, which can obtain a smaller prediction residual and improve the encoding efficiency.

S302, neighbouring sample values of the current block are obtained and MIP input sample values of the current block are determined according to the neighbouring sample values of the current block, when the prediction mode parameter indicates that an MIP mode is used to determine an intra prediction value of a chroma component of the current block.

It should be noted that, for the current block, in embodiments of the present application, the MIP mode is used to perform intra prediction on the chroma component of the current block. In this process, the neighbouring sample values of the current block are acquired and then the MIP input sample values of the current block are determined according to the neighbouring sample values of the current block.

It is understood that, for the MIP mode, first, MIP core parameters need to be configured. Herein, the MIP core parameters may include the type of the current block (represented by mipSizeId), the number of reference samples per edge (represented by boundySize), the number of MIP input samples (represented by inSize), and the size of the MIP prediction block (arranged as predSize×predSize) that is output from matrix multiplication. In the MIP mode, the current block can be categorized into three types according to the width and height of the current block, where mipSizeId can be equal to 0, 1, or 2. mipSizeId herein represents the type of the current block, that is, "a block size index value of the current block" in embodiments of the present application. For different mipSizeId, the number of reference samples (the number of reference samples required on each edge is boundySize), the number of MIP input samples (inSize), and the size of the MIP prediction block (arranged as predSize×predSize) output from matrix multiplication are also different.

It is also to be noted that, in addition to the prediction mode parameter, the prediction parameter can further include size parameters of the current block. The size parameters of the current block can include the width (denoted by nTbW) and the height (denoted by nTbH) of the current block. Furthermore, according to the size parameters of the current block, the block size index value (i.e., mipSizeId) can be determined.

In a possible implementation, the block size index value of the current block can be determined according to the size parameters of the current block as follows.

The block size index value of the current block is set to be 0 if both the width and the height of the current block are equal to 4.

Otherwise, the block size index value of the current block is set to be 1 if both the width and the height of the current block are equal to 8 or either the width or the height of the current block is equal to 4.

Otherwise, the block size index value of the current block is set to be 2 if the current block of another size.

In another possible implementation, the block size index value of the current block can be determined according to the size parameters of the current block as follows.

The block size index value of the current block is set to be 0 if both the width and the height of the current block are equal to 4.

Otherwise, the block size index value of the current block is set to be 1 if one of the width and the height of the current block is equal to 4.

Otherwise, the block size index value of the current block is set to be 2 if the current block is of another size.

In this way, according to the block size index value of the current block, the number of neighbouring boundary reference samples (variable boundarySize) and the size of the MIP prediction block (predSize×predSize with predSize as variable) can be determined through a look-up table (LUT) illustrated in Table 1, and the number of MIP input sample values (represented by inSize) for the MIP matrix multiplication operation is calculated. The calculation formula is as follows.

$$\text{inSize}=(2\times\text{boundarySize})-(\text{mipSizeId}==2)?1:0 \qquad (1)$$

The operation rules of the operators in formula (1) are the same as those of the operators defined in the ITU-TH.265 standard, for example, "==" is a logical "equal to" operator.

TABLE 1

| mipSizeId | boundarySize | predSize |
|---|---|---|
| 0 | 2 | 4 |
| 1 | 4 | 4 |
| 2 | 4 | 8 |

As such, according to Table 1, when a value of mipSizeId is equal to 0, a value of boundarySize is equal to 2 and a value of predSize is equal to 4. That is, in this case, for reference samples, two samples are selected for each edge and the output of matrix multiplication is a 4×4 MIP prediction block.

When the value of mipSizeId is equal to 1, the value of boundarySize is equal to 4 and the value of predSize is equal to 4. That is, in this case, for reference samples, four samples are selected for each edge and the output of matrix multiplication is a 4×4 MIP prediction block.

When the value of mipSizeId is equal to 2, the value of boundarySize is equal to 4 and the value of predSize is equal to 8. That is, in this case, for reference samples, four samples are selected for each edge and the output of matrix multiplication is an 8×8 MIP prediction block.

Furthermore, according to the block size index value of the current block, values of all boundarySize, inSize, and predSize are determined through the look-up table illustrated in Table 2.

TABLE 2

| mipSizeId | boundarySize | inSize | predSize |
|---|---|---|---|
| 0 | 2 | 4 | 4 |
| 1 | 4 | 8 | 4 |
| 2 | 4 | 7 | 8 |

As such, according to Table 2, when the value of mipSizeId is equal to 0, the value of boundarySize is 2, the value of inSize is 4, and the value of predSize is 4. That is, in this case, for reference samples, two samples are selected for each edge, the number of input samples for matrix multiplication is 4, and the output of matrix multiplication is a 4×4 MIP prediction block.

When the value of mipSizeId is equal to 1, the value of boundarySize is 4, the value of inSize is 8, and the value of predSize is 4. That is, in this case, for reference samples, four samples are selected for each edge, the number of input samples for matrix multiplication is 8, and the output of matrix multiplication is a 4×4 MIP prediction block.

When the value of mipSizeId is equal to 2, the value of boundarySize is 4, the value of inSize is 7, and the value of predSize is 8. That is, in this case, for reference samples, four samples are selected for each edge, the number of input samples for matrix multiplication is 7, and the output of matrix multiplication is an 8×8 MIP prediction block.

Furthermore, after the MIP core parameters are configured, reference samples need to be acquired. Thereafter, according to the reference samples and the MIP core parameters, the MIP input sample values are constructed. Herein, the reference samples refer to neighbouring sample values of the current block, which include left neighbouring sample values and above neighbouring sample values of the current block. That is, according to the left neighbouring sample values and above neighbouring sample values of the current block, the MIP input sample values of the current block can be determined.

In some embodiments, the MIP input sample values of the current block can be determined according to the neighbouring sample values of the current block as follows.

A block size index value of the current block is determined according to the size parameters of the current block.

First temporal reference values are obtained by downsampling the neighbouring sample values of the current block.

When the block size index value of the current block is within a preset range, a second constant value is determined according to a bit depth of the neighbouring sample values of the current block, a value corresponding to index 0 (or index value 0) in the MIP input sample values is set to be a difference between the second constant value and a value corresponding to index 0 in the first temporal reference values, and a value corresponding to index i in the MIP input sample values is set to be a difference between a value corresponding to index i in the first temporal reference values and the value corresponding to the index 0 in the first temporal reference values, where i is an integer greater than 0.

A value corresponding to index j in the MIP input sample values is set to be a difference between a value corresponding to index (j+1) in the first temporal reference values and the value corresponding to the index 0 in the first temporal reference values, when the block size index value of the current block is beyond the preset range, where j is an integer greater than or equal to 0.

Furthermore, when the block size index value of the current block is within the preset range, the method can further include the following.

The second constant value is determined according to the bit depth of the neighbouring sample values of the current block. The value corresponding to the index 0 in the MIP input sample values is set to be a difference between the value corresponding to the index 0 in the first temporal reference values and the second constant value. The value corresponding to the index i in the MIP input sample values is set to be the difference between the value corresponding to the index i in the first temporal reference values and the value corresponding to the index 0 in the first temporal reference values, where i is an integer greater than 0.

It should be noted that, after the neighbouring sample values of the current block are filtered (e.g., downsampled), the first temporal reference values are obtained. Herein, for the first temporal reference values, specifically, after the neighbouring sample values of the current block are downsampled, the filtered neighbouring sample values can be buffered to a buffer (represented by pTemp). The value corresponding to the index 0 in the first temporal reference values refers to pTemp[0], and the value corresponding to the index i in the first temporal reference values refers to pTemp[i].

It should also be noted that, according to whether the block size index value (represented by mipSizeId) of the current block is within the preset range, it can be determined whether the values of the size parameters of the current block are within the preset range. Specifically, when mipSizeId=0 or 1, it indicates that the block size index value of the current block is within the preset range, that is, the values of the size parameters of the current block are within the preset range; when mipSizeId=2, it indicates that the block size index value of the current block is beyond the preset range, that is, the values of the size parameters of the current block are not within the preset range.

That is, the MIP input sample values are determined according to the buffer (represented by pTemp), the block size index value (represented by MipSizeId) of the current block, and the bit depth (represented by BitDepth) of the neighbouring sample values of the current block, and the number of input samples corresponding to the MIP input sample values is only related to the block size index value of the current block. Finally, a value corresponding to index x in the MIP input sample values (represented by p[x]) can be obtained.

Furthermore, in some embodiments, the second constant value is determined according to the bit depth of the neighbouring sample values of the current block as follows.

The second constant value is set to be an exponential power of 2, where the exponential is an integer and equal to the bit depth of the neighbouring sample values of the current block minus one.

Alternatively, in some embodiments, the second constant value is determined according to the bit depth of the neighbouring sample values of the current block as follows.

The second constant value is determined by binary left-shifting of "1", where the number of left shifted bits is equal to the bit depth of the neighbouring sample values of the current block minus one.

That is, after the bit depth (represented by BitDepth) of the neighbouring sample values of the current block is obtained, the second constant value may be represented as 1<<(BitDepth−1) or 2^(BitDepth−1). In this way, in the case where the values of the size parameters of the current block are within the preset range, the MIP input sample values of the current block can be determined by further considering the second constant value.

It should also be noted that, the MIP input samples are a matrix vector used for the matrix multiplication operation. The current related technical solutions are as follows. According to the buffer (represented by pTemp), the type of the current block (i.e., the block size index value of the current block, represented by mipSizeId), the bit depth of the neighbouring sample values of the current block (represented by BitDepth), and the number of MIP input samples, the value corresponding to the index x (represented by p[x]) in the MIP input sample values is finally obtained.

Specifically, construction of an x-th input sample value p[x] is as follows.

In a possible implementation, when the block size index value of the current block is within the preset range, the construction may include the following.

The difference between the second constant value and the value corresponding to the index 0 in the first temporal reference values is calculated to obtain the value corresponding to the index 0 in the first temporal reference values.

The subtraction operation is performed on the value corresponding to the index i in the first temporal reference values and the value corresponding to the index 0 in the first temporal reference values, to obtain the value corresponding to the index i in the MIP input sample values. i is a positive integer greater than 0 and less than N, and N represents the number of elements contained in the input sample matrix.

In embodiments of the present application, in the calculation of the difference, the minuend is set to be equal to the second constant value, and in the calculation of the difference, the subtrahend is set to be equal to the value corresponding to the index 0 in the first temporal reference values.

That is, if mipSizeId=0 or 1, 1<<(BitDepth−1) minus pTemp[0] is used as p[0]; if x is not equal to 0, pTemp[x] minus pTemp[0] is used as p[x]. Specifically, refer to the following.

$$\begin{cases} p[0] = (1 << (BitDepth - 1)) - pTemp[0] \\ p[x] = pTemp[x] - pTemp[0] \, for \, x = 1, ..., inSize - 1 \end{cases} \quad (2)$$

In another possible implementation, when the block size index value of the current block is within the preset range, the construction may include the following.

The difference between the value corresponding to the index 0 in the first temporal reference values and the second constant value is calculated to obtain the value corresponding to the index 0 in the MIP input sample values.

The value corresponding to index i in the first temporal reference values and the value corresponding to index 0 in the first temporal reference values are subtracted, to obtain the value corresponding to index i in the MIP input sample values. i is a positive integer greater than 0 and less than N and N represents the number of elements contained in the input sample matrix.

In embodiments of the present application, the minuend in the calculation of the difference is set equal to the value corresponding to the index 0 in the first temporal reference values, and the subtrahend in the calculation of the difference is set equal to the second constant value.

That is, when mipSizeId=0 or 1, if x is equal to 0, the value corresponding to the index 0 (denoted by p[0]) in the MIP input sample values can be obtained by subtracting second constant value (i.e., 1<<(BitDepth−1)) from the value corresponding to the index 0 (denoted by pTemp[0]) in the first temporal reference values. If x is not equal to 0, the value corresponding to the index x (denoted by p[x]) in the MIP input sample values can be obtained by subtracting the value corresponding to the index 0 (denoted by pTemp [0]) in the first temporal reference values from the value corresponding to the index x (denoted by pTemp[x]) in the first temporal reference values.

Refer to the following.

$$\begin{cases} p[0] = pTemp[0] - (1 << (BitDepth - 1)) \\ p[x] = pTemp[x] - pTemp[0] \, for \, x = 1, ..., inSize - 1 \end{cases} \quad (3)$$

In another possible implementation, when the block size index value of the current block is beyond the preset range, the construction may include the following.

The value corresponding to the index i in the MIP input sample values is obtained by subtracting the value corresponding to the index 0 in the first temporal reference values from the value corresponding to the index (i+1) in the first temporal reference values, where i is a positive integer greater than or equal to 0 and less than N, and N represents the number of elements contained in the input sample matrix.

That is, when mipSizeId=2, the value corresponding to the index 0 in the first temporal reference values, that is, pTemp[0], may be ignored. The value corresponding to the index x (represented by p[x]) in the MIP input sample values is obtained by subtracting the value corresponding to the index 0 (i.e., pTemp[0]) in the first temporal reference values from the value corresponding to the index x+1 (i.e., pTemp [x+1]) in the first temporal reference values. Herein, x is a positive integer greater than or equal to 0. Specifically, refer to the following.

$$p[x] = pTemp[x+1] - pTemp[0] \, for \, x=0, ..., inSize-1 \quad (4)$$

Herein, still taking the current block of 4×4 as an example, there are four values stored in the buffer pTemp. That is, the first temporal reference values include: the value corresponding to index 0 (that is, pTemp[0]), the value corresponding to index 1 (that is, pTemp[1]), the value corresponding to index 2 (that is, pTemp[2]), and the value corresponding to index 3 (i.e., pTemp[3]). In this case, according to formula (2) or formula (3) or formula (4), four MIP input sample values can be determined, which are represented by p[x], x=0, 1, 2, 3. Herein, the four MIP input sample values can also form a 1×4 MIP input sample matrix.

In addition, in embodiments of the present application, the value of p[x] can also be obtained in a unified calculation method, without determining the value of mipSizeId. In some embodiments, the MIP input sample values of the current block are determined according to the neighbouring sample values of the current block as follows.

First temporal reference values are obtained by down-sampling the neighbouring sample values of the current block.

A second constant value is determined according to a bit depth of the neighbouring sample values of the current block, and second temporal reference values are obtained by buffering the second constant value in a data unit subsequent to the first temporal reference values.

A value corresponding to index j in the MIP input sample values is set to be a difference between a value corresponding to index (j+1) in the second temporal reference values and a value corresponding to index 0 in the second temporal reference values, where j is an integer greater than or equal to 0.

That is, in embodiments of the present application, the second constant value (i.e., (1<<(BitDepth−1))) is appended to the end of the buffer pTemp as an additional element. In this case, there is no need to consider the size parameters of the current block (that is, there is no need to consider the value of mipSizeId), and p[x] can be directly set to p[x]= pTemp[x+1]−pTemp[0], x=0, . . . , inSize−1.

As such, after the MIP input sample values of the current block are determined according to the neighbouring sample values of the current block, an MIP prediction value of the current block can be further determined.

S303, the MIP prediction value of the chroma component of the current block is determined according to the MIP input sample values, an MIP weighting matrix, and a shifting parameter.

The MIP prediction value is prediction values of partial samples in the chroma component of the current block.

Figure 4:
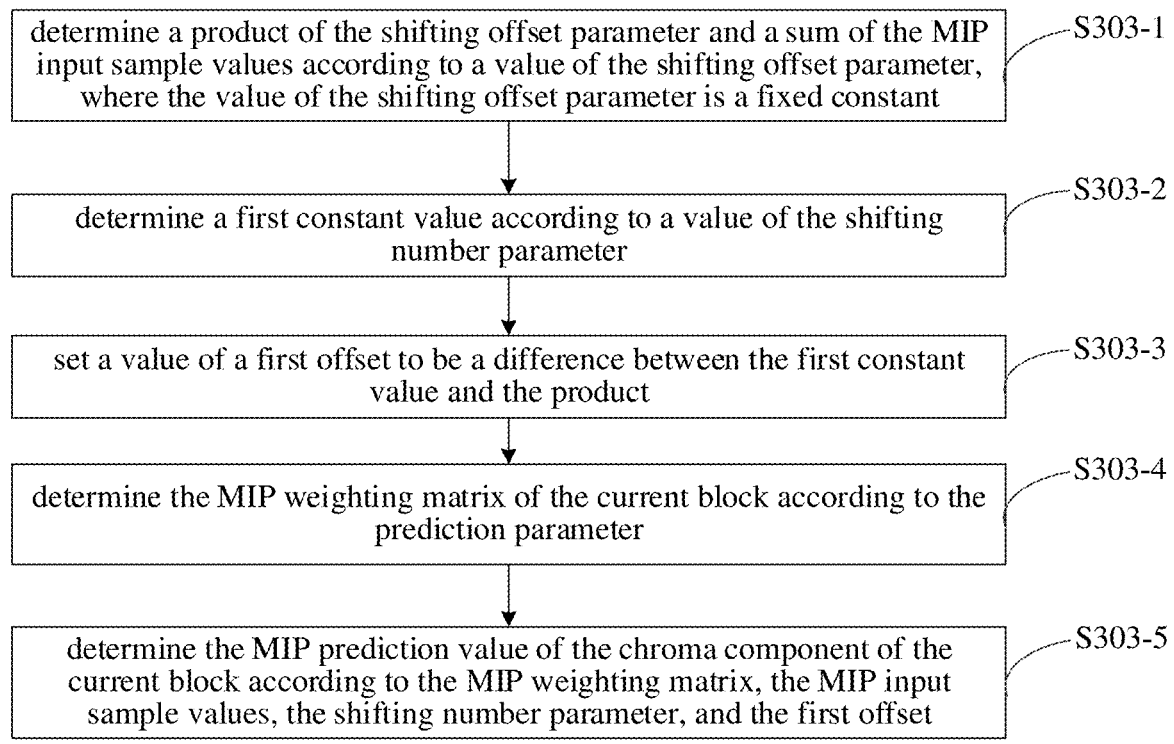
FIG. 4 is a schematic flowchart of another encoding method provided in embodiments of the present application.

It should be noted that, the shifting parameter includes a shifting offset parameter and a shifting number parameter. In this case, as illustrated in FIG. 4, S303 can include the following steps.

S303-1, a product of the shifting offset parameter and a sum of the MIP input sample values is determined according to a value of the shifting offset parameter, where the value of the shifting offset parameter is a fixed constant.

It should be noted that, the shifting offset parameter may also be referred to as a shifting compensation parameter or an offset factor, which may be represented by fO. In embodiments of the present application, the value of the shifting offset parameter may be set to be a fixed constant, such as 32, 46, 56, or 66, and the like. The value of the shifting offset parameter can also be set to be related to a shifting offset parameter table, and the value of the shifting offset parameter can be determined through a look-up table, which is not limited herein.

S303-2, a first constant value is determined according to a value of the shifting number parameter.

S303-3, a value of a first offset is set to be a difference between the first constant value and the product.

It should be noted that, the shifting number parameter may also be referred to as a shifting factor, the number of shifted bits, or a weight shifting value, etc., and may be represented by sW, shift, or weight shift. In embodiments of the present application, the shifting number parameter is represented by sW. In addition, the first offset may be represented by oW, and the first offset is related to both the shifting number parameter and the shifting offset parameter.

In embodiments of the present application, the value of the shifting number parameter can be set to be a fixed constant, for example 5, 6, or 7. The value of the shifting number parameter can also be set to be related to a shifting number parameter table, and the value of the shifting number parameter can be determined through a look-up table, which is not limited herein.

S303-4, the MIP weighting matrix of the current block is determined according to the prediction parameter.

It should be noted that, the prediction parameter may include the prediction mode parameter, and may also include the size parameters of the current block. In the prediction parameter, when the prediction mode parameter indicates that the MIP mode is used to determine the intra prediction value of the chroma component of the current block, a weighting matrix table may be established in advance and stored in a memory or a storage unit. The memory or storage unit herein can be integrated in the encoder, or can also be provided separately. In this way, according to the block size index value (mipSizeId) and the MIP mode index value (modeId) of the current block, the MIP weighting matrix (or referred to as the MIP weight matrix, or also referred to as the MIP matrix) that needs to be used for the current block can be determined through a look-up table, which is represented by mWeight[x][y]. The block size index value (mipSizeId) of the current block is determined according to the size parameters of the current block, and the size of the MIP weighting matrix mWeight[x][y] is merely related to the block size index value of the current block, as illustrated in Table 3.

In the MIP weighting matrix illustrated in Table 3, the number of columns is the number of input samples of matrix multiplication which equals to inSize and the number of rows is the number of output samples of matrix multiplication which equals to predSize×predSize, so that the MIP weighting matrix of the current block can be determined.

TABLE 3

| mipSizeId | the number of columns | the number of rows |
|---|---|---|
| 0 | 4 | 16 |
| 1 | 8 | 16 |
| 2 | 7 | 64 |

It can be understood that, in the encoder, the shifting number parameter table may be established in advance and stored in a memory or a storage unit. The memory or storage unit herein can be integrated in the encoder, or can also be provided separately. In embodiments of the present application, the shifting number parameter (sW) can be determined in the following methods.

In a possible implementation, for different block size index values and different MIP mode index values, the shifting number parameters may be different. In some embodiments, the method may further include the following.

When the MIP mode is used to determine the intra prediction value of the chroma component of the current block, the MIP mode index value of the current block is determined.

According to the MIP mode index value, a value corresponding to the MIP mode index value is queried from a first preset look-up table, where the first preset look-up table is used to record a correspondence between MIP mode index values and values of the shifting number parameter.

The queried value is determined as the value of the shifting number parameter.

It should be noted that, the value of the shifting number parameter can be queried according to the block size index value (represented by mipSizeId) and the MIP mode index value (modeId) of the current block. In the first preset look-up table illustrated in Table 4, for different mipSizeId and modeId, the shifting number parameter required in matrix multiplication can be determined through the look-up table.

TABLE 4

| sW | modeId | | | | | | | | | | | | | | | | | |
|---|---|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 | 16 | 17 |
| 0 | 6 | 6 | 6 | 5 | 6 | 5 | 5 | 6 | 5 | 6 | 6 | 6 | 6 | 6 | 5 | 6 | 5 | 5 |
| 1 | 6 | 6 | 6 | 6 | 6 | 6 | 6 | 6 | 6 | 7 | | | | | | | | |
| 2 | 7 | 5 | 6 | 6 | 6 | 6 | | | | | | | | | | | | |

However, at the encoder side, Table 4 needs to be stored into the memory or the storage unit in the form of a look-up table. However, storage comes at a cost, and so does the lookup process. Since the value of the shifting number parameter in Table 4 is related to both the block size and the MIP mode index value of the current block, the memory occupation is increased, and the computational complexity is also increased.

To reduce memory occupation and reduce computational complexity, in embodiments of the present application, the method for determining the shifting number parameter can be simplified.

In another possible implementation, the value of the shifting number parameter can be set to be a fixed constant, which is independent of the block size index value and the MIP mode index value. For example, for different block size index values and different MIP mode index values, the value of the shifting number parameter may be set to be 5. Alternatively, for different block size index values and different MIP mode index values, the value of the shifting number parameter may be set to be 6. Alternatively, for different block size index values and different MIP mode index values, the value of the shifting number parameter may be set to be 7. In embodiments of the present application, preferably, the value of the shifting number parameter is set equal to 6, which is not limited herein.

In yet another possible implementation, for the value of the shifting number parameter, the method further includes the following.

The block size index value of the current block is determined according to the size parameters of the current block.

The value of the shifting number parameter is determined according to the block size index value of the current block.

It should be noted that, according to the size parameters of the current block, the block size index value of the current block can be determined. In some embodiments, the block size index value of the current block is determined according to the size parameters of the current block as follows.

The block size index value of the current block is set to be 0 when both a width and a height of the current block are equal to 4.

The block size index value of the current block is set to be 1 when both the width and the height of the current block are equal to 8 or one of the width and the height of the current block is equal to 4.

The block size index value of the current block is set to be 2 when the width and the height of the current block do not satisfy the above conditions.

As such, after the block size index value of the current block is determined, the value of the shifting number parameter can be further determined according to the block size index value of the current block.

Optionally, in some embodiments, the value of the shifting number parameter is determined according to the block size index value of the current block as follows.

When the block size index value is respectively equal to 0, 1, or 2, the value of the shifting number parameter corresponding to the block size index value of the current block is determined to be equal to 5, 6, or 5 respectively.

Optionally, in some embodiments, the value of the shifting number parameter is determined according to the block size index value of the current block as follows.

The value of the shifting number parameter is set equal to a ratio of the width or height of the current block to a first preset value corresponding to the block size index value of the current block.

Herein, the first preset value represents the number of the MIP input sample values obtained from the boundary of the current block. In this case, the method may also include the following.

When the block size index value of the current block is respectively equal to 0, 1, or 2, the first preset value corresponding to the block size index value of the current block is determined to be equal to 2, 4, or 4, respectively.

That is, when the first preset value represents the number of the MIP input sample values obtained from the boundary of the current block, if the block size index value of the current block is equal to 0, then the first preset value is equal to 2; if the block size index value of the current block is equal to 1, then the first preset value is equal to 4; if the block size index value of the current block is equal to 2, then the first preset value is equal to 4. As such, the value of the shifting number parameter can be determined according to the ratio of the width or height of the current block to the first preset value.

Optionally, in some embodiments, the value of the shifting number parameter is determined according to the block size index value of the current block as follows.

The value of the shifting number parameter is set equal to a ratio of the width or height of the current block to a second preset value corresponding to the block size index value of the current block.

Herein, the second preset value represents the size of the MIP prediction block of the current block obtained by directly using the MIP weighting matrix. In this case, the method may also include the following.

When the block size index value of the current block is equal to 0, 1, or 2, respectively, the second preset value corresponding to the block size index value of the current block is determined to be equal to 4, 4, or 8, respectively.

That is, when the second preset value represents the size of the MIP prediction block of the current block obtained by directly using the MIP weighting matrix, if the block size index value of the current block is equal to 0, then the second preset value equals 4; if the block size index value of the current block is equal to 1, then the second preset value is equal to 4; if the block size index value of the current block is equal to 2, then the second preset value is equal to 8. As such, the value of the shifting number parameter can be determined according to the ratio of the width or height of the current block to the second preset value.

In yet another possible implementation, the shifting number parameter table can be minimized, and the value of the shifting number parameter is still determined by means of a look-up table. Optionally, in some embodiments, the value of the shifting number parameter is determined according to the block size index value of the current block as follows.

According to the block size index value, a value corresponding to the block size index value is queried from a second preset look-up table, where the second preset look-up table is used to record a correspondence between block size index values and values of the shifting number parameter.

The queried value is determined as the value of the shifting number parameter.

It should be noted that, the value of the shifting number parameter can be queried only according to the block size index value (represented by mipSizeId) of the current block. In the second preset look-up table illustrated in Table 5, each block size index value can correspond to a fixed value. That is, the size of each block or the size set of each block may have a fixed value of the shifting number parameter as illustrated in Table 5.

TABLE 5

| mipSizeId | sW |
|---|---|
| 0 | 5 |
| 1 | 6 |
| 2 | 5 |

According to Table 5, when the block size index value of the current block is respectively equal to 0, 1, or 2, the value of the shifting number parameter corresponding to the block size index value is respectively equal to 5, 6, or 5.

In the above embodiments, by simplifying the method for determining the shifting number parameter, especially minimizing the shifting number parameter table or fixing the value of the shifting number parameter, the storage of the look-up table can be minimized. Thus, the memory occupied for storing the shifting number parameter table in the MIP mode can be reduced without increasing the computational complexity.

In the encoder, a shifting offset parameter table may be established in advance and stored in the memory or the storage unit. The memory or storage unit herein can be integrated in the encoder, or can also be provided separately. In embodiments of the present application, the shifting offset parameter (fO) can be determined in the following methods.

In a possible implementation, for different block size index values and different MIP mode index values, the shifting offset parameters may be different. In some embodiments, the method may further include the following.

When the MIP mode is used to determine the intra prediction value of the chroma component of the current block, the MIP mode index value of the current block is determined.

According to the MIP mode index value, a value corresponding to the MIP mode index value is queried from a third preset look-up table, where the third preset look-up table is used to record a correspondence between MIP mode index values and values of the shifting offset parameter.

The queried value is determined as the value of the shifting offset parameter.

It should be noted that, the value of the shifting offset parameter can be queried according to the block size index value (represented by mipSizeId) and the MIP mode index value (modeId) of the current block. In the third preset look-up table illustrated in Table 6, for different mipSizeId and modeId, the shifting offset parameter required in matrix multiplication can be determined through the look-up table.

TABLE 6

| fO | modeId | | | | | | | | | | | | | | | | | |
|---|---|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 | 16 | 17 |
| 0 | 34 | 19 | 7 | 32 | 27 | 24 | 21 | 13 | 24 | 15 | 27 | 20 | 16 | 7 | 20 | 23 | 21 | 24 |
| 1 | 17 | 20 | 11 | 21 | 17 | 11 | 23 | 10 | 21 | 11 | | | | | | | | |
| 2 | 8 | 46 | 16 | 10 | 13 | 11 | | | | | | | | | | | | |

However, at the encoder side, Table 6 needs to be stored into the memory or the storage unit in the form of a look-up table. However, storage comes at a cost, and so does the lookup process. Since the value of the shifting offset parameter in Table 6 is related to both the block size and the MIP mode index value of the current block, the memory occupation is increased, and the computational complexity is also increased.

To reduce memory occupation and reduce computational complexity, in embodiments of the present application, the method for determining the shifting offset parameter can also be simplified.

In another possible implementation, the value of the shifting offset parameter can be set to be a fixed constant, which is independent of the block size index value and the MIP mode index value. Generally, the fix constant is in a range of 0-100. For example, for different block size index values and different MIP mode index values, the value of the shifting offset parameter may be set to be 32. Alternatively, for different block size index values and different MIP mode index values, the value of the shifting offset parameter may be set to be 46. Alternatively, for different block size index values and different MIP mode index values, the value of the shifting offset parameter may be set to be 56. Alternatively, for different block size index values and different MIP mode index values, the value of the shifting offset parameter may be set to be 66. In embodiments of the present application, preferably, the value of the shifting offset parameter is set equal to 32, which is not limited herein.

In yet another possible implementation, for the value of the shifting offset parameter, the method further includes the following.

The block size index value of the current block is determined according to the size parameters of the current block.

The value of the shifting offset parameter is determined according to the block size index value of the current block.

It should be noted that, according to the size parameters of the current block, the block size index value of the current block can be determined. Thereafter, according to the block size index value of the current block, the value of the shifting offset parameter can be further determined.

Optionally, in some embodiments, the value of the shifting offset parameter is determined according to the block size index value of the current block as follows.

When the block size index value is respectively equal to 0, 1, or 2, the value of the shifting offset parameter corresponding to the block size index value of the current block is determined to be equal to 34, 23, or 46 respectively.

Optionally, in some embodiments, the shifting offset parameter table can be minimized, and the shifting factor is also determined by means of a look-up table. Optionally, in some embodiments, the value of the shifting offset parameter is determined according to the block size index value of the current block as follows.

According to the block size index value, a value corresponding to the block size index value is queried from a fourth preset look-up table, where the fourth preset look-up table is used to record a correspondence between block size index values and values of the shifting offset parameter.

The queried value is determined as the value of the shifting offset parameter.

It should be noted that, the value of the shifting offset parameter can be queried only according to the block size index value (represented by mipSizeId) of the current block. In the fourth preset look-up table illustrated in Table 7, each block size index value can correspond to a fixed value. That is, the size of each block or the size set of each block may have a fixed value of the shifting offset parameter as illustrated in Table 7.

TABLE 7

| mipSizeId | fO |
|---|---|
| 0 | 34 |
| 1 | 23 |
| 2 | 46 |

According to Table 7, when the block size index value of the current block is respectively equal to 0, 1, or 2, it is determined that the value of the shifting offset parameter corresponding to the block size index value is respectively equal to 34, 23, or 46.

In the above embodiments, by simplifying the method for determining the shifting offset parameter, especially minimizing the shifting offset parameter table or fixing the value of the shifting offset parameter, the storage of the look-up table can be minimized. Thus, the memory occupied for storing the shifting offset parameter table in the MIP mode can be reduced without increasing the computational complexity.

As such, after the shifting offset parameter (fO) and the shifting number parameter (sW) are determined, for the first constant value, optionally, in some embodiments, the first constant value is determined according to the value of the shifting number parameter as follows.

The first constant value is set to be an exponential power of 2, where the exponential is an integer and equal to the value of the shifting number parameter minus one.

Optionally, in some embodiments, the first constant value is determined according to the value of the shifting number parameter as follows.

The first constant value is determined by binary left-shifting of "1", where the number of left shifted bits is equal to the value of the shifting number parameter minus one.

That is, after the shifting number parameter (sW) is obtained, the first constant value can be denoted as $1<<(sW-1)$ or denoted as $2\hat{}(sW-1)$. In this case, when the value of the shifting number parameter is set to be 6, the first constant value is equal to 32.

Herein, if the first offset is denoted by oW, according to the shifting offset parameter (fO), the product of the shifting offset parameter and the sum of the MIP input sample values can be obtained, i.e., $fO \times (\Sigma_{i=0}^{inSize-1} p[i])$. The value of oW can be set to be $(1<<(sW-1)) - fO \times (\Sigma_{i=0}^{inSize-1} p[i])$.

As such, in the MIP mode, the MIP weighting matrix, the MIP input sample values, the shifting number parameter, and the first offset can be obtained, facilitating subsequent determination of the MIP prediction value of the current block.

S303-5, the MIP prediction value of the chroma component of the current block is determined according to the MIP weighting matrix, the MIP input sample values, the shifting number parameter, and the first offset.

Herein, the MIP prediction value represents prediction values of partial samples in the chroma component of the current block.

It should be noted that, the MIP prediction value of the current block is determined according to the MIP weighting matrix, the MIP input sample values, the shifting number parameter, and the first offset as follows.

A first weighted sum of the MIP weighting matrix and the MIP input sample values is calculated.

A first sum of the first weighted sum and the first offset is calculated.

A first right-shift value is determined by binary right-shifting of the first sum, where the number of right shifted bits is equal to the value of the shifting number parameter.

The MIP prediction value of the current block is set to be a sum of the first right-shift value and a value corresponding to index 0 in first temporal reference values, where the first temporal reference values are obtained by downsampling the neighbouring sample values of the current block.

Specifically, in the MIP mode, the MIP weighting matrix (represented by mWeight), the shifting number parameter (represented by sW), and the shifting offset parameter (denoted by fO) can be determined according to the block size index value (represented by mipSizeId) and the MIP mode index value (represented by modeId) of the current block. Then, the MIP input sample values (represented by p[x]), mWeight, sW, and fO are input into the matrix multiplication, to obtain the MIP prediction value (which can be represented by predMip[x][y]) output from the matrix multiplication. The samples in predMip[x][y] are arranged in a matrix/array form according to predSize×predSize. The calculation formula for predMip[x][y] is as follows.

$$\begin{cases} predMip[x][y] = \left(\left(\left(\sum_{i=0}^{inSize-1} mWeight[i][y \times predSize + x] \times p[i]\right) + oW\right) >> sW\right) + pTemp[0] \\ oW = (1 << (s)W - 1) - fO \times \left(\sum_{i=0}^{inSize-1} p[i]\right) \end{cases} \quad (5)$$

[x][y] represents a position coordinate of the sample, x represents the horizontal direction, and y represents the vertical direction; inSize represents the number of input samples, and p[i] represents the value corresponding to the index i in the MIP input sample values; pTemp[0] represents the value corresponding to the index 0 in the first temporal reference values; ">>" represents the binary right-shifting operator, and "<<" represents the binary left-shifting operator; x=0, . . . , predSize−1, y=0, . . . , predSize−1. As such, according to the above formula (5), predMip[x][y] can be calculated, to obtain the MIP prediction block.

In some embodiments, if sW has a fixed value of 6 and fO has a fixed value of 32, the calculation formula is as follows.

$$\begin{cases} predMip[x][y] = \left(\left(\left(\sum_{i=0}^{inSize-1} mWeight[i][y \times predSize + x] \times p[i]\right) + oW\right) >> 6\right) + pTemp[0] \\ oW = 32 - 32 \times \left(\sum_{i=0}^{inSize-1} p[i]\right) \end{cases} \quad (6)$$

Furthermore, it is also necessary to perform clipping on prediction values of samples in the MIP prediction block, to obtain the MIP prediction block of the current block. Then, whether to transpose the MIP prediction block is determined. If the determination result is yes, there is a need to transpose prediction sample values in the MIP prediction block, and the transposed MIP prediction block is determined as the MIP prediction block of the current block. If the determination result is no, there is no need to transpose the prediction sample values in the MIP prediction block, and this MIP prediction block can be directly determined as the MIP prediction block of the current block, to obtain the MIP prediction value of the current block, where the MIP prediction value refers to the prediction values of some samples in the current block.

S304, the intra prediction value of the chroma component of the current block is determined by filtering the MIP prediction value.

It should be noted that, the intra prediction value of the current block is determined by filtering the MIP prediction value as follows.

Whether the size parameters of the MIP prediction block are the same as the size parameters of the current block is determined.

When the size parameters of the MIP prediction block are the same as the size parameters of the current block, the intra prediction block of the current block is set equal to the MIP prediction block, where the MIP prediction block contains prediction sample values of all sample positions in the current block.

When the size parameters of the MIP prediction block are different from the size parameters of the current block, the MIP prediction block is filtered to obtain a filtered prediction block, and the filtered prediction block is set as the intra prediction block of the current block.

Herein, the filtering may include upsampling or low-pass filtering.

It should be noted that, the MIP prediction block is composed of the MIP prediction value. After the MIP prediction block is obtained, since there are only two types of size parameters of the MIP prediction block: a 4×4 MIP prediction block and an 8×8 MIP prediction block, the size parameters of the current block and the size parameters of the MIP prediction block may or may not be the same. That is, the sample values corresponding to the MIP prediction block may not be able to fully fill the current block, so upsampling on the MIP prediction block is needed to generate the final prediction value. That is, whether to upsample the MIP prediction block is determined by determining whether the size parameters of the MIP prediction block are the same as the size parameters of the current block.

It should also be noted that, when the size parameters of the MIP prediction block are the same as the size parameters of the current block, that is, the width and height of the MIP prediction block are the same as that of the current block, indicating that upsampling of the MIP prediction block is not required. In this case, the MIP prediction block can be directly filled into the current block, that is, there is no vacant sample in the current block after filling. In this case, the intra prediction value of each sample in the current block can be directly replaced with the prediction value of each sample in the MIP prediction block. Refer to the following.

$$predSamples[x][y] = predMip[x][y] \quad (7)$$

[x][y] represents a position coordinate of the sample, x represents the horizontal direction, and y represents the vertical direction; predSamples[x][y] represents the intra prediction value corresponding to the sample at the position coordinate [x][y] in the current block; predMip[x][y] represents the prediction value corresponding to the sample at the position coordinate [x][y] in the MIP prediction block. In this way, according to formula (7), the MIP prediction block predMip[x][y] can be directly used as the intra prediction block predSamples[x][y] of the current block, that is, the intra prediction value of at least one sample in the current block.

It should also be noted that, when the size parameters of the MIP prediction block are different from that of the current block, that is, at least one of the width and height of the MIP prediction block is different from that of the current block, the MIP prediction block is unable to fully fill the current block, that is, there is a vacant sample(s) in the current block after filling, which indicates that filtering of the MIP prediction block is needed in this case. That is, if upsampling is required in both the horizontal and vertical directions, the MIP prediction block can be upsampled in the horizontal direction and then upsampled in the vertical direction to obtain a first upsampled block, which can be represented by predSamples[x][y], and thereafter, the MIP prediction block is upsampled in the vertical direction and then upsampled in the horizontal direction to obtain a second upsampled block, which can be represented by predSamplesTemp[x][y]. Finally, weighted average of predSamples[x][y] and predSamplesTemp[x][y] is performed to finally obtain the intra prediction value of the chroma component of the current block, that is, to obtain the intra prediction block of the current block.

Exemplarily, if the edge length nTbS (herein, S can be replaced with W and H respectively) of the current block is equal to the edge length predSize of predMip (herein, predSize is only related to the blocksizeIdx of the current block), the MIP prediction block can be directly set as the intra prediction block of the current block. Otherwise, the MIP prediction block will need to be filtered to get the intra prediction block of the current block. Herein, taking a 4×4 current block as an example, if the size parameters of the current block are the same as that of the MIP prediction block, filtering the MIP prediction block is not required. Then, the MIP prediction block can be directly set as the intra prediction block of the current block, so that the intra prediction value of at least one sample in the current block can be obtained.

Briefly, for the prediction process in the MIP mode, the input data of the MIP mode may include: the position of the current block (xTbCmp, yTbCmp), the MIP mode index value (which can be represented by modeId) applied to the current block, the height of the current block (represented by nTbH), the width of the current block (represented by nTbW), and the transposition indication flag indicative of whether transposition is required (that is, the MIP transposition indication parameter, which can be represented by isTransposed), etc. The output data of the MIP mode may include: the intra prediction block of the current block. The prediction value corresponding to the sample coordinate [x][y] in the intra prediction block is predSamples[x][y], where, x=0, 1, . . . , nTbW−1; y=0, 1, . . . , nTbH−1.

Figure 5:
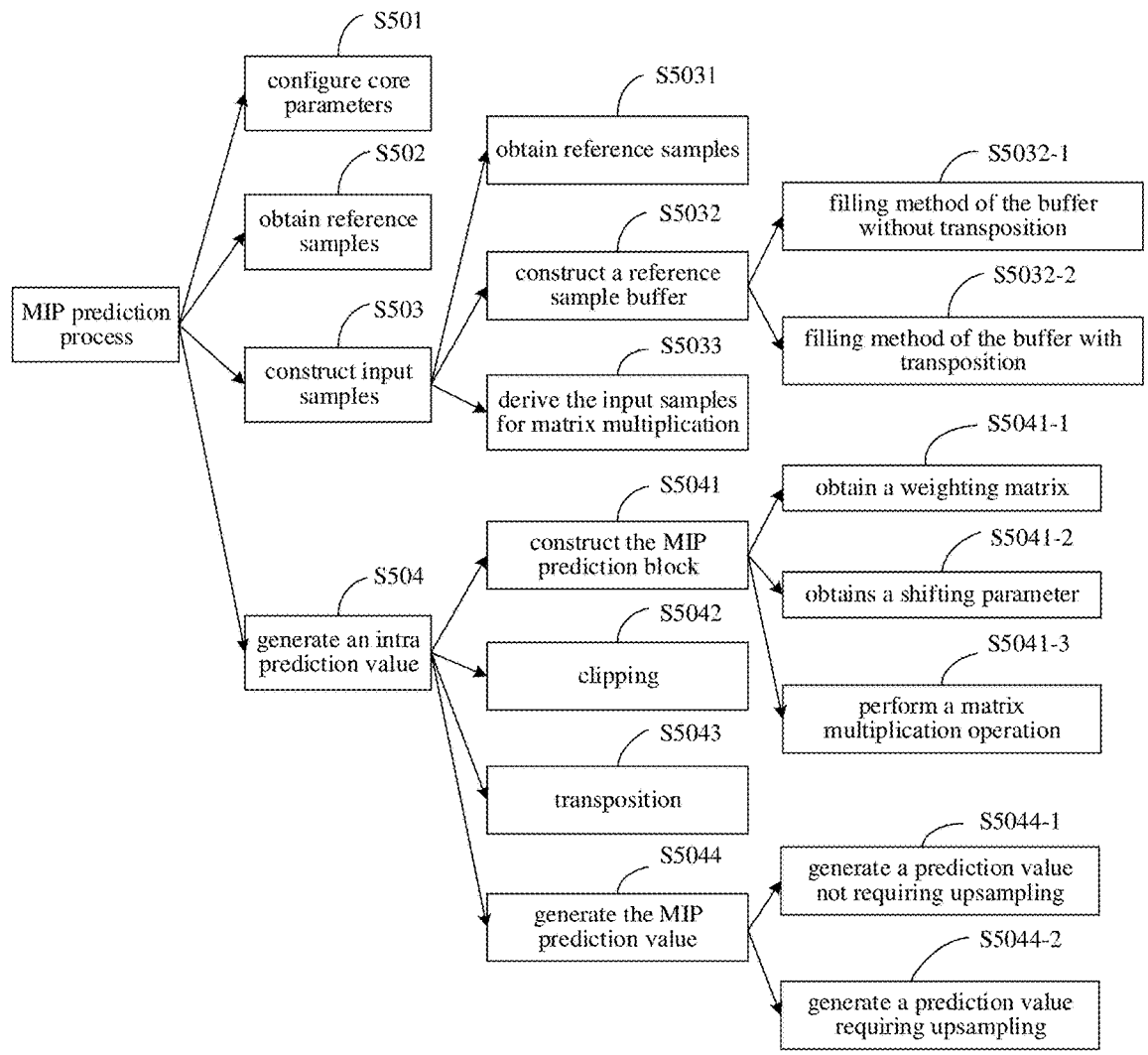
FIG. 5 is a schematic flowchart of a matrix-based intra prediction (MIP) prediction process provided in embodiments of the present application.

As illustrated in FIG. 5, the MIP prediction process specifically includes the following steps.

S501, configure core parameters.

For S501, the MIP core parameters may include the type of the current block (represented by mipSizeId), the number of reference samples per edge (represented by boundySize), the number of MIP input samples (represented by inSize), and the size of the MIP prediction block (arranged as predSize×predSize) that is output from matrix multiplication. The current block can be categorized into three types according to the size of the current block, where mipSizeId represents the type of the current block. Herein, mipSizeId can be equal to 0, 1, or 2. Moreover, for different types of current blocks, the number of reference samples and the size of the MIP prediction block output from matrix multiplication are different.

S502, obtain reference samples.

For S502, in predicting the current block, the above and left neighbouring blocks of the current block are both already-encoded blocks, and the reference samples in the MIP mode are the reconstructed values of the samples in the above neighbouring row and left neighbouring column of the current block. In other words, the process of acquiring the above neighbouring reference samples (represented by refT) and the left neighbouring reference samples (represented by refL) of the current block is the process of acquiring the reference samples.

S503, construct input samples.

For S503, this step is used for the input of matrix multiplication, which may specifically include the following.

S5031, obtain reference samples.
S5032, construct a reference sample buffer.
S5033, derive the input samples for matrix multiplication.

For S5031, the process of acquiring the reference samples is a process of downsampling the reference samples. For the S5032, there are two filling methods in the construction of the reference sample buffer, which may specifically include the following.

S5032-1, a filling method of the buffer without transposition.
S5032-2, a filling method of the buffer with transposition.
S504, generate an intra prediction value.

For S504, this step is used to obtain an MIP prediction value of the current block, which may specifically include the following.

S5041, construct the MIP prediction block of output samples of matrix multiplication.
S5042, perform clipping on the MIP prediction block of the output samples of matrix multiplication.
S5043, perform transposition on the MIP prediction block of the output samples of matrix multiplication.
S5044, generate the MIP prediction value.

For S5041, in the process of constructing the MIP prediction block, it may specifically include the following.

S5041-1, obtain a weighting matrix.
S5041-2, obtains a shifting parameter.
S5041-3, perform a matrix multiplication operation.

That is, in the process of constructing the MIP prediction block, not only the weighting matrix but also the shifting parameter (including the shifting offset parameter and the shifting number parameter) need to be obtained. Then, the matrix multiplication operation is performed to obtain the MIP prediction block of the output samples of matrix multiplication. For S5044, generating the final MIP prediction value includes two cases, which may specifically include the following.

S5044-1, generate a prediction value not requiring upsampling.
S5044-2, generate a prediction value requiring upsampling.

In this way, after the above four steps S501 to S504, in embodiments of the present application, the intra prediction value of at least one sample in the chroma component of the current block can be obtained.

S305, a prediction residual value of the chroma component of the current block is determined according to the intra prediction value of the chroma component of the current block.

It should be noted that, after the intra prediction value of the chroma component of the current block is obtained, the difference between the actual value of the chroma component of the current block and the intra prediction value of the chroma component of the current block can be calculated to obtain the prediction residual value of the chroma component of the current block, that is, obtain the residual block of the current block.

S306, an LFNST parameter is determined by performing an LFNST on the prediction residual value.

It should be noted that, for the transform unit 108 illustrated in FIG. 1, the transform unit 108 can perform a first transform, for example, integer transform which is originally designed based on discrete cosine transform (DCT), on the residual block of the current block. The transform unit 108 can further perform a second transform such as the LFNST on the residual block of the current block. Specifically, in some embodiments, the LFNST parameter is determined by performing the LFNST on the prediction residual value as follows.

A residual block of the current block is determined according to the prediction residual value, and a first transform coefficient block is determined by performing a first transform on the residual block.

Whether to perform the LFNST on at least partial transform coefficients in the first transform coefficient block is determined.

The LFNST parameter is determined by performing the LFNST on the at least partial transform coefficients in the first transform coefficient block, when the determination result is yes.

In embodiments of the present application, the encoder may perform the first transform (also called "core transform" or "primary transform" or "main transform") on the prediction residual value in the residual block, to obtain the first transform coefficient block after first transform. Then, the LFNST (also called "secondary transform" or "second transform") is performed on some or all transform coefficients in the first transform coefficient block to determine the LFNST parameter. It should be noted that, the first transform herein is a transform different from the LFNST.

It should also be noted that, the LFNST is not performed on any current block. After the first transform, some conditions (such as a minimum value among the size parameters of the current block, the block size index value of the current block, etc.) need to be checked to determine whether to perform the LFNST on the at least partial transform coefficients in the first transform coefficient block. Optionally, in some embodiments, whether to perform the LFNST on the at least partial transform coefficients in the first transform coefficient block is determined as follows.

A minimum value among size parameters of the current block is determined, when the MIP mode is used to determine the intra prediction value of the chroma component of the current block.

Whether to perform the LFNST on the at least partial transform coefficients in the first transform coefficient block is determined according to the minimum value.

Furthermore, whether to perform the LFNST on the at least partial transform coefficients in the first transform coefficient block is determined according to the minimum value as follows.

Determine to perform the LFNST on the at least partial transform coefficients in the first transform coefficient block, when the minimum value is greater than or equal to a first preset threshold.

Herein, the first preset threshold may be used to represent a preset threshold for evaluating whether to perform the LFNST. In embodiments of the present application, the first preset threshold may be set to 8, which is not specifically limited.

That is, when intra prediction is performed using the MIP mode on the chroma component of the current block, the minimum value among the size parameters of the current block can be determined. For example, when the minimum value of the width and height is greater than or equal to 8, the LFNST is determined to be performed on the at least partial transform coefficients in the first transform coefficient block.

Optionally, in some embodiments, whether to perform the LFNST on the at least partial transform coefficients in the first transform coefficient block is determined as follows.

When the MIP mode is used to determine the intra prediction value of the chroma component of the current block, the block size index value of the current block is determined according to the size parameters of the current block.

Whether to perform the LFNST on the at least partial transform coefficients in the first transform coefficient block is determined according to the block size index value.

Furthermore, whether to perform the LFNST on the at least partial transform coefficients in the first transform coefficient block is determined according to the block size index value as follows.

Determine to perform the LFNST on the at least partial transform coefficients in the first transform coefficient block, if the block size index value is equal to a second preset threshold.

Herein, the second preset threshold may be used to represent a preset threshold for evaluating whether to perform the LFNST. In embodiments of the present application, the second preset threshold may be set to be a preset value (e.g., 2), or one of multiple preset values (e.g., 1, 2), which is not specifically limited.

That is, when intra prediction is performed using the MIP mode on the chroma component of the current block, the block size index value (mipSizeId) of the current block is determined according to the size parameters of the current block. For example, when the value of mipSizeId is equal to 2, the LFNST is determined to be performed on the at least partial transform coefficients in the first transform coefficient block.

Optionally, in some embodiments, whether to perform the LFNST on the at least partial transform coefficients in the first transform coefficient block is determined as follows.

A first cost result is calculated in a case that the LFNST is not performed on the at least partial transform coefficients in the first transform coefficient block.

A second cost result is calculated in a case that the LFNST is performed on the at least partial transform coefficients in the first transform coefficient block.

According to the first cost result and the second cost result, determine whether to perform the LFNST on the at least partial transform coefficients in the first transform coefficient block.

Furthermore, whether to perform the LFNST on the at least partial transform coefficients in the first transform coefficient block is determined according to the first cost result and the second cost result as follows.

If the first cost result is greater than the second cost result, determine to perform the LFNST on the at least partial transform coefficients in the first transform coefficient block.

It should be noted that, in embodiments of the present application, a traditional rate distortion optimization method may be adopted. The first cost result is calculated if the LFNST is not performed on the at least partial transform coefficients in the first transform coefficient block. The second cost result is then calculated if the LFNST is performed on the at least partial transform coefficients in the first transform coefficient block. The first cost result is compared with the second cost result, and when the first cost result is greater than the second cost result, determine to perform the LFNST on the at least partial transform coefficients in the first transform coefficient block.

In this way, when the determination result is yes, that is, it is determined that the LFNST needs to be performed on the at least partial transform coefficients in the first transform coefficient block, the LFNST can be performed on the at least partial transform coefficients in the first transform coefficient block to determine the LFNST parameter.

S307, the LFNST parameter is encoded and the encoded LTNST parameter is signalled into a bitstream.

It should be noted that, the LFNST parameter includes an LFNST index, which can be denoted by lfnst_index. In some embodiments, the LFNST parameter can be determined as follows.

A value of the LFNST index is set to be greater than zero, when the LFNST is determined to be performed on the at least partial transform coefficients in the first transform coefficient block.

The value of the LFNST index is set to be zero, when the LFNST is determined not to be performed on the at least partial transform coefficients in the first transform coefficient block.

Furthermore, for S307, the LFNST parameter is encoded and the encoded LTNST parameter is signalled into the bitstream as follows.

The LFNST index is encoded and the encoded LFNST index is signalled into the bitstream.

That is, after the LFNST parameter, i.e., lfnst_index, is determined, if lfnst_index is equal to 0, it means that the LFNST is not executed; if lfnst_index is greater than 0, it means that the LFNST is to be executed. During encoding, lfnst_index can be encoded using context-based adaptive binary arithmetic coding (CABAC) with a descriptor "ae(v)".

Exemplarily, refer to Table 8, which illustrates an example of description of a syntax structure of the LFNST parameter provided in the related art. In this case, the condition for determining whether to perform the LFNST on the at least partial transform coefficients in the first transform coefficient block may include at least one of the following: treeType==DUAL_TREE_CHROMA, or !IntraMipFlag[x0][y0], or Min(lfnstWidth, lfnstHeight)>=16.

TABLE 8 if( Min( lfnstWidth, lfnstHeight) >= 4 && sps_lfnst_enabled_flag = = 1 &&
CuPredMode[ chType ][ x0 ][ y0 ] = = MODE_INTRA && lfnstNotTsFlag = = 1 &&
( treeType= = DUAL_TREE_CHROMA | !IntraMipFlag[ x0 ][ y0 ] | |
Min( lfnstWidth, lfnstHeight ) >= 16 ) &&
Max( cbWidth, cbHeight ) <= MaxTbSizeY) {
if( (IntraSubPartitionsSplitType!= ISP_NO_SPLIT | | LfnstDcOnly = = 0 ) &&
LfnstZeroOutSigCoeffFlag = = 1 )
lfnst_idx                                                                                              ae(v)
}

Refer to Table 9A and Table 9B, which respectively illustrates an example of description of a syntax structure of the LFNST parameter provided in embodiments of the present application. In this case, the condition for determining whether to perform the LFNST on the at least partial transform coefficients in the first transform coefficient block may include at least one of the following: intra_mip_flag[x0][y0]==1&&Min(lfnstWidth, lfnstHeight)>=8, or intra_mip_flag[x0][y0]==1&& mipSizeId==2.

Specifically, as illustrated in the syntax structure of Table 9A, if the minimum value of the size parameters of the current block is greater than or equal to 8 (i.e., both width and height are greater than or equal to 8), the MIP mode can be used (i.e., when intra_mip_flag[x0][y0]==1) to encode lfnst_index of the current block. Alternatively, the condition may also be set to be that: both the width and the height are greater than or equal to the first value (for example, 8) and the sum of the width and height is greater than or equal to the second value (for example, 16). As illustrated in the syntax structure of Table 9B, when the block size index value (mipSizeId) of the current block is equal to 2, the MIP mode can be used (i.e., when intra_mip_flag[x0][y0]==1) to encode lfnst_index of the current block. Alternatively, the condition may also be set to be that: mipSizeId is equal to one of multiple preset values (for example, 1 and 2).

necessary to determine an LFNST transform kernel (represented by kernel) used for the current block. In some embodiments, the LFNST is performed on the prediction residual value to determine the LFNST parameter as follows. The LFNST transform kernel used for the current block is determined. The LFNST transform kernel is used to perform the LFNST on the prediction residual value to determine the LFNST parameter.

In embodiments of the present application, there are four transform kernel candidate sets in the LFNST, and these four transform kernel candidate sets can include set0, set1, set2 and seta. Herein, in embodiments of the present application, the MIP parameter may be used to determine the LFNST transform kernel candidate set, and then the LFNST transform kernel used for the current block is selected from the LFNST transform kernel candidate set. Therefore, in some embodiments, the method may further include the following.

When the MIP mode is used to determine the intra prediction value of the chroma component of the current block, the MIP parameter is determined from the prediction parameter of the current block.

According to the MIP parameter, the LFNST transform kernel candidate set is determined.

In the LFNST transform kernel candidate set, the transform kernel indicated by the LFNST index is set as the LFNST transform kernel used for the current block.

TABLE 9A

|  | Descriptor |
|---|---|
| coding_unit(x0,y0,cb Width,cbHeight,cqtDepth,treeType,   modeType){ | |
| ...... | |
| if(...&&(intra_mip_flag[x0][y0]==1&&Min(lfnstWidth, lfnstHeight)>=8)&&...){ | |
| ...... | |
| lfnst_idx | ae(v) |
| } | |
| ...... | |
| } | |

TABLE 9B

|  | Descriptor |
|---|---|
| coding_unit(x0,y0,cbWidth,cbHeight,cqtDepth,treeType,   modeType){ | |
| ...... | |
| if(...&&(intra_mip_flag[x0][y0]==1&&mipSizeId==2)&&...){ | |
| ...... | |
| lfnst_idx | ae(v) |
| } | |
| ...... | |
| } | |

It should also be noted that, when it is determined that the LFNST can be performed on the current block, it is also The value of the LFNST index is set such that the value of the LFNST index indicates that the LFNST is performed on the current block and indicates an index of the LFNST transform kernel in the LFNST transform kernel candidate set.

The LFNST transform kernel candidate set contains two or more preset LFNST transform kernels.

It should be noted that, the MIP parameter may include at least one of the following: the MIP mode index value (represented by modeId) and the MIP transposition indication parameter (represented by isTransposed). For the LFNST transform kernel used for the current block, when the value of the MIP transposition indication parameter indicates that the transposition is performed on the sample input vector used in the MIP mode, it is also necessary to perform matrix transposition on the selected transform kernel to obtain the LFNST transform kernel used for the current block.

Furthermore, in some embodiments, the LFNST transform kernel candidate set is determined according to the MIP parameter as follows.

According to the MIP mode index value, the value of the LFNST intra prediction mode index is determined.

According to the value of the LFNST intra prediction mode index, the index value of the LFNST transform kernel candidate set is determined through a fifth preset look-up table.

The LFNST transform kernel candidate set is selected from multiple candidate LFNST transform kernel candidate sets according to the index value of the LFNST transform kernel candidate set.

Herein, the LFNST intra prediction mode index may be represented by predModeIntra, and the index value of the LFNST transform kernel candidate set may be represented by lfnstTrSetIdx.

It should be noted that, the fifth preset look-up table is illustrated in Table 10. According to the MIP mode index value (that is, the value of modeId), the value of predModeIntra can be determined. Then, according to the value of predModeIntra, the value of lfnstTrSetIdx can be directly determined through Table 10, that is, the LFNST transform kernel candidate set selected for the current block is determined. Herein, the value of lfnstTrSetIdx indicates the transform kernel candidate set used in the LFNST. Since the value of modeId can include 0, 1, 2, 3, 4, and 5, the value of predModeIntra is also 0, 1, 2, 3, 4, or 5. Its correspondence with lfnstTrSetIdx is as follows.

TABLE 10

| predModeIntra | lfnstTrSetIdx |
|---|---|
| 0<= predModeIntra <= 2 | 0 |
| predModeIntra == 3 | 2 |
| predModeIntra == 4 | 1 |
| predModeIntra == 5 | 3 |

In a specific embodiment, the value of the LFNST intra prediction mode index is determined according to the MIP mode index value as follows. The value of the LFNST intra prediction mode index is set equal to the MIP mode index value.

That is, in embodiments of the present application, the value of predModeIntra may be set equal to the value of modeId, and then the value of lfnstTrSetIdx is directly determined through Table 10 according to the value of predModeIntra, that is, the LFNST transform kernel candidate set selected for the current block is determined. It should also be noted that, in another specific embodiment of the present application, it is also possible to directly map the value of modeId to the value of the PLANAR mode, and then use the value of predModeIntra corresponding to the PLANAR mode to determine the value of lfnstTrSetIdx, that is, to determine the LFNST transform kernel candidate set selected for the current block.

In some embodiments, the LFNST parameter further includes LFNST coefficients. The LFNST parameter is determined as follows.

The LFNST coefficients are determined by performing the LFNST on the at least partial transform coefficients in the first transform coefficient block.

Accordingly, the LFNST parameter is encoded and the encoded LTNST parameter is signalled into the bitstream as follows.

Quantized coefficients are determined by quantizing the LFNST coefficients.

The quantized coefficients are encoded and the encoded quantized coefficients are signalled into the bitstream.

It should be noted that, when lfnst_index is not equal to 0, that is, when it is determined to perform the LFNST on the current block, the LFNST coefficients can be determined by performing the LFNST on the at least partial transform coefficients in the first transform coefficient block. The LFNST coefficients are then quantized and encoded, and written to the bitstream.

It should be noted that, d[x][y] is assumed to be the first transform coefficient block, where x=0, . . . , nTbW−1, y=0, . . . , nTbH−1, and where nTbW and nTbH represent the width and height of the current block, respectively. Suppose v[x] represents a block including the LFNST coefficients, where x=0, . . . , nLfnstOutSize−1, nLfnstOutSize= (nTbW>=8 && nTbH>=8)? 48:16.

In a possible implementation, the LFNST may be directly performed on the at least partial transform coefficients in the first transform coefficient block in the horizontal scan order to obtain the LFNST coefficients. Specifically, refer to the following.

$$d[x][y]=(y<4)?v[x+(y<<Log2LfnstSize)]:((x<4)?v[32+x+((y-4)<<2)]:d[x][y]) \quad (8)$$

log2LfnstSize is determined as follows.

$$Log2LfnstSize=(nTbW>=8\&\&nTbH>=8)?3:2 \quad (9)$$

In another possible implementation, the scan order may include the horizontal scan order and the vertical scan order. Herein, the scan order is determined according to the value of the MIP transposition indication parameter (represented by isTransposed).

Optionally, in some embodiments, the LFNST is performed on the at least partial transform coefficients in the first transform coefficient block to obtain the LFNST coefficients as follows.

When the value of the MIP transposition indication parameter indicates that transposition is performed on the sample input vector used in the MIP mode, the LFNST is performed on the at least partial transform coefficients in the first transform coefficient block in the vertical scan order, to obtain the LFNST coefficients.

When the value of the MIP transposition indication parameter indicates that transposition is not performed on the sample input vector used in the MIP mode, the LFNST is performed on the at least partial transform coefficients in the first transform coefficient block in the horizontal scan order, to obtain the LFNST coefficients.

Specifically, if the value of isTransposed is equal to 0, indicating that the sample input vector used in the MIP mode is not to be transposed, then the LFNST can be performed on the at least partial transform coefficients in the first transform coefficient block in the horizontal scan order. Specifically, refer to the following.

$$d[x][y]=(y<4)?v[x+(y<<\text{Log2LfnstSize})]:((x<4)?v[32+x+((y-4)<<2)]:d[x][y]) \quad (10)$$

If the value of isTransposed is equal to 1, indicating that the sample input vector used in the MIP mode is to be transposed, then the LFNST can be performed on the at least partial transform coefficients in the first transform coefficient block in the vertical scan order. Specifically, refer to the following.

$$d[x][y]=(x<4)?v[y+(x<<\text{Log2LfnstSize})]:((y<4)?v[32+y+((x-4)<<2)]:d[x][y]) \quad (11)$$

log2LfnstSize is determined according to the above formula (9).

Optionally, in some embodiments, the LFNST can be performed on the at least partial transform coefficients in the first transform coefficient block to obtain the LFNST coefficients as follows.

When the value of the MIP transposition indication parameter indicates that transposition is performed on the sample input vector used in the MIP mode, the LFNST is performed on the at least partial transform coefficients in the first transform coefficient block in the horizontal scan order, to obtain the LFNST coefficients.

When the value of the MIP transposition indication parameter indicates that transposition is not performed on the sample input vector used in the MIP mode, the LFNST is performed on the at least partial transform coefficients in the first transform coefficient block in the vertical scan order, to obtain the LFNST coefficients.

Specifically, if the value of isTransposed is equal to 1, indicating that the sample input vector used in the MIP mode is to be transposed, then the LFNST can be performed on the at least partial transform coefficients in the first transform coefficient block in the horizontal scan order. Specifically, refer to the above formula (10).

If the value of isTransposed is equal to 0, indicating that the sample input vector used in the MIP mode is not to be transposed, then the LFNST can be performed on the at least partial transform coefficients in the first transform coefficient block in the vertical scan order. Specifically, refer to the above formula (11).

log2LfnstSize is determined according to the above formula (9).

In addition, the LFNST in embodiments of the present application can be applied to traditional intra prediction modes (e.g., angular intra prediction mode, DC mode, PLANAR mode, etc.) in addition to the MIP mode. Its specific implementation is similar to that of the MIP mode.

In some embodiments, the LFNST transform kernel candidate set is determined according to the MIP parameter as follows.

According to the index value of the traditional intra prediction mode, the value of the LFNST intra prediction mode index is determined.

According to the value of the LFNST intra prediction mode index, the index value of the LFNST transform kernel candidate set is determined through a sixth preset look-up table.

According to the index value of the LFNST transform kernel candidate set, the LFNST transform kernel candidate set is selected from multiple candidate LFNST transform kernel candidate sets.

It should be noted that, the sixth preset look-up table is illustrated in Table 11. The value of predModeIntra can be determined according to the index value of the traditional intra prediction mode. Then, according to the value of predModeIntra, the value of lfnstTrSetIdx can be directly determined through Table 11, that is, the LFNST transform kernel candidate set selected for the current block is determined. Herein, the index value of the traditional intra prediction mode may be assigned to predModeIntra, to determine the value of lfnstTrSetIdx.

TABLE 11

| predModeIntra | lfnstTrSetIdx |
| --- | --- |
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

The encoding method of embodiments of the present application will be specifically described below with reference to the encoder 100 illustrated in FIG. 1.

It should be understood that, the current block (or called a "coding block") in embodiments of the present application may be a CU or a partition (e.g., a transform block) of the CU. Specifically, when the intra prediction unit 106 determines that the MIP mode is used to encode the current block or when the intra prediction unit 106 evaluates the MIP mode for encoding the current block using rate distortion optimization method, the intra prediction unit 106 will obtain the intra prediction block of the current block, where the intra prediction block of the current block includes the intra prediction value of at least one sample in the current block.

Specifically, the intra prediction unit 106 obtains the intra prediction block using the MIP mode as follows.

First, the intra prediction unit 106 derives one or more reference samples from neighbouring samples of the current block, for example, by downsampling the neighbouring samples, or directly extracting from the neighbouring samples.

Then, the intra prediction unit 106 determines one or more partial prediction samples corresponding to sample positions in the current block using the obtained reference samples, the MIP matrix, and the shifting parameter. Herein, the sample positions can be preset sample positions in the current block. For example, the sample positions have even horizontal and vertical coordinate values. The shifting parameter includes the shifting number parameter and the shifting offset parameter, and the shifting parameter is used in shifting operations in derivation of the intra prediction value of the partial samples.

Finally, if prediction samples corresponding to the partial samples of the current block are derived, the intra prediction unit 106 further needs to derive prediction samples corresponding to remaining samples other than the partial samples in the current block. For example, the intra prediction unit 106 uses an interpolation filter to derive the prediction samples corresponding to the remaining samples, with the partial samples and the neighbouring samples being the input of the interpolation filter.

Figure 6:
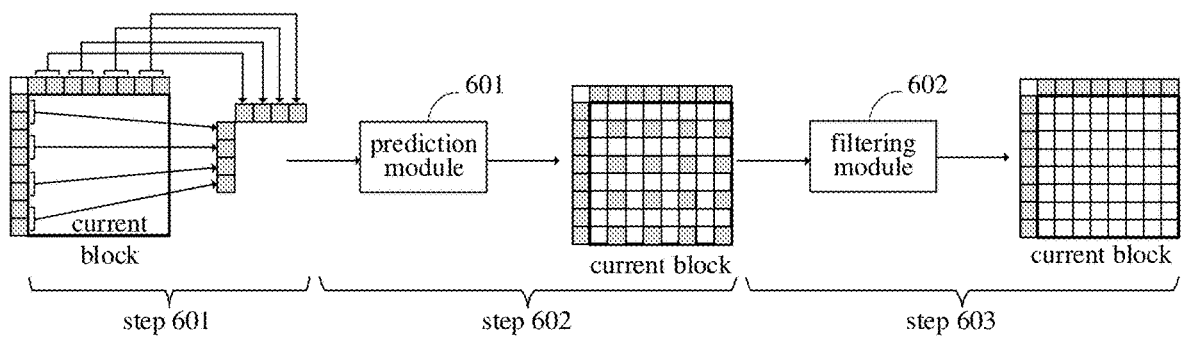
FIG. 6 is a schematic flowchart of deriving an intra prediction block using an MIP mode provided in embodiments of the present application.

As illustrated in FIG. 6, it illustrates an example of a block diagram of a procedure of deriving an intra prediction block using an MIP mode provided in embodiments of the present application. This procedure can be implemented on the encoder 100, where the "current block" herein refers to the "coding block".

Step 601, the intra prediction unit 106 gets neighbouring samples of the current block, for example, as marked as gray squares adjacent to the current block in step 601 in FIG. 6. The intra prediction unit 106 derives one or more reference samples from the neighbouring samples. In the example of step 601 in FIG. 6, optionally, the intra prediction unit 106 may calculate an average of two neighbouring samples and uses the average as a reference sample. Optionally, the intra prediction unit 106 selects one from every two neighbouring samples as a reference sample. For example, in the example of step 601 in FIG. 6, the intra prediction unit 106 selects 4 reference samples from 8 above neighbouring samples of the current block, and another 4 reference samples from 8 left neighbouring samples of the current block.

Concrete process of step 601 is presented as follows.

The intra prediction unit 106 gets the width and height of the current block from the block partition unit 103, denoted as variables cbWidth and cbHeight, respectively. As an example, the intra prediction unit 106 invokes a rate distortion optimized mode determination method to determine an intra prediction mode, where the current block is partitioned into one or more transform blocks. Let variables nTbW and nTbH be the width and height of the transform block, respectively. When the MIP mode is used as the intra prediction mode to derive an intra prediction value of the current block, the intra prediction unit 106 determines the block size index value of MIP, i.e., a variable denoted by mipSizeId.

Optionally, the intra prediction unit 106 determines the value of mipSizeId as follows.

If both nTbW and nTbH are equal to 4, mipSizeId is set equal to 0.
   Otherwise, if either cbWidth or cbHeight is equal to 4, mipSizeId is set equal to 1.
   Otherwise, mipSizeId is set equal to 2.

Specifically, when size parameters of the current block are 8×8 (i.e., both cbWidth and cbHeight are equal to 8), mipSizeId is set equal to 2.

Optionally, the intra prediction unit 106 determines the value of mipSizeId as follows.

If both nTbW and nTbH are equal to 4, mipSizeId is set equal to 0.
   Otherwise, if either cbWidth or cbHeight is equal to 4, or both cbWidth and cbHeight are equal to 8, mipSizeId is set equal to 1
   Otherwise, mipSizeId is set equal to 2.

Specifically, when the size parameters of the current block are 8×8, mipSizeId is set equal to 1.

Furthermore, the intra prediction unit 106 derives values of boundarySize and predSize according to mipSizeId. Specifically, refer to the following.

If mipSizeId equal to 0, boundarySize is set equal to 2 and predSize is set equal to 4.
   Otherwise, if mipSizeId equal to 1, boundarySize is set equal to 4 and predSize is set equal to 4.
   Otherwise (if mipSizeId equal to 2), boundarySize is set equal to 4 and predSize is set equal to 8.

boundarySize represents a number of reference samples derived from each of the above neighbouring reference samples and the left neighbouring reference samples of the current block.

The intra prediction unit 106 may also derive a variable isTransposed to indicate an order of reference samples stored in a buffer pTemp. For example, isTransposed equal to 0 indicates that the intra prediction unit 106 presents the reference samples derived from the above neighbouring reference samples of the current block ahead of the reference samples derived from the left neighbouring reference samples; otherwise, isTransposed equal to 1 indicates that the intra prediction unit 106 presents the reference samples derived from the left neighbouring reference samples of the current block ahead of the reference samples derived from the above neighbouring reference samples. The value of isTransposed will be send to the entropy coding unit 115, as one of the parameters of the MIP mode that needs to be encoded and written into the bitstream.

The intra prediction unit 106 derives the value of inSize to indicate the number of reference samples used in the MIP mode, as illustrated in the above formula (1).

The intra prediction unit 106 invokes the following process to derive a group of reference samples (stored as an array p[x], for x being 0, . . . , inSize−1) using neighbouring reference samples of the current block.

The intra prediction unit 106 derives nTbW reference samples from the above neighbouring reference samples (e.g. stored in an array refT) of the current block and nTbH reference samples from the left neighbouring reference samples (e.g. stored in an array refL) of the current block. The intra prediction unit 106 invokes downsampling on refT to get boundarySize reference samples and stores the boundarySize reference samples in refT. The intra prediction unit 106 invokes downsampling on refL to get boundarySize reference samples and stores the boundarySize reference samples in refL.

The intra prediction unit 106 may also derive a variable isTransposed to indicate an order of reference samples stored in a buffer pTemp. For example, isTransposed equal to 0 (or FALSE) indicates that the intra prediction unit 106 presents the reference samples derived from the above neighbouring reference samples of the current block ahead of the reference samples derived from the left neighbouring reference samples; otherwise isTransposed equal to 1 (or TRUE) indicates that the intra prediction unit 106 presents the reference samples derived from the left neighbouring reference samples of the current block ahead of the reference samples derived from the above neighbouring reference samples. The intra prediction unit 106 can determine a value of isTransposed using a rate distortion optimization method, or based on the comparison of correlation between neighbouring reference samples and the current block. The value of isTransposed will be forward to the entropy coding unit 115, as one of the parameters of the MIP mode that needs to be encoded and written into the bitstream.

The intra prediction unit 106 puts elements in refT and refL into the buffer pTemp according to the order indicated by isTransposed.

Optionally, the intra prediction unit 106 derives p[x], where x=0, . . . , inSize−1, as follows.
   If mipSizeId is equal to 2, p[x]=pTemp[x+1]−pTemp[0].
   Otherwise (mipSizeId is less than 2), p[0]=pTemp[0]−(1<<(BitDepth−1)) and p[x]=pTemp[x]−pTemp[0].

BitDepth is a bit depth of a colour component of a sample in the current block. Herein, the colour component is one of RGB components, one of YUV components, or one of YCbCr component, for example Y component.

Optionally, the intra prediction unit 106 may derive p[x], where x=0, . . . , inSize−1, as follows.
   If mipSizeId is equal to 2, p[x]=pTemp[x+1]−pTemp[0].
   Otherwise (mipSizeId is less than 2), p[0]=(1<<(BitDepth−1))−pTemp[0] and p[x]=pTemp[x]−pTemp[0].

Optionally, the intra prediction unit 106 may derive the value of p[x] using a unified calculation method without determining the value of mipSizeId. For example, by appending (1<<(BitDepth−1)) as an additional element in the buffer pTemp, the intra prediction unit 106 calculates p[x] as pTemp[x+1]−pTemp[0].

Step 602, the intra prediction unit 106 derives the MIP prediction value of the current block using the group of reference samples and the MIP weighting matrix. The MIP weighting matrix is selected from a group of predefined MIP weighting matrices according to the MIP mode index value (denoted by ModeId) corresponding to the MIP mode and the block size index value (denoted by mipSizeId) of MIP.

The intra prediction unit 106 derives the MIP prediction value (denoted as predMip[x][y]) of partial prediction samples corresponding to one or more sample positions in the current block. In the example of step 602 in FIG. 6, the partial prediction samples are samples marked as grey squares in the current block. The input of the prediction module 601 is the reference samples p[x] derived in step 601. The prediction module 601 calculates the partial prediction samples using the MIP weighting matrix and the shifting parameter. Herein, the shifting parameter includes the shifting number parameter and the shifting offset parameter.

In a possible implementation, the prediction module 601 derives a prediction sample with its coordinate equal to (x, y), denoted by predMip[x][y]. The predMip[x][y] can be calculated according to formula (5) and formula (6).

In formula (5) or formula (6), mWeight[i][j] is the MIP weighting matrix in which matrix elements are pre-determined constants or adaptively updated using, for example, a training method, where input of the training method is one or more coded pictures or blocks or pictures from other bitstreams provided to the encoder 100 by external meanings; fO is the shifting offset parameter which is used to determine oW; sW is the shifting number parameter; p[i] is the MIP input sample values calculated using the reference samples; pTemp[0] represents the value corresponding to index 0 in the first temporal reference values; ">>" is a binary right shifting operator as defined in VVC. The intra prediction unit 106 may also forward mWeight[i][j] to the entropy coding unit 115 when the MIP mode is finally determined to perform intra prediction on the current block. The entropy coding unit 115 may write mWeight[i][j] into one or more data units in the bitstream.

The prediction unit 601 may determine the values of sW and fO according to the size of the current block and the MIP mode used for the current block. In one example, the prediction unit 601 obtains the values of sW and fO using a look-up table.

Optionally, the prediction unit 601 may determine sW using the above Table 4 and according to the size parameters of the current block and the MIP mode.

Optionally, the prediction unit 601 may also determine sW using the above Table 5 and according to the size parameters of the current block.

Optionally, the prediction module 601 may directly set sW equal to a constant value. For example, the prediction module 601 set sW equal to 5 for blocks of various size parameters and different MIP modes. Alternatively, the prediction module 601 set sW equal to 6 for blocks of various size parameters and different MIP modes. Alternatively, the prediction module 601 set sW equal to 7 for blocks of various size parameters and different MIP modes.

Optionally, the prediction unit 601 may determine fO using the above Table 6 and according to the size parameters of the current block and the MIP mode.

Optionally, the prediction unit 601 may also determine fO using the above Table 7 and according to the size parameters of the current block.

Optionally, the prediction module 601 may directly set fO equal to a constant value (for example, 0 to 100). For example, for blocks of various size parameters and different MIP modes, the prediction module 601 set fO equal to 32; alternatively, the prediction module 601 set fO equal to 46; alternatively, the prediction module 601 set fO equal to 56; alternatively, the prediction module 601 set fO equal to 66.

The intra prediction unit 106 may perform a clipping operation on the MIP prediction value in predMip. When isTransposed is equal to 1 (or TRUE), the predSize×predSize array predMip[x][y] (with x=0, . . . , predSize−1, y=0, . . . , predSize−1) is transposed as predTemp[y][x]=predMip[x][y] and then predMip=predTemp.

Exemplarily, optionally, when the size parameters of the current block are 8×8 (i.e., both cbWidth and cbHeight are equal to 8), the intra prediction unit 106 determines mipSizeId to be equal to 2 and derives an 8×8 predMip.

Optionally, when the size parameters of the current block are 8×8 (i.e., both cbWidth and cbHeight are equal to 8), the intra prediction unit 106 determines mipSizeId to be equal to 1 and derives an 4×4 predMip.

Step 603, the intra prediction unit 106 derives the intra prediction value of the current block (stored in an array as predSamples[x][y], with x=0, . . . , nTbW−1, y=0, . . . , nTbH−1) as below.

If the intra prediction unit 106 determines that nTbW is greater than predSize or nTbH is greater than predSize, the intra prediction unit 106 invokes an upsampling process to derive predSamples using predMip. The intra prediction unit 106 derives the prediction samples corresponding to remaining samples other than the partial samples in the current block. In FIG. 6, the intra prediction unit 106 can use a filtering module 602 to derive the prediction samples corresponding to remaining samples other than the partial samples in the current block. The input of the filtering module 602 is samples marked as grey squares in step 602. The filtering module 602 may use one or more interpolation filters to derive the prediction samples corresponding to remaining samples other than the partial samples in the current block using the input. For example, the input includes the reference samples and the partial prediction samples of one or more sample positions in the current block. Alternatively, the input includes the neighbouring samples and the partial prediction samples of one or more sample positions in the current block. Alternatively, the input includes the reference samples, the neighbouring samples and the partial prediction samples of one or more sample positions in the current block. For example, optionally, when the size parameters of the current block are 8×8 (i.e., both cbWidth and cbHeight are equal to 8), the intra prediction unit 106 determines mipSizeId to be equal to 1, and the intra prediction unit 106 applies the upsampling process to an 4×4 predMip to derive an 8×8 intra prediction block of the current block.

Otherwise, the intra prediction unit 106 sets the intra prediction block of the current block equal to the MIP prediction block of the current block, that is, sets predSamples[x][y] (with x=0, . . . , nTbW−1, y=0, . . . nTbH−1) equal to predMip[x][y]. For example, specifically, when the size parameters of the current block are 8×8 (i.e., both cbWidth and cbHeight are equal to 8), the intra prediction unit 106 determines mipSizeId to be equal to 2, and the intra prediction unit 106 derives predSamples for the current block with its size equal to 8×8 (i.e., both cbWidth and cbHeight are equal to 8).

As such, according to the block diagram of the procedure illustrated in FIG. 6, after step 603, the intra prediction unit 106 can obtain the intra prediction block of the current block (i.e., the CU), that is, determine the intra prediction value of at least one sample of the current block.

The prediction unit 102 outputs the intra prediction block of the current block. The first adder 107 calculates a difference, that is, residual block (i.e., residual CU), between the current block in the output of the partition unit 101 and the intra prediction block of the current block. The transform unit 108 reads the residual block and performs one or more transform operations on the residual block to get coefficients. The quantization unit 109 quantizes the coefficients and outputs quantized coefficients (i.e., levels).

The transform unit 108 performs a first transform, for example, integer transform which is originally designed based on DCT, on the residual block. The transform unit 108 determines whether a secondary transform is enabled to be applied on this block or not. When enabled, the transform unit 108 further determines whether to apply the secondary transform to the coefficients obtained after performing the first transform. The LFNST is an example of the secondary transform.

Figure 7:
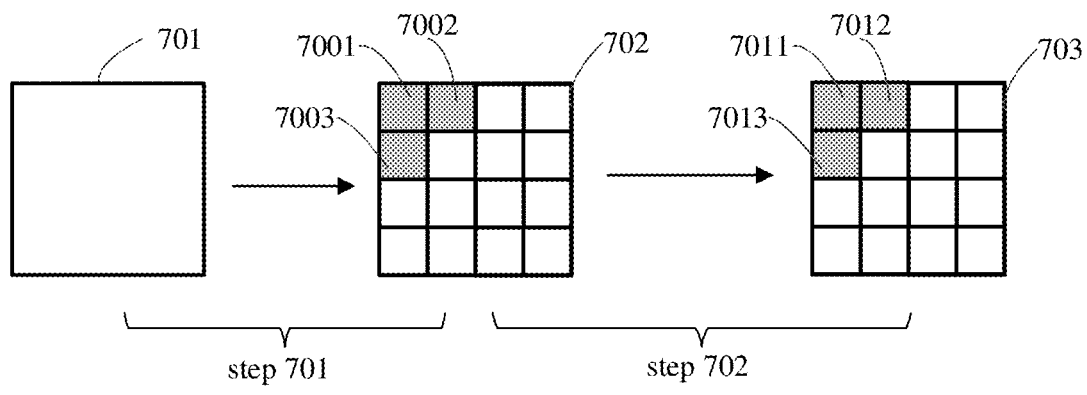
FIG. 7 is a diagram of a procedure of performing a low-frequency non-separable transform (LFNST) provided in embodiments of the present application.

Referring to FIG. 7, it illustrates a diagram of a procedure of performing an LFNST provided in embodiments of the present application. In FIG. 7, the block 701 represents the residual block.

Step 701, the transform unit 108 performs a first transform (i.e., a core transform), for example, integer transform which is originally designed based on DCT, on the block 701 to get the block 702 containing transform coefficients corresponding to the first transform (referred to as "first transform coefficients").

Step 702, the transform unit 108 determines whether it is allowed or enabled to perform a secondary transform, e.g. LFNST, on all or partial first transform coefficients in the block 702.

Exemplarily, optionally, if the intra prediction mode of the transform block containing the LFNST is the MIP mode and the minimum value of a width and a height of the transform block is greater than or equal to 8, the transform unit 108 is allowed or enabled to perform the LFNST on the transform block.

Optionally, if the intra prediction mode of the transform block containing the LFNST is the MIP mode and the value of mipSizeId is equal to a preset value (e.g., 2) or one of multiple preset values (e.g., 1, 2), the transform unit 108 is allowed or enabled to perform the LFNST on the transform block.

When the transform unit 108 is allowed or enabled to perform the LFNST on the transform block, the transform unit 108 determines the LFNST parameter, for example, lfnst_index. When lfnst_index is equal to 0, it is indicated that the transform unit 108 does not perform the LFNST on the transform block. When lfnst_index is greater than 0, it is indicated that a transform kernel in the LFNST transform kernel candidate set is used to perform the LFNST on the transform block.

The transform unit 108 may employ a traditional rate distortion optimization method to determine the value of lfnst_index. First, the transform unit 108 derives a first cost result without performing the LFNST on the transform block.

The transform unit 108 selects the LFNST transform kernel candidate set according to the MIP parameter. The MIP parameter may include at least one of the MIP mode index value (i.e., modeId) and the MIP transposition indication parameter (i.e., isTransposed).

The transform unit 108 sets the value of the variable predModeIntra equal to the value of modeId. The transform unit 108 selects a part of the first transform coefficients in the block 702, for example, coefficients in sub-blocks 7001, 7002, and 7003, and determines the transform kernel for performing the LFNST on the coefficients on the sub-blocks. A size of the sub-block may be a preset value, for example, 8×8. The transform unit 108 determines the index value (i.e., lfnstTrSetIdx) of the LFNST transform kernel candidate set according to the value of predModeIntra. For block coding in the MIP mode, the transform unit 108 can employ the look-up table as in Table 10 to get the value of lfnstTrSetIdx.

The transform unit 108 may employ a traditional rate distortion optimization method to determine the value of lfnst_index (i.e., this value being greater than 0 indicates that the transform kernel used in the LFNST transform kernel candidate set is indicated by lfnstTrSetIdx). The transform unit 108 sets the value of lfnst_index to be the index of the transform kernel in the LFNST transform kernel candidate set, which results in a minimum value of a cost function, and also gets the second cost result.

If the first cost result is greater than the second cost result, the transform unit 108 determines to perform the LFNST on the transform block, and sends lfnst_index indicating the index of the transform kernel to the entropy coding unit 115. Otherwise, the transform unit 108 determines not to perform the LFNST on the transform block, sets lfnst_value equal to 0, and sends lfnst_index indicating not performing the LFNST to the entropy coding unit 115.

When lfnst_index is not equal to 0, the transform unit 108 performs the LFNST on the transform block with coefficients from sub-blocks 7001, 7002 and 7003, obtains LFNST coefficients and puts the LFNST coefficients in sub-blocks 7011, 7012 and 7013 in block 703. Let d[x][y], with x=0, . . . , nTbW−1, y=0, . . . , nTbH−1, where nTbW and nTbH is a width and a height of the block 703 respectively, be a block of first transform coefficients. Let v[x], with x=0, . . . , nLfnstOutSize−1, where nLfnstOutSize= (nTbW>=8 && nTbH>=8)? 48:16, be a block of LFNST coefficients.

Optionally, the transform unit 108 employs the following instruction to get a block 703 of transform coefficients and passes the block 703 of LFNST coefficients in d[x][y] to the quantization unit 109, as specifically described in the above formula (8). log2LfnstSize is determined according to the above formula (9).

Optionally, when isTransposed is equal to 0, the transform unit 108 employs the following instruction to get a block 703 of LFNST coefficients and passes the block 703 of LFNST coefficients in d[x][y] to the quantization unit 109, as specifically described in the above formula (10).

When isTransposed is equal to 1, the transform unit 108 employs the following instruction to get a block 703 of LFNST coefficients and passes the block 703 of LFNST coefficients in d[x][y] to the quantization unit 109, as specifically described in the above formula (11).

Optionally, when isTransposed is equal to 1, the transform unit 108 employs the following instruction to get a block 703 of LFNST coefficients and passes the block 703 of LFNST coefficients in d[x][y] to the quantization unit 109, as specifically described in the above formula (10).

When isTransposed is equal to 0, the transform unit 108 employs the following instruction to get a block 703 of LFNST coefficients and passes the block 703 of LFNST coefficients in d[x][y] to the quantization unit 109, as specifically described in the above formula (11).

log2LfnstSize is determined according to the above formula (9).

Furthermore, the transform unit 108 may also determine the value of lfnst_index for a transform block encoded in traditional intra prediction modes, (i.e., angular intra prediction, DC mode, and PLANAR mode). Similar to the rate distortion optimization method applied to determining the value of lfnst_value for the transform block in the MIP mode, the first cost result is determined without performing the LFNST on the transform block.

The transform unit 108 determines the value of lfnstTrSetIdx according to a value of mode index (assigned to predModeIntra) of the traditional intra prediction mode using a look-up table, that is, determines the LFNST transform kernel candidate set selected for the current block, as specifically illustrated in the above Table 11.

Then, the transform unit 108 may employ a traditional rate distortion optimization method to determine the value of lfnst_index (i.e., this value being greater than 0 indicates that the transform kernel in the LFNST transform kernel candidate set is indicated by lfnstTrSetIdx). The transform unit 108 sets the value of lfnst_index to be the index of the transform kernel in the LFNST transform kernel candidate set, which results in a minimum value of a cost function, and also gets the second cost result.

If the first cost result is greater than the second cost result, the transform unit 108 determines to perform the LFNST on the transform block, and sends lfnst_index indicating the index of the transform kernel to the entropy coding unit 115. Otherwise, the transform unit 108 determines not to perform the LFNST on the transform block, sets lfnst_value equal to 0, and sends lfnst_index indicating not performing the LFNST to the entropy coding unit 115.

When lfnst_index is not equal to 0, the transform unit 108 performs the LFNST on the transform block with coefficients from sub-blocks 7001, 7002, and 7003, obtains LFNST coefficients and puts the LFNST coefficients in sub-blocks 7011, 7012, and 7013 in block 703. Let d[x][y], with x=0, . . . , nTbW−1, y=0, . . . , nTbH−1, where nTbW and nTbH is a width and a height of block 401 respectively, be a block of first transform coefficients. Let v[x], with x=0, . . . , nLfnstOutSize−1, where nLfnstOutSize= (nTbW>=8 && nTbH>=8)? 48:16, be a block of LFNST coefficients.

Optionally, when predModeIntra is less than or equal to 34, the transform unit 108 employs the following instruction to get a block 703 of LFNST coefficients and passes the block 703 of LFNST coefficients in d[x][y] to the quantization unit 109, as specifically described in the above formula (10).

When predModeIntra is greater than 34, the transform unit 108 employs the following instruction to get a block 703 of LFNST coefficients and passes the block 703 of LFNST coefficients in d[x][y] to the quantization unit 109, as specifically described in the above formula (11).

Optionally, when predModeIntra is greater than 34, the transform unit 108 employs the following instruction to get a block 703 of LFNST coefficients and passes the block 703 of LFNST coefficients in d[x][y] to the quantization unit 109, as specifically described in the above formula (10).

When predModeIntra is less than or equal to 34, the transform unit 108 employs the following instruction to get a block 703 of LFNST coefficients and passes the block 703 of LFNST coefficients in d[x][y] to the quantization unit 109, as specifically described in the above formula (11).

log2LfnstSize is determined according to the above formula (9).

Furthermore, the inverse quantization unit 110 performs scaling operations on the quantized coefficients to output reconstructed coefficients. The inverse transform unit 111 performs one or more inverse transforms corresponding to the transforms in the transform unit 108 and output reconstructed residual. The second adder 112 calculates the reconstructed CU by adding the reconstructed residual and the intra prediction block of the current block from the prediction unit 102. The second adder 112 also forwards its output to the prediction unit 102 to be used as a reference for intra prediction.

Output of the filtering unit 113 is a decoded picture or sub-picture, which is forwarded to the DPB unit 114. The DPB unit 114 outputs decoded pictures according to timing and control information. Pictures stored in the DPB unit 114 may also be employed as a reference for performing inter or intra prediction by the prediction unit 102.

The entropy coding unit 115 converts parameters from units in encoder 100 (that are necessary for deriving decoded picture) as well as control parameters and supplemental information into binary representations, and writes such binary representations according to syntax structure of each data unit into a generated bitstream (or called "video bitstream"), as specifically illustrated in Table 9A and Table 9B.

Using the syntax structure in Table 9A, the entropy coding unit 115 encodes lfnst_index of the coding unit using the MIP mode when the minimum value of width and height of the transform block in this coding unit is greater than or equal to 8 (that is, both width and height are greater than or equal to 8). Another optional condition could be set as that: both the width and height is greater than or equal to a first value (e.g. 8) and a sum of the width and height is greater than or equal to a second value (e.g. 16).

Using the syntax structure in Table 9B, the entropy coding unit 115 encodes lfnst_index of the coding unit using the MIP mode when mipSizeId of the coding unit is equal to 2. Another optional condition could be set as that: mipSizeId of the coding unit is equal to one of multiple values (e.g., 1 and 2).

Figure 8:
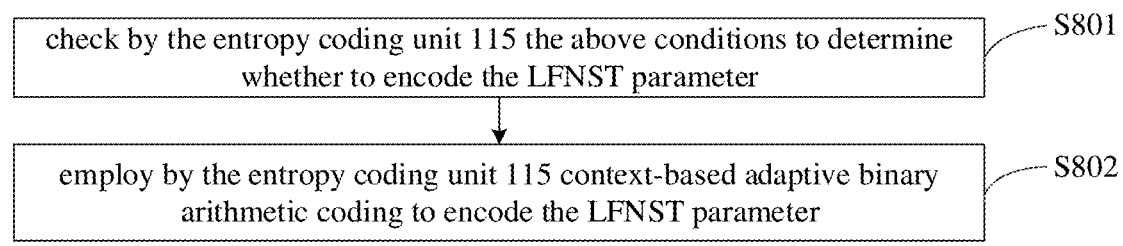
FIG. 8 is a schematic flowchart of encoding an LFNST parameter provided in embodiments of the present application.

Referring to FIG. 8, it illustrates a schematic flowchart of encoding an LFNST parameter provided in embodiments of the present application. As illustrated in FIG. 8, the procedure includes the following.

S801, the entropy coding unit 115 checks the above conditions to determine whether to encode the LFNST parameter.

S802, the entropy coding unit 115 employs context-based adaptive binary arithmetic coding to encode the LFNST parameter.

It should be noted that, in S801, the entropy coding unit 115 checks to determine the LFNST parameter, for example, the value of lfnst_index, and then in S802, the CABAC with the descriptor "ae(v)" as illustrated in Table 9A and Table 9B can be employed to encode the value of lfnst_index.

In embodiments of the present application, the encoder 100 could be a computing device with a processor and a storage medium recording an encoding program. When the processor reads and executes the encoding program, the encoder 100 reads an input video and generates a corresponding bitstream. Furthermore, the encoder 100 could be a computing device with one or more chips. The units, implemented as integrated circuits, on the chip are of similar functionalities with similar connections as well as data exchange as the corresponding units in FIG. 1.

The encoding method is provided in embodiments of the present application. The prediction parameter of the current block is determined, where the prediction parameter includes the prediction mode parameter; when the prediction mode parameter indicates that the MIP mode is used to determine the intra prediction value of the chroma component of the current block, the neighbouring sample values of the current block are obtained and the MIP input sample values of the current block are determined according to the neighbouring sample values of the current block; the MIP prediction value of the chroma component of the current block is determined according to the MIP input sample values, the MIP weighting matrix, and the shifting parameter; the intra prediction value of the chroma component of the current block is determined by filtering the MIP prediction value; the prediction residual value of the chroma component of the current block is determined according to the intra prediction value of the chroma component of the current block; the LFNST parameter is determined by performing the LFNST on the prediction residual value; and the LFNST parameter is encoded and the encoded LTNST parameter is signalled into the bitstream. In this way, for the MIP mode, in addition to ensuring encoding performance, complexity can be reduced, a storage space required in the encoding process can be reduced, and encoding efficiency can be effectively improved. Furthermore, when the LFNST technology is applied to MIP mode prediction, due to introduction of the MIP parameter, the LFNST can be more flexible, and the encoding efficiency can be further improved.

Figure 9:
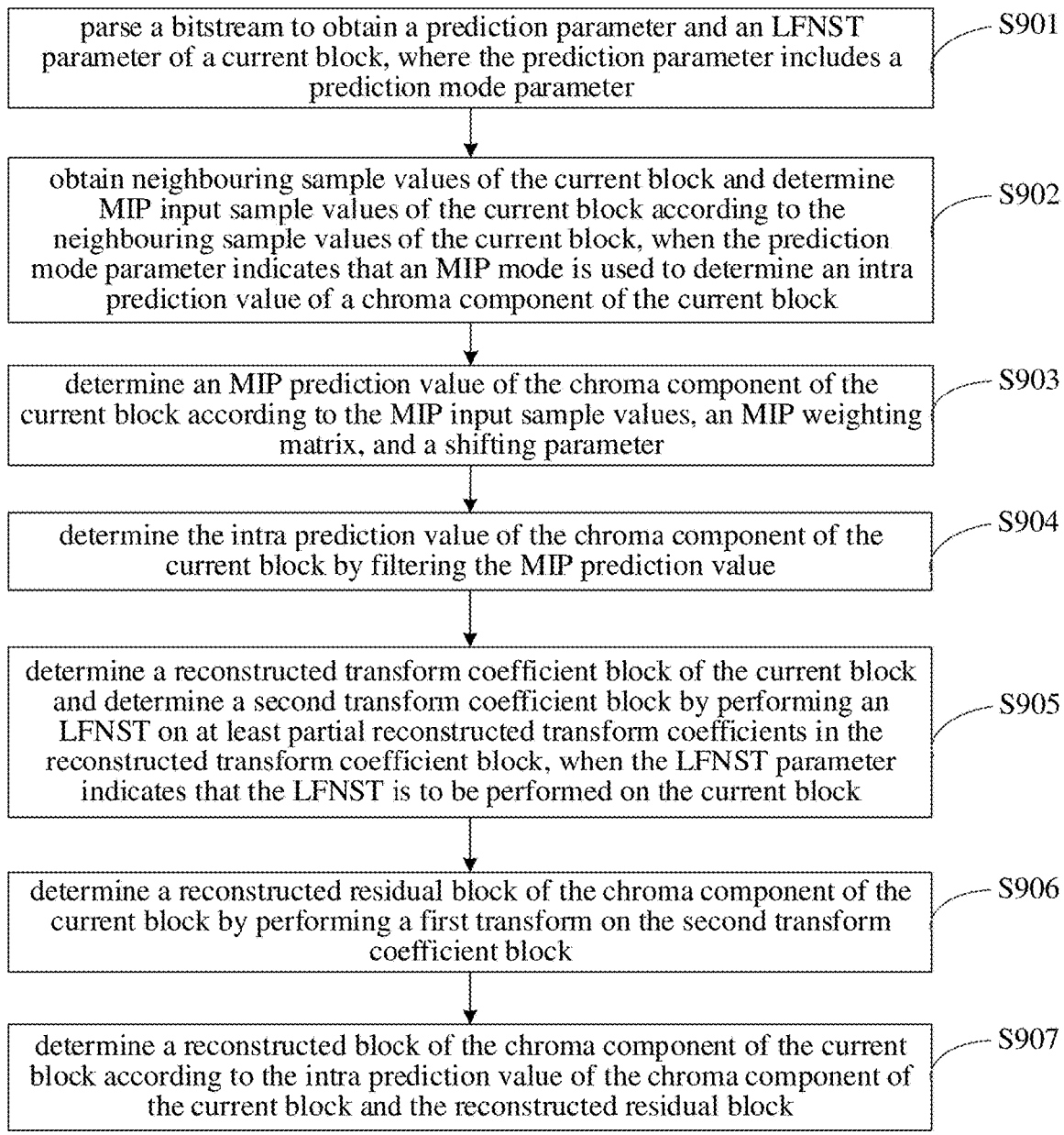
FIG. 9 is a schematic flowchart of a decoding method provided in embodiments of the present application.

In another embodiment of the present application, referring to FIG. 9, it illustrates a schematic flowchart of a decoding method provided in embodiments of the present application. As illustrated in FIG. 9, the method includes the following.

S901, a bitstream is parsed to obtain a prediction parameter and an LFNST parameter of a current block, where the prediction parameter includes a prediction mode parameter.

It should be noted that, a picture to be decoded can be partitioned into multiple picture blocks, and each picture block to be decoded can be called a decoding block. Herein, each decoding block may include a first colour component, a second colour component, and a third colour component. The current block is a decoding block in the picture of the video for which prediction of the first colour component, the second colour component, or the third colour component is currently to be performed.

It should also be noted that, the prediction parameter may include the prediction mode parameter, where the prediction mode parameter is used to indicate the prediction mode adopted by the current block and different prediction modes correspond to different prediction mode parameters. The prediction mode generally includes an inter prediction mode, a conventional intra prediction mode, and a non-traditional intra prediction mode. The traditional intra prediction mode may include a DC mode, a PLANAR mode, an angular intra prediction mode, and the like. The non-traditional intra prediction mode may include an MIP mode, a CCLM mode, an IBC mode, and a PLT mode. That is, the encoder will select the optimal prediction mode to encode the current block. In this process, the prediction mode of the current block can be determined, and correspondingly the prediction mode parameter can be obtained. Thereafter, the prediction parameter including the prediction mode parameter is written into the bitstream and transmitted from the encoder to the decoder.

In this way, in the decoder, the prediction parameter of the current block can be obtained by parsing the bitstream, and the prediction mode parameter included in the prediction parameter obtained through parsing can be used to determine whether the MIP mode is used for the current block.

S902, neighbouring sample values of the current block are obtained and MIP input sample values of the current block are determined according to the neighbouring sample values of the current block, when the prediction mode parameter indicates that an MIP mode is used to determine an intra prediction value of a chroma component of the current block.

It should be noted that, for the current block, in embodiments of the present application, the MIP mode is used to perform intra prediction on the chroma component of the current block. In this process, the neighbouring sample values of the current block are acquired and then the MIP input sample values of the current block are determined according to the neighbouring sample values of the current block.

The neighbouring sample values of the current block can include left neighbouring sample values and above neighbouring sample values of the current block. That is, according to the left neighbouring sample values and above neighbouring sample values of the current block, the MIP input sample values of the current block can be determined.

In some embodiments, the MIP input sample values of the current block can be determined according to the neighbouring sample values of the current block as follows.

A block size index value of the current block is determined according to the size parameters of the current block.

First temporal reference values are obtained by down-sampling the neighbouring sample values of the current block.

When the block size index value of the current block is within a preset range, a second constant value is determined according to a bit depth of the neighbouring sample values of the current block, a value corresponding to index 0 in the MIP input sample values is set to be a difference between the second constant value and a value corresponding to index 0 in the first temporal reference values, and a value corresponding to index i in the MIP input sample values is set to be a difference between a value corresponding to index i in the first temporal reference values and the value corresponding to the index 0 in the first temporal reference values, where i is an integer greater than 0.

A value corresponding to index j in the MIP input sample values is set to be a difference between a value corresponding to index (j+1) in the first temporal reference values and the value corresponding to the index 0 in the first temporal reference values, when the block size index value of the current block is beyond the preset range, where j is an integer greater than or equal to 0.

Furthermore, when the block size index value of the current block is within the preset range, the method can further include the following.

The second constant value is determined according to the bit depth of the neighbouring sample values of the current block. The value corresponding to the index 0 in the MIP input sample values is set to be a difference between the value corresponding to the index 0 in the first temporal reference values and the second constant value. The value corresponding to the index i in the MIP input sample values is set to be the difference between the value corresponding to the index i in the first temporal reference values and the value corresponding to the index 0 in the first temporal reference values, where i is an integer greater than 0.

It should be noted that, after the neighbouring sample values of the current block are filtered (e.g., downsampled), the first temporal reference values are obtained. Herein, for the first temporal reference values, specifically, the filtered neighbouring sample values can be buffered to a buffer (represented by pTemp). The value corresponding to the index 0 in the first temporal reference values refers to pTemp[0], and the value corresponding to the index i in the first temporal reference values refers to pTemp[i].

In embodiments of the present application, in addition to the prediction mode parameter, the prediction parameter can further include size parameters of the current block. The size parameters of the current block can include the width (denoted by nTbW) and the height (denoted by nTbH) of the current block. Furthermore, according to the size parameters of the current block, the block size index value (i.e., mipSizeId) can be determined.

It should also be noted that, according to whether the block size index value (represented by mipSizeId) of the current block is within the preset range, it can be determined whether the values of the size parameters of the current block are within the preset range. Specifically, when mipSizeId=0 or 1, it indicates that the block size index value of the current block is within the preset range, that is, the values of the size parameters of the current block are within the preset range; when mipSizeId=2, it indicates that the block size index value of the current block is beyond the preset range, that is, the values of the size parameters of the current block are not within the preset range.

That is, the MIP input sample values are determined by the buffer (represented by pTemp), the block size index value (represented by MipSizeId) of the current block, and the bit depth (represented by BitDepth) of neighbouring sample values of the current block, and the number of input samples contained in the MIP input sample values is only related to the block size index value of the current block. Finally, a value corresponding to index x in the MIP input sample values (represented by p[x]) can be obtained.

Furthermore, in some embodiments, the second constant value is determined according to the bit depth of the neighbouring sample values of the current block as follows.

The second constant value is set to be an exponential power of 2, where the exponential is an integer and equal to the bit depth of the neighbouring sample values of the current block minus one.

Alternatively, in some embodiments, the second constant value is determined according to the bit depth of the neighbouring sample values of the current block as follows.

The second constant value is determined by binary left-shifting of "1", where the number of left shifted bits is equal to the bit depth of the neighbouring sample values of the current block minus one.

That is, after the bit depth (represented by BitDepth) of the neighbouring sample values of the current block is obtained, the second constant value may be represented as 1<<(BitDepth−1) or 2^(BitDepth−1). In this way, in the case where the values of the size parameters of the current block are within the preset range, the MIP input sample values of the current block can be determined by further considering the second constant value.

It should also be noted that, the MIP input samples are a matrix vector used for the matrix multiplication operation. The current related technical solutions are as follows.

According to the buffer (represented by pTemp), the type of the current block (i.e., the block size index value of the current block, represented by mipSizeId), the bit depth of the neighbouring sample values of the current block (represented by BitDepth), and the number of MIP input samples, the value corresponding to the index x (represented by p[x]) in the MIP input sample values is finally obtained.

In a possible implementation, if mipSizeId=0 or 1, 1<<(BitDepth−1) minus pTemp[0] is used as p[0]; if x is not equal to 0, pTemp[x] minus pTemp[0] is used as p[x]. Specifically, refer to the above formula (2).

In another possible implementation, if mipSizeId=0 or 1, pTemp[0] minus 1<<(BitDepth−1) is used p[0]; if x is not equal to 0, pTemp[x] minus pTemp[0] is used as p[x]. Specifically, refer to the above formula (3).

In yet another possible implementation, if mipSizeId=2, pTemp[x+1] minus pTemp[0] is used as p[x]. Specifically, refer to the above formula (4).

In addition, in embodiments of the present application, the value of p[x] can also be obtained in a unified calculation method, without determining the value of mipSizeId. In this case, in embodiments of the present application, (1<<(BitDepth−1)) is appended to the end of the buffer pTemp as an additional element, and p[x] can be directly set equal to pTemp[x+1]−pTemp[0], x=0, . . . , inSize−1.

As such, after the MIP input sample values of the current block are determined according to the neighbouring sample values of the current block, an MIP prediction value of the current block can be further determined.

S903, an MIP prediction value of the chroma component of the current block is determined according to the MIP input sample values, an MIP weighting matrix, and a shifting parameter.

The MIP prediction value is prediction values of partial samples in the chroma component of the current block.

It should be noted that, the shifting parameter includes a shifting offset parameter and a shifting number parameter. In this case, for S903, the MIP prediction value of the chroma component of the current block is determined according to the MIP input sample values, the MIP weighting matrix, and the shifting parameter as follows.

A product of the shifting offset parameter and a sum of the MIP input sample values is determined according to a value of the shifting offset parameter, where the value of the shifting offset parameter is a fixed constant.

A first constant value is determined according to a value of the shifting number parameter.

A value of a first offset is set to be a difference between the first constant value and the product.

The MIP weighting matrix of the current block is determined according to the prediction parameter.

The MIP prediction value of the chroma component of the current block is determined according to the MIP weighting matrix, the MIP input sample values, the shifting number parameter, and the first offset.

It should be noted that, the shifting offset parameter may also be referred to as a shifting compensation parameter or an offset factor, which may be represented by fO. In embodiments of the present application, the value of the shifting offset parameter may be set to be a fixed constant, such as 32, 46, 56, or 66, and the like. The value of the shifting offset parameter can also be set to be related to a shifting offset parameter table, and the value of the shifting offset parameter can be determined through a look-up table, which is not limited herein.

It should be noted that, the shifting number parameter may also be referred to as a shifting factor, the number of shifted bits, or a weight shifting value, etc., and may be represented by sW, shift, or weight shift. In embodiments of the present application, the shifting number parameter is represented by sW. In embodiments of the present application, the value of the shifting number parameter can be set to be a fixed constant, for example 5, 6, or 7. The value of the shifting number parameter can also be set to be related to a shifting number parameter table, and the value of the shifting number parameter can be determined through a look-up table, which is not limited herein.

In addition, the first offset may be represented by oW, and the first offset is related to both the shifting number parameter and the shifting offset parameter.

It should be understood that, the prediction parameter may include the prediction mode parameter and the size parameters of the current block. When the prediction mode parameter indicates that the MIP mode is used to determine the intra prediction value of the chroma component of the current block, a weighting matrix table may be established in advance and stored in a memory or a storage unit. The memory or storage unit herein can be integrated in the encoder, or can also be provided separately. In this way, according to the block size index value (mipSizeId) and the MIP mode index value (modeId) of the current block, the MIP weighting matrix (or referred to as the MIP weight matrix, or also referred to as the MIP matrix) that needs to be used for the current block can be determined through a look-up table, which is represented by mWeight[x][y].

It should also be noted that, in the decoder, the shifting number parameter table may be established in advance and stored in a memory or a storage unit. The memory or storage unit herein can be integrated in the decoder, or can also be provided separately. In embodiments of the present application, the shifting number parameter (sW) can be determined in the following methods.

In a possible implementation, for different block size index values and different MIP mode index values, the shifting number parameters may be different. In some embodiments, the method may further include the following.

When the MIP mode is used to determine the intra prediction value of the chroma component of the current block, the bitstream is parsed to obtain the MIP mode index value of the current block.

According to the MIP mode index value, a value corresponding to the MIP mode index value is queried from a first preset look-up table, where the first preset look-up table is used to record a correspondence between MIP mode index values and values of the shifting number parameter.

The queried value is determined as the value of the shifting number parameter.

It should be noted that, the value of the shifting number parameter can be queried according to the block size index value (represented by mipSizeId) and the MIP mode index value (modeId) of the current block. In the first preset look-up table illustrated in the above Table 4, for different mipSizeId and modeId, the shifting number parameter required in matrix multiplication can be determined through the look-up table.

However, at the decoder side, Table 4 needs to be stored into the memory or the storage unit in the form of a look-up table. However, storage comes at a cost, and so does the lookup process. Since the value of the shifting factor in Table 4 is related to both the block size and the MIP mode index value of the current block, the memory occupation is increased, and the computational complexity is also increased.

To reduce memory occupation and reduce computational complexity, in embodiments of the present application, the method for determining the shifting factor can be simplified.

In another possible implementation, the value of the shifting number parameter can be set to be a fixed constant, which is independent of the block size index value and the MIP mode index value. For example, for different block size index values and different MIP mode index values, the value of the shifting number parameter may be set to be 5. Alternatively, for different block size index values and different MIP mode index values, the value of the shifting number parameter may be set to be 6. Alternatively, for different block size index values and different MIP mode index values, the value of the shifting number parameter may be set to be 7. In embodiments of the present application, preferably, the value of the shifting number parameter is equal to 6, which is not limited herein.

In yet another possible implementation, for the value of the shifting number parameter, the method further includes the following.

The block size index value of the current block is determined according to the size parameters of the current block.

The value of the shifting number parameter is determined according to the block size index value of the current block.

It should be noted that, according to the size parameters of the current block, the block size index value of the current block can be determined. In a possible implementation, the block size index value of the current block is determined according to the size parameters of the current block as follows.

The block size index value of the current block is set to be 0 when both a width and a height of the current block are equal to 4.

The block size index value of the current block is set to be 1 when both the width and the height of the current block are equal to 8 or one of the width and the height of the current block is equal to 4.

The block size index value of the current block is set to be 2 when the width and the height of the current block do not satisfy the above conditions.

As such, after the block size index value of the current block is determined, the value of the shifting number parameter can be further determined according to the block size index value of the current block.

Optionally, in some embodiments, the value of the shifting number parameter is determined according to the block size index value of the current block as follows.

When the block size index value is respectively equal to 0, 1, or 2, the value of the shifting number parameter corresponding to the block size index value of the current block is determined to be equal to 5, 6, or 5 respectively.

Optionally, in some embodiments, the value of the shifting number parameter is determined according to the block size index value of the current block as follows.

The value of the shifting number parameter is set equal to a ratio of the width or height of the current block to a first preset value corresponding to the block size index value of the current block.

Herein, the first preset value represents the number of the MIP input sample values obtained from the boundary of the current block. In this case, the method may also include the following.

When the block size index value of the current block is respectively equal to 0, 1, or 2, the first preset value corresponding to the block size index value of the current block is determined to be equal to 2, 4, or 4, respectively.

That is, when the first preset value represents the number of the MIP input sample values obtained from the boundary of the current block, if the block size index value of the current block is equal to 0, then the first preset value is equal to 2; if the block size index value of the current block is equal to 1, then the first preset value is equal to 4; if the block size index value of the current block is equal to 2, then the first preset value is equal to 4. As such, the value of the shifting number parameter can be determined according to the ratio of the width or height of the current block to the first preset value.

Optionally, in some embodiments, the value of the shifting number parameter is determined according to the block size index value of the current block as follows.

The value of the shifting number parameter is set equal to a ratio of the width or height of the current block to a second preset value corresponding to the block size index value of the current block.

Herein, the second preset value represents the size of the MIP prediction block of the current block obtained by directly using the MIP weighting matrix. In this case, the method may also include the following.

When the block size index value of the current block is equal to 0, 1, or 2, respectively, the second preset value corresponding to the block size index value of the current block is determined to be equal to 4, 4, or 8, respectively.

That is, when the second preset value represents the size of the MIP prediction block of the current block obtained by directly using the MIP weighting matrix, if the block size index value of the current block is equal to 0, then the second preset value equals 4; if the block size index value of the current block is equal to 1, then the second preset value is equal to 4; if the block size index value of the current block is equal to 2, then the second preset value is equal to 8. As such, the value of the shifting number parameter can be determined according to the ratio of the width or height of the current block to the second preset value.

In yet another possible implementation, the shifting number parameter table can be minimized, and the value of the shifting number parameter is still determined by means of a look-up table. Optionally, in some embodiments, the value of the shifting number parameter is determined according to the block size index value of the current block as follows.

According to the block size index value, a value corresponding to the block size index value is queried from a second preset look-up table, where the second preset look-up table is used to record a correspondence between block size index values and values of the shifting number parameter.

The queried value is determined as the value of the shifting number parameter.

It should be noted that, the value of the shifting number parameter can be queried only according to the block size index value (represented by mipSizeId) of the current block. In the second preset look-up table illustrated in Table 5, each block size index value can correspond to a fixed value. That is, the size of each block or the size set of each block may have a fixed value of the shifting number parameter as illustrated in Table 5.

According to the above Table 5, when the block size index value of the current block is respectively equal to 0, 1, or 2, the value of the shifting number parameter corresponding to the block size index value is respectively equal to 5, 6, or 5.

As such, by simplifying the method for determining the shifting number parameter, especially minimizing the shifting number parameter table or fixing the value of the shifting number parameter, the storage of the look-up table can be minimized. Thus, the memory occupied for storing the shifting factor table in the MIP mode can be reduced without increasing the computational complexity.

Furthermore, in the decoder, a shifting offset parameter table may be established in advance and stored in the memory or the storage unit. The memory or storage unit herein can be integrated in the decoder, or can also be provided separately. In embodiments of the present application, the shifting offset parameter (fO) can be determined in the following methods.

In a possible implementation, for different block size index values and different MIP mode index values, the shifting offset parameters may be different. In some embodiments, the method may further include the following.

When the MIP mode is used to determine the intra prediction value of the chroma component of the current block, the bitstream is parsed to determine the MIP mode index value of the current block.

According to the MIP mode index value, a value corresponding to the MIP mode index value is queried from a third preset look-up table, where the third preset look-up table is used to record a correspondence between MIP mode index values and values of the shifting offset parameter.

The queried value is determined as the value of the shifting offset parameter.

It should be noted that, the value of the shifting offset parameter can be queried according to the block size index value (represented by mipSizeId) and the MIP mode index value (modeId) of the current block. In the third preset look-up table illustrated in Table 6, for different mipSizeId and modeId, the shifting offset parameter required in matrix multiplication can be determined through a look-up table.

However, at the decoder side, Table 6 needs to be stored into the memory or the storage unit in the form of a look-up table. However, storage comes at a cost, and so does the lookup process. Since the value of the shifting offset parameter in Table 6 is related to both the block size and the MIP mode index value of the current block, the memory occupation is increased, and the computational complexity is also increased.

To reduce memory occupation and reduce computational complexity, in embodiments of the present application, the method for determining the shifting offset parameter can also be simplified.

In another possible implementation, the value of the shifting offset parameter can be set to be a fixed constant, which is independent of the block size index value and the MIP mode index value. Generally, the fix constant is in a range of 0-100. For example, for different block size index values and different MIP mode index values, the value of the shifting offset parameter may be set to be 32. Alternatively, for different block size index values and different MIP mode index values, the value of the shifting offset parameter may be set to be 46. Alternatively, for different block size index values and different MIP mode index values, the value of the shifting offset parameter may be set to be 56. Alternatively, for different block size index values and different MIP mode index values, the value of the shifting offset parameter may be set to be 66. In embodiments of the present application, preferably, the value of the shifting offset parameter is set equal to 32, which is not limited herein.

In yet another possible implementation, for the value of the shifting offset parameter, the method further includes the following.

The block size index value of the current block is determined according to the size parameters of the current block.

The value of the shifting offset parameter is determined according to the block size index value of the current block.

It should be noted that, according to the size parameters of the current block, the block size index value of the current block can be determined. Thereafter, according to the block size index value of the current block, the value of the shifting offset parameter can be further determined.

Optionally, in some embodiments, the value of the shifting offset parameter is determined according to the block size index value of the current block as follows.

When the block size index value is respectively equal to 0, 1, or 2, the value of the shifting offset parameter corresponding to the block size index value of the current block is determined to be equal to 34, 23, or 46 respectively.

Optionally, in some embodiments, the shifting offset parameter table can be minimized, and the shifting factor is also determined by means of a look-up table. Optionally, in some embodiments, the value of the shifting offset parameter is determined according to the block size index value of the current block as follows.

According to the block size index value, a value corresponding to the block size index value is queried from a fourth preset look-up table, where the fourth preset look-up table is used to record a correspondence between block size index values and values of the shifting offset parameter.

The queried value is determined as the value of the shifting offset parameter.

It should be noted that, the value of the shifting offset parameter can be queried only according to the block size index value (represented by mipSizeId) of the current block. In the fourth preset look-up table illustrated in the above Table 7, each block size index value can correspond to a fixed value. That is, the size of each block or the size set of each block may have a fixed value of the shifting offset parameter as illustrated in Table 7.

According to the above Table 7, when the block size index value of the current block is respectively equal to 0, 1, or 2, the value of the shifting offset parameter corresponding to the block size index value is respectively equal to 34, 23, or 46.

As such, by simplifying the method for determining the shifting offset parameter, especially minimizing the shifting offset parameter table or fixing the value of the shifting offset parameter, the storage of the look-up table can be minimized. Thus, the memory occupied for storing the shifting offset parameter table in the MIP mode can be reduced without increasing the computational complexity.

As such, after the shifting offset parameter (fO) and the shifting number parameter (sW) are determined, for the first constant value, optionally, in some embodiments, the first constant value is determined according to the value of the shifting number parameter as follows.

The first constant value is set to be an exponential power of 2, where the exponential is an integer and equal to the value of the shifting number parameter minus one.

Optionally, in some embodiments, the first constant value is determined according to the value of the shifting number parameter as follows.

The first constant value is determined by binary left-shifting of "1", where the number of left shifted bits is equal to the value of the shifting number parameter minus one.

That is, after the shifting number parameter (sW) is obtained, the first constant value can be denoted as 1<<(sW−1) or denoted as 2^(sW−1). In this case, when the value of the shifting number parameter is set to be 6, the first constant value is equal to 32.

Herein, if the first offset is denoted by oW, according to the shifting offset parameter (fO), the product of the shifting offset parameter and the sum of the MIP input sample values can be obtained, i.e., fO×($\Sigma_{i=0}^{inSize-1}$p[i]). The value of oW can be set to be (1<<(sW−1))−fO×($\Sigma_{i=0}^{inSize-1}$p[i]).

As such, in the MIP mode, the MIP weighting matrix, the MIP input sample values, the shifting number parameter, and the first offset can be obtained, facilitating subsequent determination of the MIP prediction value of the current block. Specifically, in some embodiments, the MIP prediction value of the current block is determined according to the MIP weighting matrix, the MIP input sample values, the shifting number parameter, and the first offset as follows.

A first weighted sum of the MIP weighting matrix and the MIP input sample values is calculated.

A first sum of the first weighted sum and the first offset is calculated.

A first right-shift value is determined by binary right-shifting of the first sum, where the number of right shifted bits is equal to the value of the shifting number parameter.

The MIP prediction value of the chroma component of the current block is set to be a sum of the first right-shift value and a value corresponding to index 0 in first temporal reference values, where the first temporal reference values are obtained by downsampling the neighbouring sample values of the current block.

That is, in the MIP mode, the MIP weighting matrix (represented by mWeight), the shifting number parameter (represented by sW), and the shifting offset parameter (denoted by fO) can be determined according to the block size index value (represented by mipSizeId) and the MIP mode index value (represented by modeId) of the current block. Then, the MIP input sample values (represented by p[x]), mWeight, sW, and fO are input into the matrix multiplication, to obtain the MIP prediction value (which can be represented by predMip[x][y]) which is an output result of the matrix multiplication. The samples in predMip[x][y] are arranged in a matrix/array form according to predSize×predSize. Its calculation formula is illustrated in the above formula (5) or formula (6).

S904, the intra prediction value of the chroma component of the current block is determined by filtering the MIP prediction value.

It should be noted that, the MIP prediction block is composed of the MIP prediction value. After the MIP prediction block is obtained, the intra prediction value of the current block can be further determined by determining whether the size parameters of the MIP prediction block are the same as the size parameters of the current block. Specifically, according to the determination result, when the size parameters of the MIP prediction block are the same as the size parameters of the current block, the intra prediction block of the current block is set equal to the MIP prediction block, and in this case the MIP prediction block contains prediction values of all sample positions in the current block; when the size parameters of the MIP prediction block are different from the size parameters of the current block, the MIP prediction block is filtered to obtain a filtered prediction block, and the filtered prediction block is set as the intra prediction block of the current block. Herein, the filtering may include upsampling or low-pass filtering.

S905, a reconstructed transform coefficient block of the current block is determined and a second transform coefficient block is determined by performing an LFNST on at least partial reconstructed transform coefficients in the reconstructed transform coefficient block, when the LFNST parameter indicates that the LFNST is to be performed on the current block.

It should also be noted that, the LFNST is not performed on any current block, which means that the LFNST parameter does not necessarily exist in the bitstream. In this case, some conditions (such as a minimum value among the size parameters of the current block, the block size index value of the current block, etc.) need to be checked to determine whether there exists an LFNST parameter in the bitstream. Thus, in some embodiments, the bitstream is parsed to obtain the LFNST parameter as follows.

Determining existence of an LFNST parameter in the bitstream.

The bitstream is parsed to obtain the LFNST parameter on condition that the LFNST parameter exists in the bitstream.

That is, first, it is necessary to determine whether the LFNST parameter exists in the bitstream, and only when the determination result is yes, that is, when the LFNST parameter exists in the bitstream, the step of parsing the bitstream to obtain the LFNST parameter may be performed.

Optionally, in some embodiments, existence of an LFNST parameter in the bitstream is determined as follows.

A minimum value among size parameters of the current block is determined, when the MIP mode is used to determine the intra prediction value of the chroma component of the current block.

Determine existence of the LFNST parameter in the bitstream according to the minimum value.

Furthermore, existence of the LFNST parameter in the bitstream is determined according to the minimum value as follows.

Determine that the LFNST parameter exists in the bitstream, when the minimum value is greater than or equal to a first preset threshold.

Herein, the first preset threshold may be used to represent a preset threshold for evaluating whether to perform the LFNST. In embodiments of the present application, the first preset threshold may be set to 8, which is not specifically limited.

That is, when intra prediction is performed using the MIP mode on the chroma component of the current block, the minimum value among the size parameters of the current block can be determined. For example, when the minimum value of the width and height is greater than or equal to 8, it is determined that the LFNST parameter exists in the bitstream. In this case, the LFNST parameter, such as the value of lfnst_index, can be obtained by parsing the bitstream.

Optionally, in some embodiments, existence of an LFNST parameter in the bitstream is determined as follows.

When the MIP mode is used to determine the intra prediction value of the chroma component of the current block, the block size index value of the current block is determined according to the size parameters of the current block.

According to the block size index value, existence of an LFNST parameter in the bitstream is determined.

Furthermore, existence of an LFNST parameter in the bitstream is determined according to the block size index value as follows.

Determine that the LFNST parameter exists in the bitstream if the block size index value is equal to a second preset threshold.

Herein, the second preset threshold may be used to represent a preset threshold for evaluating whether to perform the LFNST. In embodiments of the present application, the second preset threshold may be set to be a preset value (e.g., 2), or one of multiple preset values (e.g., 1, 2), which is not specifically limited.

That is, when intra prediction is performed using the MIP mode on the chroma component of the current block, the block size index value (mipSizeId) of the current block is determined according to the size parameters of the current block. For example, when the value of mipSizeId is equal to 2, it is determined that the LFNST parameter exists in the bitstream. In this case, the LFNST parameter such as the value of lfnst_index can be obtained by parsing the bitstream.

In some embodiments, the bitstream is parsed to obtain the LFNST parameter as follows.

The bitstream is parsed to obtain a value of an LFNST index.

It should be noted that, the LFNST index can be denoted by lfnst_index and the value of the LFNST index is used to determine whether to perform the LFNST on the current block. Specifically, in some embodiments, the method further includes the following.

Determine to perform the LFNST on the current block if the value of the LFNST index is greater than 0.

Determine not to perform the LFNST on the current block if the value of the LFNST index is equal to 0.

That is, after the value of lfnst_index is obtained, if the value of lfnst_index is greater than 0, determine to perform the LFNST on the current block; if the value of lfnst_index is equal to 0, determine not to perform the LFNST on the current block.

It should also be noted that, after the LFNST parameter such as the value of lfnst_index is obtained, if lfnst_index is greater than zero, it indicates that the LFNST parameter indicates that the LFNST is to be performed on the current block. In this case, in some embodiments, when the LFNST parameter indicates that the LFNST is to be performed on the current block, the reconstructed transform coefficient block of the current block is determined as follows.

The bitstream is parsed to obtain quantized coefficients of the current block.

The reconstructed transform coefficient block of the current block is obtained by performing inverse quantization on the quantized coefficients.

Specifically, the inverse quantization is scaling. In a specific example, the reconstructed transform coefficient block of the current block is obtained by performing inverse quantization on the quantized coefficients as follows. The reconstructed transform coefficient block of the current block is obtained by scaling the quantized coefficients.

As such, when the LFNST parameter indicates that the LFNST is to be performed on the current block, the LFNST can be performed on all or part reconstructed transform coefficients in the reconstructed transform coefficient block, to obtain the second transform coefficient block.

It should also be noted that, when it is determined that the LFNST can be performed on the current block, it is also necessary to determine an LFNST transform kernel (represented by kernel) used for the current block. In some embodiments, the second transform coefficient block is obtained by performing the LFNST on the at least partial reconstructed transform coefficients in the reconstructed transform coefficient block as follows. The second transform coefficient block is obtained by performing the LFNST on the at least partial reconstructed transform coefficients in the reconstructed transform coefficient block with the LFNST transform kernel.

In embodiments of the present application, there are four transform kernel candidate sets in the LFNST, and these four transform kernel candidate sets can include set0, set1, set2 and set3. Herein, in embodiments of the present application, the MIP parameter may be used to determine the LFNST transform kernel candidate set, and then the LFNST transform kernel used for the current block is selected from the LFNST transform kernel candidate set. Therefore, in some embodiments, the method may further include the following.

When the MIP mode is used to determine the intra prediction value of the chroma component of the current block, the MIP parameter is determined from the prediction mode parameter of the current block.

According to the MIP parameter, the LFNST transform kernel candidate set is determined.

In the LFNST transform kernel candidate set, the transform kernel indicated by the value of the LFNST index is determined as the LFNST transform kernel used for the current block. The LFNST transform kernel candidate set contains two or more preset LFNST transform kernels.

It should be noted that, the MIP parameter may include at least one of the following: an MIP mode index value (represented by modeId) and an MIP transposition indication parameter (represented by isTransposed). For the LFNST transform kernel used for the current block, when the value of the MIP transposition indication parameter indicates that the transposition is performed on the sample input vector used in the MIP mode, it is also necessary to perform matrix transposition on the selected transform kernel to obtain the LFNST transform kernel used for the current block.

Furthermore, in some embodiments, the LFNST transform kernel candidate set is determined according to the MIP parameter as follows.

According to the MIP mode index value, the value of the LFNST intra prediction mode index is determined.

According to the value of the LFNST intra prediction mode index, the index value of the LFNST transform kernel candidate set is determined through a fifth preset look-up table.

The LFNST transform kernel candidate set is selected from multiple candidate LFNST transform kernel candidate sets according to the index value of the LFNST transform kernel candidate set.

Herein, the LFNST intra prediction mode index may be represented by predModeIntra, and the index value of the LFNST transform kernel candidate set may be represented by lfnstTrSetIdx.

It should be noted that, the fifth preset look-up table is illustrated in the above Table 10. According to the MIP mode index value (that is, the value of modeId), the value of predModeIntra can be determined. Then, according to the value of predModeIntra, the value of lfnstTrSetIdx can be directly determined through Table 10, that is, the LFNST transform kernel candidate set selected for the current block is determined. Herein, the value of lfnstTrSetIdx indicates the transform kernel candidate set used in the LFNST. Since the value of modeId can include 0, 1, 2, 3, 4, and 5, the value of predModeIntra is also 0, 1, 2, 3, 4, or 5. Its correspondence with lfnstTrSetIdx is specifically illustrated in Table 10.

In a specific embodiment, the value of the LFNST intra prediction mode index is determined according to the MIP mode index value as follows. The value of the LFNST intra prediction mode index is set equal to the MIP mode index value.

That is, in embodiments of the present application, the value of predModeIntra may be set equal to the value of modeId, and then the value of lfnstTrSetIdx is directly determined through Table 10 according to the value of predModeIntra, that is, the LFNST transform kernel candidate set selected for the current block is determined. It should also be noted that, in another specific embodiment, in embodiments of the present application, it is also possible to directly map the MIP mode index value to the value of the PLANAR mode, and then use the value of predModeIntra corresponding to the PLANAR mode to determine the value of lfnstTrSetIdx, that is, to determine the LFNST transform kernel candidate set selected for the current block.

Furthermore, in the process of performing LFNST, the scan order may include the horizontal scan order and the vertical scan order. Herein, the scan order is determined according to the value of the MIP transposition indication parameter (represented by isTransposed).

Optionally, in some embodiments, the second transform coefficient block is obtained by performing the LFNST on the at least partial reconstructed transform coefficients in the reconstructed transform coefficient block as follows.

When the value of the MIP transposition indication parameter indicates that transposition is performed on the sample input vector used in the MIP mode, the LFNST is performed on the at least partial reconstructed transform coefficients in the reconstructed transform coefficient block in the vertical scan order, to obtain the second transform coefficient block.

When the value of the MIP transposition indication parameter indicates that transposition is not performed on the sample input vector used in the MIP mode, the LFNST is performed on the at least partial reconstructed transform coefficients in the reconstructed transform coefficient block in the horizontal scan order, to obtain the second transform coefficient block.

Specifically, if the value of isTransposed is equal to 0, indicating that the sample input vector used in the MIP mode is not to be transposed, the LFNST is performed on the at least partial reconstructed transform coefficients in the reconstructed transform coefficient block in the horizontal scan order, as specifically illustrated in the above formula (10).

If the value of isTransposed is equal to 1, indicating that the sample input vector used in the MIP mode is to be transposed, the LFNST is performed on the at least partial reconstructed transform coefficients in the reconstructed transform coefficient block in the vertical scan order, as specifically illustrated in the above formula (11).

log2LfnstSize is determined according to the above formula (9).

Optionally, in some embodiments, the second transform coefficient block is obtained by performing the LFNST on the at least partial reconstructed transform coefficients in the reconstructed transform coefficient block as follows.

When the value of the MIP transposition indication parameter indicates that transposition is performed on the sample input vector used in the MIP mode, the LFNST is performed on the at least partial reconstructed transform coefficients in the reconstructed transform coefficient block in the horizontal scan order, to obtain the second transform efficient block.

When the value of the MIP transposition indication parameter indicates that transposition is not performed on the sample input vector used in the MIP mode, the LFNST is performed on the at least partial reconstructed transform coefficients in the reconstructed transform coefficient block in the vertical scan order, to obtain the second transform efficient block.

Specifically, if the value of isTransposed is equal to 1, indicating that the sample input vector used in the MIP mode is to be transposed, the LFNST can be performed on the at least partial transform coefficients in the first transform coefficient block in the horizontal scan order, as specifically illustrated in the above formula (10).

If the value of isTransposed is equal to 0, indicating that the sample input vector used in the MIP mode is not to be transposed, the LFNST can be performed on the at least partial transform coefficients in the first transform coefficient block in the vertical scan order, as specifically illustrated in the above formula (11).

log2LfnstSize is determined according to the above formula (9).

S906, a reconstructed residual block of the chroma component of the current block is obtained by performing a first transform on the second transform coefficient block.

S907, a reconstructed block of the chroma component of the current block is determined according to the intra prediction value of the chroma component of the current block and the reconstructed residual block.

It should be noted that, in the decoder, by parsing the bitstream, the quantized value of the LFNST coefficients can be obtained. The inverse quantization (which may be called "scaling") is performed on the quantized value by the inverse quantization unit, to obtain the reconstructed transform coefficient block. The inverse LFNST is performed on at least partial reconstructed transform coefficients in the reconstructed transform coefficient block, to obtain the second transform coefficient block. Then, through the inverse first transform, the reconstructed residual block of the chroma component of the current block can be obtained. Herein, the inverse first transform is the inverse transform corresponding to the first transform (or core transform) in the encoder. It should be noted that, only the "inverse transform" in the decoder is defined in the standard, so in the standard, the "inverse LFNST" can also be called "LFNST".

It should also be noted that, after the reconstructed residual block of the chroma component of the current block is obtained, the intra prediction value of the chroma component of the current block and the reconstructed residual block may be added, to determine the reconstructed block of the chroma component of the current block.

The decoding method of embodiments of the present application will be specifically described below with reference to the decoder 200 illustrated in FIG. 2.

The input bitstream of the decoder 200 can be a bitstream generated by the encoder 100. The parsing unit 201 parses the input bitstream and obtains values of syntax elements from the input bitstream. The parsing unit 201 converts binary representations of syntax elements to numerical values and forwards the numerical values to the units in the decoder 200 to derive one or more decoded pictures. The parsing unit 201 may also parse one or more syntax elements from the input bitstream for rendering the decoded pictures.

Figure 10:
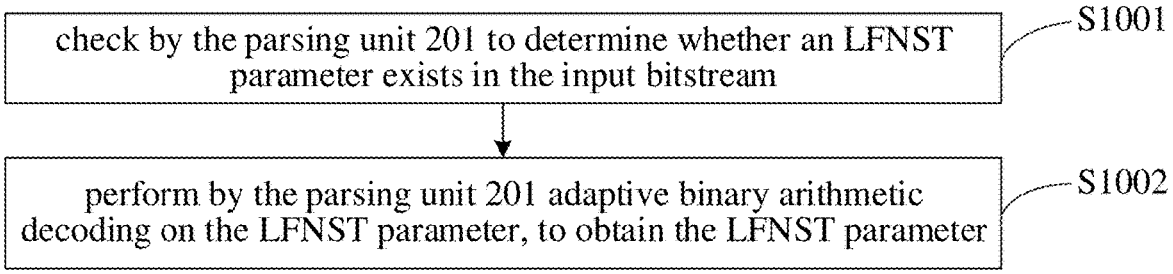
FIG. 10 is a schematic flowchart of parsing an LFNST parameter provided in embodiments of the present application.

Referring to FIG. 10, it illustrates a schematic flowchart of parsing an LFNST parameter provided in embodiments of the present application. As illustrated in FIG. 10, this procedure includes the following.

S1001, the parsing unit 201 checks to determine whether an LFNST parameter exists in the input bitstream.

It should be noted that, the LFNST parameter may refer to the value of lfnst_index. Herein, an example of the syntax structure for representing the LFNST parameter may be the same as the example of the syntax structure illustrated in the above Table 8, or may also be the same as the example of the syntax structure illustrated in the above Table 9A and Table 9B.

Specifically, when the intra prediction mode of the current block is the MIP mode, the parsing unit 201 gets coding bits of lfnst_index from the input bitstream using the following methods. Optionally, using the syntax structure in Table 9A, the parsing unit 201 reads lfnst_index bits using the MIP mode when the minimum value of width and height of transform block in the current block is greater than or equal to 8 (that is, both width and height are greater than or equal to 8). Another optional condition could be set as that: both the width and height is greater than or equal to a first value (e.g. 8) and a sum of the width and height is greater than or equal to a second value (e.g. 16).

Optionally, using the syntax structure in Table 9B, the parsing unit 201 reads lfnst_index bits using the MIP mode when mipSizeId of the current block is equal to 2. Another optional condition could be set as that: mipSizeId of the current block is equal to one of multiple values, e.g. 1 and 2.

S1002, the parsing unit 201 performs adaptive binary arithmetic decoding on the LFNST parameter, to obtain the LFNST parameter.

Herein, at the encoder 100 side, the entropy coding unit 115 uses CABAC with the descriptor "ae(v)" as illustrated in Table 9A and Table 9B to encode the LFNST parameter (for example, the value of lfnst_index). Then, at the decoder 200 side, adaptive binary arithmetic decoding is performed by the parsing unit 201, to obtain the value of lfnst_index from the lfnst_index bits.

The parsing unit 201 forwards the values of syntax elements, as well as one or more variables set or determined according the values of syntax elements, for deriving one or more decoded pictures to the units in the decoder 200. The prediction unit 202 determines the intra prediction block of the current block (e.g. a CU). When it is indicated that the inter decoding mode is used to decode the current decoding block, the prediction unit 202 passes relative parameters from the parsing unit 201 to the MC unit 203 to derive the inter prediction block. When it is indicated that the intra prediction mode (including the MIP mode indicated based on the MIP mode index value) is used to decode the current block, the prediction unit 202 passes relative parameters from the parsing unit 201 to the intra prediction unit 204 to derive the intra prediction block.

It should be understood that, the current block (or called a "decoding block") in embodiments of the present application may be a CU or a partition (e.g., a transform block) of the CU. Specifically, when it is indicated that the MIP mode is used to decode the current block, the intra prediction unit 204 will obtain the intra prediction block of the current block, where the intra prediction block of the current block includes the intra prediction value of at least one sample in the current block.

Specifically, the intra prediction unit 204 obtains the intra prediction block using the MIP mode as follows.

First, the intra prediction unit 204 derives one or more reference samples from neighbouring samples of the current block, for example, by downsampling the neighbouring samples, or directly extracting from the neighbouring samples.

Then, the intra prediction unit 204 determines one or more partial prediction samples corresponding to sample positions in the current block using the obtained reference samples, the MIP matrix, and the shifting parameter. Herein, the sample positions can be preset sample positions in the current block. For example, the sample positions have even horizontal and vertical coordinate values. The shifting parameter includes the shifting number parameter and the shifting offset parameter, and the shifting parameter is used in shifting operations in derivation of the intra prediction value of the partial samples.

Finally, if prediction samples corresponding to the partial samples of the current block are derived, the intra prediction unit 204 further needs to derive prediction samples corresponding to remaining samples other than the partial samples in the current block. For example, the intra prediction unit 204 uses an interpolation filter to derive the prediction samples corresponding to the remaining samples, with the partial samples and the neighbouring samples being the input of the interpolation filter.

As illustrated in FIG. 6, it illustrates an example of a block diagram of a procedure of deriving an intra prediction block using an MIP mode provided in embodiments of the present application, which can be implemented on the decoder 200. Herein, the "current block" herein refers to the "decoding block".

Step 601, the intra prediction unit 204 gets neighbouring samples of the current block, for example, as marked as gray squares adjacent to the current block in step 601 in FIG. 6. The intra prediction unit 204 derives one or more reference samples from the neighbouring samples. In the example of step 601 in FIG. 6, optionally, the intra prediction unit 204 may calculate an average of two neighbouring samples and uses the average as a reference sample. Optionally, the intra prediction unit 204 selects one from every two neighbouring samples as a reference sample. For example, in the example of step 601 in FIG. 6, the intra prediction unit 204 selects 4 reference samples from 8 above neighbouring samples of the current block, and another 4 reference samples from 8 left neighbouring samples of the current block.

Concrete process of step 601 is presented as follows.

The intra prediction unit 204 gets the width and height of the current block from the parsing unit 201, denoted as variables cbWidth and cbHeight, respectively. According to the parameters from the parsing unit 201, the current block is partitioned into one or more transform blocks. Let variables nTbW and nTbH be the width and height of the transform block, respectively. When the MIP mode is used as the intra prediction mode to derive prediction of the current block, the intra prediction unit 204 determines the block size index value of MIP, i.e., a variable denoted by mipSizeId.

Optionally, the intra prediction unit 204 determines the value of mipSizeId as follows.

If both nTbW and nTbH are equal to 4, mipSizeId is set equal to 0.
  Otherwise, if either cbWidth or cbHeight is equal to 4, mipSizeId is set equal to 1.
  Otherwise, mipSizeId is set equal to 2.

Specifically, when size parameters of the current block are 8×8 (i.e., both cbWidth and cbHeight are equal to 8), mipSizeId is set equal to 2.

Optionally, the intra prediction unit 204 determines the value of mipSizeId as follows.

If both nTbW and nTbH are equal to 4, mipSizeId is set equal to 0.
  Otherwise, if either cbWidth or cbHeight is equal to 4, or both cbWidth and cbHeight are equal to 8, mipSizeId is set equal to 1
  Otherwise, mipSizeId is set equal to 2.

Specifically, when the size parameters of the current block are 8×8, mipSizeId is set equal to 1.

Furthermore, the intra prediction unit 204 derives values of boundarySize and predSize according to mipSizeId. Specifically, refer to the following.

If mipSizeId equal to 0, boundarySize is set equal to 2 and predSize is set equal to 4.
Otherwise, if mipSizeId equal to 1, boundarySize is set equal to 4 and predSize is set equal to 4.
Otherwise (if mipSizeId equal to 2), boundarySize is set equal to 4 and predSize is set equal to 8.

boundarySize represents a number of reference samples derived from each of the above neighbouring reference samples and the left neighbouring reference samples of the current block.

The intra prediction unit 204 may also obtain reference samples for calculating the MIP prediction value according to the parameter from the parsing unit 701 and indicating an order of reference samples stored in the buffer pTemp. The intra prediction unit 204 sets the variable isTransposed equal to the parameter from the parsing unit 701 and indicating the order of reference samples stored in the buffer pTemp. For example, isTransposed equal to 0 (or FALSE) indicates that the intra prediction unit 204 presents the reference samples derived from the above neighbouring reference samples of the current block ahead of the reference samples derived from the left neighbouring reference samples; otherwise, isTransposed equal to 1 (TRUE) indicates that the intra prediction unit 204 presents the reference samples derived from the left neighbouring reference samples of the current block ahead of the reference samples derived from the above neighbouring reference samples.

The intra prediction unit 204 derives the value of variable inSize to indicate the number of reference samples used in the MIP mode, as illustrated in the above formula (1).

The intra prediction unit 204 invokes the following process to derive a group of reference samples (stored as an array p[x], for x being 0, inSize−1) using neighbouring reference samples of the current block.

The intra prediction unit 204 derives nTbW reference samples from the above neighbouring reference samples (e.g. stored in an array refT) of the current block and nTbH reference samples from the left neighbouring reference samples (e.g. stored in an array refL) of the current block. The intra prediction unit 204 invokes downsampling on refT to get boundarySize reference samples and stores the boundarySize reference samples in refT. The intra prediction unit 204 invokes downsampling on refL to get boundarySize reference samples and stores the boundarySize reference samples in refL.

The intra prediction unit 204 further obtains the order indicated by isTransposed to put elements in refT and refL into the buffer pTemp.

Optionally, the intra prediction unit 204 derives p[x], where x=0, . . . , inSize−1, as follows.
  If mipSizeId is equal to 2, p[x]=pTemp[x+1]−pTemp[0].
  Otherwise (mipSizeId is less than 2), p[0]=pTemp[0]−(1<<(BitDepth−1)) and p[x]=pTemp[x]−pTemp[0].

BitDepth is a bit depth of a colour component of a sample in the current block. Herein, the colour component is one of RGB components, one of YUV components, or one of YCbCr component, for example Y component.

Optionally, the intra prediction unit 204 may derive p[x], where x=0, . . . , inSize−1, as follows.
  If mipSizeId is equal to 2, p[x]=pTemp[x+1]−pTemp[0].
  Otherwise (mipSizeId is less than 2), p[0]=(1<<(BitDepth−1))−pTemp[0] and p[x]=pTemp[x]−pTemp[0].

Optionally, the intra prediction unit 204 may derive the value of p[x] using a unified calculation method without determining the value of mipSizeId. For example, by appending (1<<(BitDepth−1)) as an additional element in the buffer pTemp, the intra prediction unit 204 calculates p[x] as pTemp[x+1]−pTemp[0].

Step 602, the intra prediction unit 204 derives the MIP prediction value of the current block using the group of reference samples and the MIP weighting matrix. The MIP weighting matrix is selected from a group of predefined MIP weighting matrices according to the MIP mode index value (denoted by ModeId) corresponding to the MIP mode and the block size index value (denoted by mipSizeId) of MIP. The intra prediction unit 204 obtains the value of ModeId from the parsing unit 201.

The intra prediction unit 204 derives the MIP prediction value (denoted as predMip[x][y]) of partial prediction samples corresponding to one or more sample positions in the current block. In the example of step 602 in FIG. 6, the partial prediction samples are samples marked as grey squares in the current block. The input of the prediction module 601 is the reference samples p[x] derived in step 601. The prediction module 601 calculates the partial prediction samples using the MIP weighting matrix and the shifting parameter. Herein, the shifting parameter includes the shifting number parameter and the shifting offset parameter.

In a possible implementation, if the prediction module 601 uses the coordinate (x, y) to represent the sample and the prediction sample is represented by predMip[x][y], the predMip[x][y] can be calculated according to formula (5) and formula (6).

In formula (5) or formula (6), mWeight[i][j] is the MIP weighting matrix in which matrix elements are pre-determined constants or adaptively updated using, for example, a training method, where input of the training method is one or more coded pictures or blocks, or pictures from other bitstreams provided to the decoder 200 by external meanings, or pictures obtained from the parsing unit 201 by parsing the special data units in the input bitstream containing the MIP weighting matrix. mWeight[i][j] may be determined according to the MIP mode indicated by the corresponding one or more parameters from the parsing unit 201; fO is the shifting offset parameter which is used to determine oW; sW is the shifting number parameter; p[i] is calculated using the reference samples, that is, the MIP input sample values of embodiments of the present application; pTemp[0] represents the first sample in the reference samples, that is, the value corresponding to index 0 in the first temporal reference values of embodiments of the present application; ">>" is a binary right shifting operator as defined in VVC.

The prediction unit 601 may determine the values of sW and fO according to the size of the current block and the MIP mode used for the current block. In one example, the prediction unit 601 obtains the values of sW and fO using a look-up table.

Optionally, the prediction unit 601 may determine sW using the above Table 4 and according to the size parameters of the current block and the MIP mode.

Optionally, the prediction unit 601 may also determine sW using the above Table 5 and according to the size parameters of the current block.

Optionally, the prediction module 601 may directly set sW equal to a constant value. For example, the prediction module 601 set sW equal to 5 for blocks of various size parameters and different MIP modes. Alternatively, the prediction module 601 set sW equal to 6 for blocks of various size parameters and different MIP modes. Alternatively, the prediction module 601 set sW equal to 7 for blocks of various size parameters and different MIP modes.

Optionally, the prediction unit 601 may determine fO using the above Table 6 and according to the size parameters of the current block and the MIP mode.

Optionally, the prediction unit 601 may also determine fO using the above Table 7 and according to the size parameters of the current block.

Optionally, the prediction module 601 may directly set fO equal to a constant value (for example, 0 to 100). For example, for blocks of various size parameters and different MIP modes, the prediction module 601 set fO equal to 32; alternatively, the prediction module 601 set fO equal to 46; alternatively, the prediction module 601 set fO equal to 56; alternatively, the prediction module 601 set fO equal to 66.

The intra prediction unit 204 may perform a clipping operation on the MIP prediction value in predMip. When isTransposed is equal to 1 (or TRUE), the predSize×predSize array predMip[x][y] (with x=0, . . . , predSize−1, y=0, . . . , predSize−1) is transposed as predTemp[y][x]=predMip[x][y] and then predMip=predTemp.

Exemplarily, optionally, when the size parameters of the current block are 8×8 (i.e., both cbWidth and cbHeight are equal to 8), the intra prediction unit 204 determines mipSizeId to be equal to 2 and derives an 8×8 predMip.

Optionally, when the size parameters of the current block are 8×8 (i.e., both cbWidth and cbHeight are equal to 8), the intra prediction unit 204 determines mipSizeId to be equal to 1 and derives an 4×4 predMip.

Step 603, the intra prediction unit 204 derives the intra prediction value of the current block (stored in an array as predSamples[x][y], with x=0, . . . , nTbW−1, y=0, . . . , nTbH−1) as below.

If the intra prediction unit 204 determines that nTbW is greater than predSize or nTbH is greater than predSize, the intra prediction unit 204 invokes an upsampling process to derive predSamples using predMip. The intra prediction unit 204 derives the prediction samples corresponding to remaining samples other than the partial samples in the current block. In FIG. 6, the intra prediction unit 204 can use a filtering module 602 to derive the prediction samples corresponding to remaining samples other than the partial samples in the current block. The input of the filtering module 602 is samples marked as grey squares in step 602. The filtering module 602 may use one or more interpolation filters to derive the prediction samples corresponding to remaining samples other than the partial samples in the current block using the input. For example, the input includes the reference samples and the partial prediction samples of one or more sample positions in the current block. Alternatively, the input includes the neighbouring samples and the partial prediction samples of one or more sample positions in the current block. Alternatively, the input includes the reference samples, the neighbouring samples and the partial prediction samples of one or more sample positions in the current block. For example, optionally, when the size parameters of the current block are 8×8 (i.e., both cbWidth and cbHeight are equal to 8), the intra prediction unit 204 determines mipSizeId to be equal to 1, and the intra prediction unit 204 applies the upsampling process to an 4×4 predMip to derive an 8×8 intra prediction block of the current block.

Otherwise, the intra prediction unit 204 sets the intra prediction block of the current block equal to the MIP prediction block of the current block, that is, sets predSamples[x][y] (with x=0, ..., nTbW−1, y=0, ... nTbH−1) equal to predMip[x][y]. For example, when the size parameters of the current block are 8×8 (i.e., both cbWidth and cbHeight are equal to 8), the intra prediction unit 204 derives predSamples for the current block with its size equal to 8×8 (i.e., both cbWidth and cbHeight are equal to 8).

As such, according to the block diagram of the procedure illustrated in FIG. 6, after step 603, the intra prediction unit 204 can obtain the intra prediction block of the current block (i.e., the CU), that is, determine the intra prediction value of at least one sample of the current block.

The scaling unit 205 has the same function as that of the inverse quantization unit 110 in the encoder 100. The scaling unit 205 performs a scaling operation on the quantized coefficients (i.e., levels) from the parsing unit 201, to obtain reconstructed coefficients.

The transform unit 206 has the same function as that of the inverse transform unit 111 in the encoder 100. The transform unit 206 performs one or more transform operations (i.e., the inverse of one or more transform operations performed by the inverse transform unit 111 in encoder 100), to obtain the reconstructed residual.

When lfnst_index is not equal to 0, the transform unit 206 performs the secondary transform on the reconstructed coefficients to obtain the second transform coefficient block. Then, the first transform, e.g., an integer transform originally designed based on DCT, is performed on the second transform coefficient block, to obtain the reconstructed residual block. LFNST is an example of the secondary transform.

Figure 11:
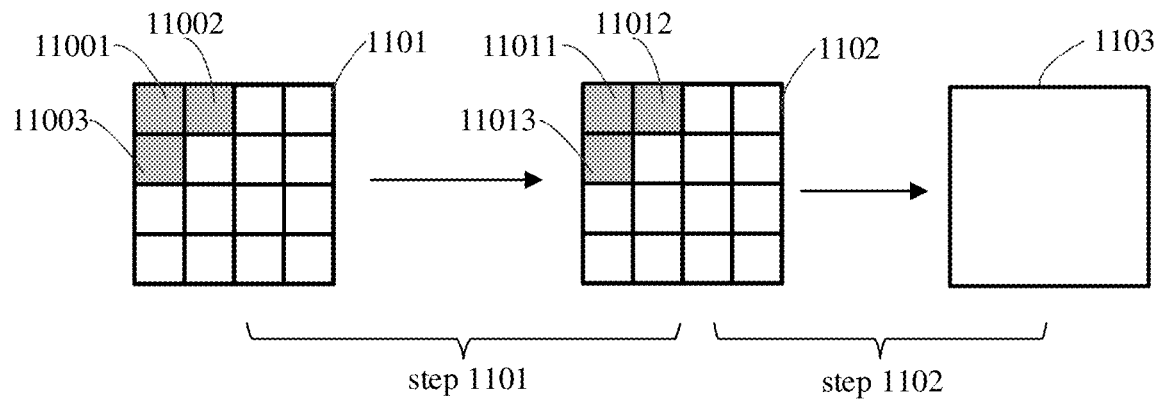
FIG. 11 is a diagram of another procedure of performing an LFNST provided in embodiments of the present application.

Referring to FIG. 11, it illustrates a diagram of another procedure of performing an LFNST provided in embodiments of the present application. In FIG. 11, the block 1101 is a reconstructed transform coefficient block containing reconstructed transform coefficients.

Step 1101, the transform unit 206 performs the secondary transform such as LFNST on all or part reconstructed transform coefficients in the block 1101.

When the intra prediction mode of the current block is the MIP mode, the transform unit 206 selects the LFNST transform kernel candidate set according to the MIP parameter. The MIP parameter may include at least one of the MIP mode index value (i.e., modeId) and the MIP transposition indication parameter (i.e., isTransposed).

The transform unit 206 sets the value of the variable predModeIntra equal to the value of modeId. The transform unit 206 determines the transform kernel for performing the LFNST on the coefficients on sub-blocks 11001, 11002, and 11003. A size of the sub-block may be a preset value, for example, 8×8. The transform unit 206 determines the index value (i.e., lfnstTrSetIdx) of the LFNST transform kernel candidate set according to the value of predModeIntra. For block decoding in the MIP mode, the transform unit 206 can employ the look-up table as in Table 10 to get the value of lfnstTrSetIdx. The transform unit 206 determines the transform kernel for performing the LFNST as the transform kernel indicated by lfnst_index in the LFNST transform kernel candidate set indicated by lfnstTrSetIdx.

When lfnst_index is not equal to 0, the transform unit 206 performs the LFNST on the transform block with coefficients from sub-blocks 11001, 11002, and 11003, obtains LFNST coefficients and puts the LFNST coefficients in sub-blocks 11011, 11012, and 11013 in block 1102. Let d[x][y], with x=0, ..., nTbW−1, y=0, ..., nTbH−1, where nTbW and nTbH is a width and a height of block 1102 respectively, be a block of first transform coefficients. Let v[x], with x=0, ..., nLfnstOutSize−1, where nLfnstOutSize=(nTbW>=8 && nTbH>=8)? 48:16, be a block of LFNST coefficients.

Optionally, the transform unit 206 employs the following instruction to get a block 1102 of transform coefficients, as specifically described in the above formula (8). log2LfnstSize is determined according to the above formula (9).

Optionally, when isTransposed is equal to 0, the transform unit 206 employs the following instruction to get a block 1102 of transform coefficients, as specifically described in the above formula (10).

When isTransposed is equal to 1, the transform unit 206 employs the following instruction to get a block 1102 of transform coefficients, as specifically described in the above formula (11).

Optionally, when isTransposed is equal to 1, the transform unit 206 employs the following instruction to get a block 1102 of transform coefficients, as specifically described in the above formula (10).

When isTransposed is equal to 0, the transform unit 206 employs the following instruction to get a block 1102 of transform coefficients, as specifically described in the above formula (11).

log2LfnstSize is determined according to the above formula (9).

Furthermore, when the intra prediction mode of the current block is the traditional intra prediction mode, (i.e., angular intra prediction, DC mode, or PLANAR mode), the transform unit 206 uses the look-up table illustrated in Table 11 to determine, according to the mode index value (assigned to predModeIntra) of the traditional intra prediction mode, the value of lfnstTrSetIdx, that is, to determine the LFNST transform kernel candidate set selected for the current block. The transform unit 206 determines the transform kernel for performing the LFNST as the transform kernel indicated by lfnst_index in the LFNST transform kernel candidate set indicated by lfnstTrSetIdx.

When lfnst_index is not equal to 0, the transform unit 206 performs the LFNST on the transform block with coefficients from sub-blocks 11001, 11002, and 11003, obtains LFNST coefficients and puts the LFNST coefficients in sub-blocks 11011, 11012, and 11013 in block 1102. Let d[x][y], with x=0, ..., nTbW−1, y=0, ..., nTbH−1, where nTbW and nTbH is a width and a height of block 1102 respectively, be a block of first transform coefficients. Let v[x], with x=0, ..., nLfnstOutSize−1, where nLfnstOutSize=(nTbW>=8 && nTbH>=8)? 48:16, be a block of LFNST coefficients.

Optionally, when predModeIntra is less than or equal to 34, the transform unit 206 employs the following instruction to get a block 1102 of transform coefficients, as specifically described in the above formula (10).

When predModeIntra is greater than 34, the transform unit 206 employs the following instruction to get a block 1102 of transform coefficients, as specifically described in the above formula (11).

Optionally, when predModeIntra is greater than 34, the transform unit 206 employs the following instruction to get a block 1102 of transform coefficients, as specifically described in the above formula (10).

When predModeIntra is less than or equal to 34, the transform unit 206 employs the following instruction to get a block 1102 of transform coefficients, as specifically described in the above formula (11).

log2LfnstSize is determined according to the above formula (9).

Step 1102, the transform unit 206 performs the first transform (i.e., core transform) on the transform coefficients in the block 1102, e.g., an integer transform originally designed based on DCT, to obtain the reconstructed residual block 1103 of the current block.

Furthermore, the adder 207 performs an addition operation on its inputs (the prediction block from the prediction unit 202 and the reconstructed residual from the transform unit 206), to obtain the reconstructed block of the current block. The reconstructed block is also sent to the prediction unit 202 to be used as a reference for other blocks encoded in the intra prediction mode.

After all CUs in the picture or sub-picture have been reconstructed, the filtering unit 208 performs in-loop filtering on the reconstructed picture or sub-picture. The filtering unit 208 contains one or more filters, such as a deblocking filter, a sample adaptive offset filter, an adaptive loop filter, a luma mapping with chroma scaling filter, a neural network based filter, and the like. Alternatively, when the filtering unit 208 determines that the reconstructed block is not to be used as a reference for decoding other blocks, the filtering unit 208 performs in-loop filtering on one or more target samples in the reconstructed block.

Herein, the output of the filtering unit 208 is a decoded picture or sub-picture, and the decoded picture or sub-picture is send to the DPB unit 209. The DPB unit 209 outputs the decoded picture according to timing and control information. The pictures stored in the DPB unit 209 may also be used as a reference for performing inter prediction or intra prediction by the prediction unit 202.

In embodiments of the present application, the decoder 200 may be a computing device having a processor and a storage medium recording a decoding program. When the processor reads and runs the decoding program, the decoder 200 reads the input bitstream and generates a corresponding decoded video. Additionally, the decoder 200 may also be a computing device having one or more chips. These units, implemented as integrated circuits on a chip, have similar connection and data exchange functions as the corresponding units in FIG. 2.

The decoding method is provided in embodiments of the present application. The bitstream is parsed to obtain the prediction parameter and the LFNST parameter of the current block, where the prediction parameter includes the prediction mode parameter; when the prediction mode parameter indicates that the MIP mode is used to determine the intra prediction value of the chroma component of the current block, the neighbouring sample values of the current block are obtained and the MIP input sample values of the current block are determined according to the neighbouring sample values of the current block; the MIP prediction value of the chroma component of the current block is determined according to the MIP input sample values, the MIP weighting matrix, and the shifting parameter; the intra prediction value of the chroma component of the current block is determined by filtering the MIP prediction value; when the LFNST parameter indicates that the LFNST is to be performed on the current block, the reconstructed transform coefficient block of the current block is determined and the second transform coefficient block is obtained by performing the LFNST on the at least partial reconstructed transform coefficients in the reconstructed transform coefficient block; the reconstructed residual block of the chroma component of the current block is obtained by performing the first transform on the second transform coefficient block; and the reconstructed block of the chroma component of the current block is determined according to the intra prediction value of the chroma component of the current block and the reconstructed residual block. In this way, for the MIP mode, in addition to ensuring decoding performance, complexity can be reduced, a storage space required in the decoding process can be reduced, and decoding efficiency can be effectively improved. Furthermore, when the LFNST technology is applied to MIP mode prediction, due to introduction of the MIP parameter, the LFNST can be more flexible, and the decoding efficiency can be further improved.

Figure 12:
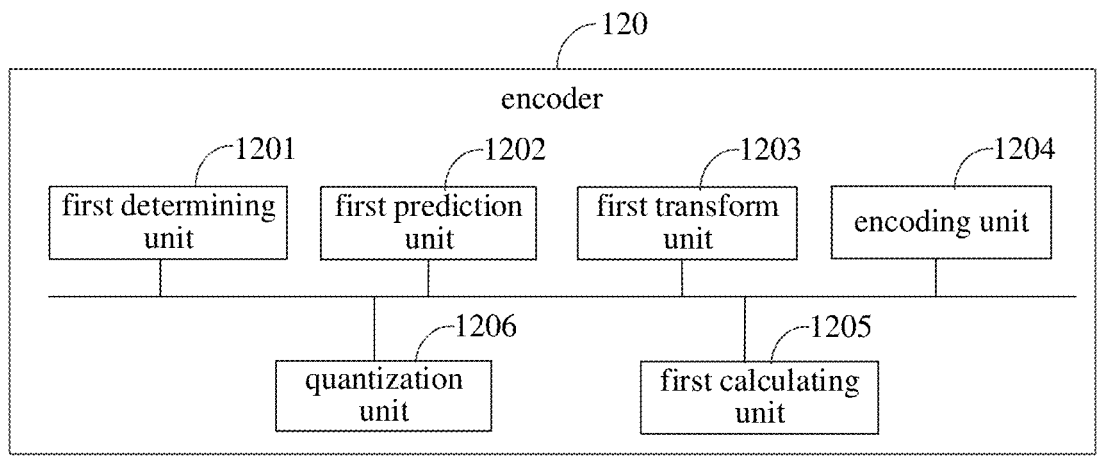
FIG. 12 is a schematic diagram of a structure of another encoder provided in embodiments of the present application.

In another embodiment of the present application, based on the same inventive concept with the above embodiments, referring to FIG. 12, it illustrates a schematic structural diagram of an encoder 120 provided in embodiments of the present application. As illustrated in FIG. 12, the encoder 120 includes a first determining unit 1201, a first prediction unit 1202, a first transform unit 1203, and an encoding unit 1204.

The first determining unit 1201 is configured to determine a prediction parameter of a current block, where the prediction parameter includes a prediction mode parameter. The first determining unit 1201 is further configured to obtain neighbouring sample values of the current block and determine MIP input sample values of the current block according to the neighbouring sample values of the current block, when the prediction mode parameter indicates that an MIP mode is used to determine an intra prediction value of a chroma component of the current block. The first prediction unit 1202 is configured to determine an MIP prediction value of the chroma component of the current block according to the MIP input sample values, an MIP weighting matrix, and a shifting parameter, where the MIP prediction value is prediction values of partial samples in the chroma component of the current block; and determine the intra prediction value of the chroma component of the current block by filtering the MIP prediction value. The first transform unit 1203 is configured to determine a prediction residual value of the chroma component of the current block according to the intra prediction value of the chroma component of the current block; and determine an LFNST parameter by performing an LFNST on the prediction residual value. The encoding unit 1204 is configured to encode the LFNST parameter and signal the encoded LTNST parameter into a bitstream.

In some embodiments, the neighbouring sample values of the current block include left neighbouring sample values and above neighbouring sample values of the current block.

In some embodiments, the shifting parameter includes a shifting offset parameter and a shifting number parameter.

The first determining unit 1201 is specifically configured to: determine a product of the shifting offset parameter and a sum of the MIP input sample values according to a value of the shifting offset parameter, where the value of the shifting offset parameter is a fixed constant; determine a first constant value according to a value of the shifting number parameter, where the value of the shifting number parameter is a fixed constant; set a value of a first offset to be a difference between the first constant value and the product; determine the MIP weighting matrix of the current block according to the prediction parameter; and determine the MIP prediction value of the chroma component of the current block according to the MIP weighting matrix, the MIP input sample values, the shifting number parameter, and the first offset.

In some embodiments, the prediction parameter further includes size parameters of the current block.

In some embodiments, the first determining unit 1201 is further configured to: determine a block size index value of the current block according to the size parameters of the current block; obtain first temporal reference values by downsampling the neighbouring sample values of the current block; when the block size index value of the current block is within a preset range, determine a second constant value according to a bit depth of the neighbouring sample values of the current block, set a value corresponding to index 0 in the MIP input sample values to be a difference between the second constant value and a value corresponding to index 0 in the first temporal reference values, and set a value corresponding to index i in the MIP input sample values to be a difference between a value corresponding to index i in the first temporal reference values and the value corresponding to the index 0 in the first temporal reference values, where i is an integer greater than 0; and set a value corresponding to index j in the MIP input sample values to be a difference between a value corresponding to index (j+1) in the first temporal reference values and the value corresponding to the index 0 in the first temporal reference values, when the block size index value of the current block is beyond the preset range, where j is an integer greater than or equal to 0.

In some embodiments, the first determining unit 1201 is further configured to: when the block size index value of the current block is within the preset range, determine the second constant value according to the bit depth of the neighbouring sample values of the current block; set the value corresponding to the index 0 in the MIP input sample values to be a difference between the value corresponding to the index 0 in the first temporal reference values and the second constant value; and set the value corresponding to the index i in the MIP input sample values to be the difference between the value corresponding to the index i in the first temporal reference values and the value corresponding to the index 0 in the first temporal reference values, where i is an integer greater than 0.

In some embodiments, the first determining unit 1201 is further configured to: set the block size index value of the current block to be 0 when both a width and a height of the current block are equal to 4; set the block size index value of the current block to be 1 when both the width and the height of the current block are equal to 8 or one of the width and the height of the current block is equal to 4; and set the block size index value of the current block to be 2 when the width and the height of the current block do not satisfy the above conditions.

In some embodiments, the first determining unit 1201 is further configured to: obtain first temporal reference values by downsampling the neighbouring sample values of the current block; determine a second constant value according to a bit depth of the neighbouring sample values of the current block, and obtain second temporal reference values by buffering the second constant value in a data unit subsequent to the first temporal reference values; and set a value corresponding to index j in the MIP input sample values to be a difference between a value corresponding to index (j+1) in the second temporal reference values and a value corresponding to index 0 in the second temporal reference values, where j is an integer greater than or equal to 0.

In some embodiments, the first determining unit 1201 is further configured to: set the second constant value to be an exponential power of 2, where the exponential is an integer and equal to the bit depth of the neighbouring sample values of the current block minus one.

In some embodiments, the first determining unit 1201 is further configured to: determine the second constant value by binary left-shifting of "1", where the number of left shifted bits is equal to the bit depth of the neighbouring sample values of the current block minus one.

In some embodiments, the value of the shifting number parameter is a fixed constant independent of a block size index value and an MIP mode index value.

In some embodiments, the value of the shifting number parameter is set to be 6.

In some embodiments, the value of the shifting offset parameter is a fixed constant independent of a block size index value and an MIP mode index value.

In some embodiments, the value of the shifting offset parameter is set to be 32.

In some embodiments, the first determining unit 1201 is further configured to: set the first constant value to be an exponential power of 2, where the exponential is an integer and equal to the value of the shifting number parameter minus one.

In some embodiments, the first determining unit 1201 is further configured to: determine the first constant value by binary left-shifting of "1", where the number of left shifted bits is equal to the value of the shifting number parameter minus one.

In some embodiments, referring to FIG. 12, the encoder 120 further include a first calculating unit 1205 configured to: calculate a first weighted sum of the MIP weighting matrix and the MIP input sample values; calculate a first sum of the first weighted sum and the first offset; and determine a first right-shift value by binary right-shifting of the first sum, where the number of right shifted bits is equal to the value of the shifting number parameter.

The first determining unit 1201 is further configured to set the MIP prediction value of the chroma component of the current block to be a sum of the first right-shift value and a value corresponding to index 0 in first temporal reference values, where the first temporal reference values are obtained by downsampling the neighbouring sample values of the current block.

In some embodiments, the first transform unit 1203 is configured to determine a residual block of the current block according to the prediction residual value, and determine a first transform coefficient block by performing a first transform on the residual block.

The first determining unit 1201 is further configured to determine whether to perform the LFNST on at least partial transform coefficients in the first transform coefficient block.

The first transform unit 1203 is further configured to determine the LFNST parameter by performing the LFNST on the at least partial transform coefficients in the first transform coefficient block, based on a determination that the LFNST is determined to be performed on the at least partial transform coefficients.

In some embodiments, the first determining unit 1201 is further configured to: determine a minimum value among size parameters of the current block, when the MIP mode is used to determine the intra prediction value of the chroma component of the current block; and determine to perform the LFNST on the at least partial transform coefficients in the first transform coefficient block, when the minimum value is greater than or equal to a first preset threshold.

In some embodiments, the LFNST parameter includes an LFNST index. The first determining unit 1201 is further configured to: set a value of the LFNST index to be greater than zero, when the LFNST is determined to be performed on the at least partial transform coefficients in the first transform coefficient block; and set the value of the LFNST index to be zero, when the LFNST is determined not to be performed on the at least partial transform coefficients in the first transform coefficient block.

The encoding unit 1204 is further configured to: encode the LFNST index and signal the encoded LFNST index into the bitstream.

In some embodiments, the LFNST parameter further includes LFNST coefficients. Referring to FIG. 12, the encoder 120 further includes a quantization unit 1206.

The first transform unit 1203 is configured to obtain the LFNST coefficients by performing the LFNST on the at least partial transform coefficients in the first transform coefficient block.

The quantization unit 1206 is configured to: determine quantized coefficients by quantizing the LFNST coefficients.

The encoding unit 1204 is configured to: encode the quantized coefficients and signal the encoded quantized coefficients into the bitstream.

It can be understood that, in embodiments of the present application, a "unit" may be a part of a circuit, a part of a processor, a part of a program, or software, etc., which can be a module or not. In addition, in the embodiment, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium if implemented in the form of a software functional unit and is sold or used as a separate product. Based on such understanding, the technical solutions in essential or the part of the technical solutions that contributes to the prior art of the embodiment, or all or part of the technical solutions, may be embodied in the form of a software product. The computer software product is stored in a storage medium and includes instructions for causing a computer device (which may be a personal computer, a server, or a network device and the like) or a processor to perform all or part of the steps described in the embodiment. The above storage medium includes various medium capable of storing program codes, such as a universal serial bus (USB) flash disk, a removable hard disk, a read-only memory (ROM), a random access memory (RAM), a magnetic disk, compact disc, or the like.

Therefore, embodiments of the present application provide a computer storage medium, which is applied to the encoder 120. The computer storage medium stores a computer program, and when the computer program is executed by the first processor, implements the method of any of the foregoing embodiments.

Figure 13:
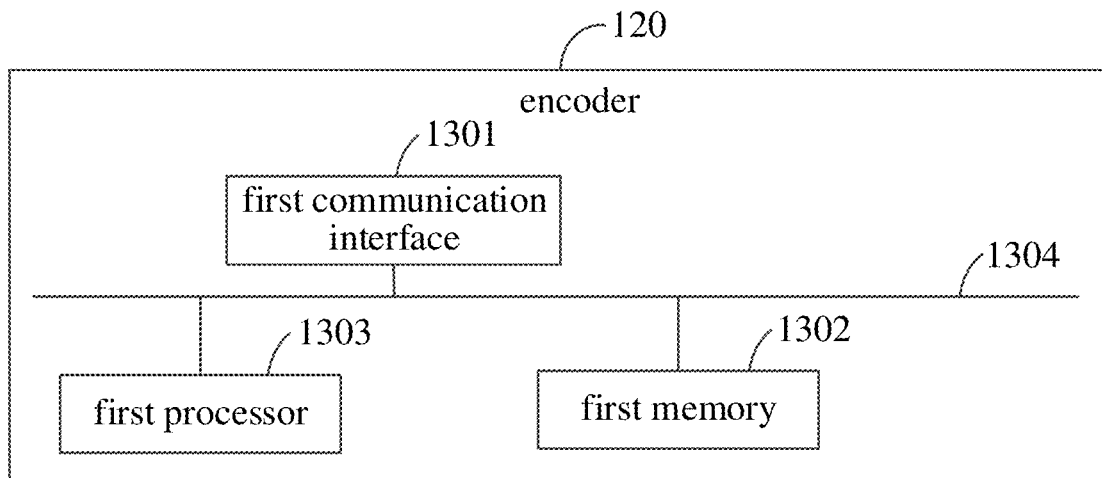
FIG. 13 is a schematic diagram of a specific hardware structure of an encoder provided in embodiments of the present application.

Based on the structure of the encoder 120 and the computer storage medium described above, referring to FIG. 13, it illustrates a schematic diagram of a specific hardware structure of the encoder 120 provided in embodiments of the present application. As illustrated in FIG. 13, the encoder 120 may include: a first communication interface 1301, a first memory 1302, a first processor 1303, and a first communication bus 1304. Various components in the terminal are coupled together through the first communication bus 1304. It can be understood that, the first communication bus 1304 is used to realize connection and communication among these components. In addition to the data bus, the first communication bus 1304 also includes a power bus, a control bus, and a status signal bus. However, for clarity, various buses are labeled as communication bus 1304 in FIG. 13.

The first communication interface 1301 is configured to receive and send signals in the process of receiving and sending information with other external network elements.

The first memory 1302 is configured to store computer programs that can be executed on the first processor 1303.

The first processor 1303 is configured to execute the following when running the computer program.

A prediction parameter of a current block is determined, where the prediction parameter includes a prediction mode parameter. Neighbouring sample values of the current block are obtained and MIP input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. A prediction residual value of the chroma component of the current block is determined according to the intra prediction value of the chroma component of the current block. An LFNST parameter is determined by performing an LFNST on the prediction residual value. The LFNST parameter is encoded and the encoded LTNST parameter is signalled into a bitstream.

It can be understood that, the first memory 1302 in embodiments of the present application may be a volatile memory or a non-volatile memory, or may include both volatile and non-volatile memory. The non-volatile memory may be a ROM, a programmable read-only memory (PROM), an erasable programmable read-only memory (EPROM), an electrically erasable programmable read-only memory (EEPROM) or flash memory. The volatile memory may be a RAM, which is used as an external cache. By way of example, but not limitation, many forms of RAM are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DRRAM). It is noted that the first memory 1302 of the systems and methods described in the present application is intended to include, but is not limited to, these and any other suitable types of memory.

The first processor 1303 may be an integrated circuit chip and has a signal processing capability. In the implementation process, each step of the foregoing method may be completed by using an integrated logic circuit of hardware in the first processor 1303 or an instruction in a form of software. The above first processor 1303 may be a general-purpose processor, a digital signal processor (DSP), an application specific integrated circuit (ASIC), a field programmable gate array (FPGA), or other programming logic devices, discrete gate or transistor logic devices, discrete hardware components. Various methods, steps, and logical block diagrams disclosed in the embodiments of the present application can be implemented or executed. The general-purpose processor may be a microprocessor or the processor may be any conventional processor or the like. The steps of the method disclosed in combination with the embodiments of the present application may be directly implemented by a hardware decoding processor, or may be performed by using a combination of hardware and software modules in the decoding processor. The software module may be located in a mature storage medium such as a random access memory, a flash memory, a read-only memory, a programmable read-only memory, or an electrically erasable programmable memory, a register, and the like. The storage medium is located in the first memory 1302, and the first processor 1303 reads the information in the first memory 1302 and completes the steps of the foregoing method in combination with its hardware.

It can be understood that these embodiments described in the present application may be implemented by hardware, software, firmware, middleware, a microcode or a combination thereof. In case of implementation with the hardware, the processing unit may be implemented in one or more ASICs, DSPs, DSP devices (DSPDs), PLDs, FPGAs, general-purpose processors, controllers, microcontrollers, microprocessors, other electronic units configured to execute the functions in the present application or combinations thereof. In case of implementation with the software, the technology of the present application may be implemented through the modules (for example, processes and functions) executing the functions in the present application. A software code may be stored in the memory and executed by the processor. The memory may be implemented inside the processor or outside the processor.

Optionally, as another embodiment, the first processor 1303 is further configured to execute the method of any of the foregoing embodiments when running the computer program.

The encoder is provided in the embodiment. The encoder can include the first determining unit, the first prediction unit, the first transform unit, and the encoding unit. In this way, for the MIP mode, in addition to ensuring encoding performance, complexity can be reduced, a storage space required in the encoding process can be reduced, and encoding efficiency can be effectively improved. Furthermore, when the LFNST technology is applied to MIP mode prediction, due to introduction of the MIP parameter, the LFNST can be more flexible, and the encoding efficiency can be further improved.

Figure 14:
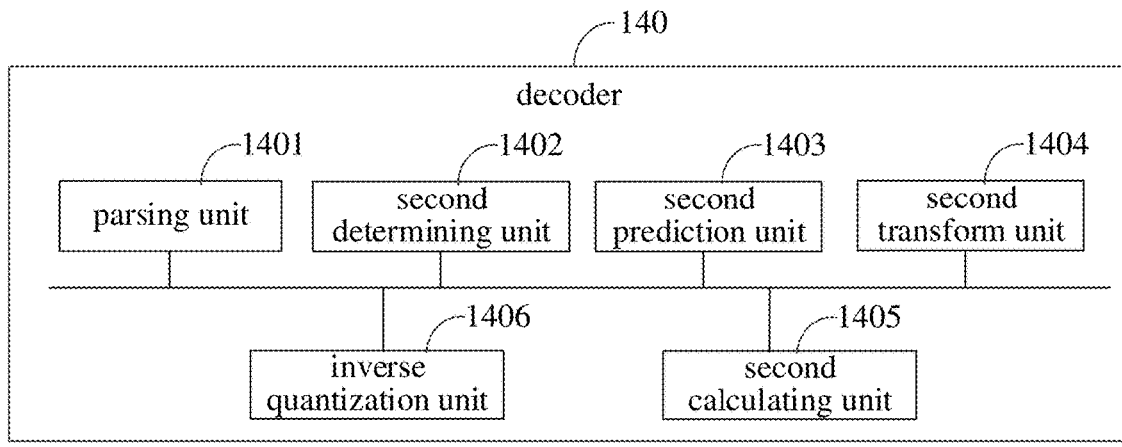
FIG. 14 is a schematic diagram of a structure of another decoder provided in embodiments of the present application.

In another embodiment of the present application, based on the same inventive concept with the above embodiments, referring to FIG. 14, it illustrates a schematic structural diagram of a decoder 140 provided in embodiments of the present application. As illustrated in FIG. 14, the decoder 140 includes a parsing unit 1401, a second determining unit 1402, a second prediction unit 1403, and a second transform unit 1404.

The parsing unit 1401 is configured to parse a bitstream to obtain a prediction parameter and an LFNST parameter of a current block, where the prediction parameter includes a prediction mode parameter. The second determining unit 1402 is configured to obtain neighbouring sample values of the current block and determine MIP input sample values of the current block according to the neighbouring sample values of the current block, when the prediction mode parameter indicates that an MIP mode is used to determine an intra prediction value of a chroma component of the current block. The second prediction unit 1403 is configured to determine an MIP prediction value of the chroma component of the current block according to the MIP input sample values, an MIP weighting matrix, and a shifting parameter, where the MIP prediction value is prediction values of partial samples in the chroma component of the current block; and determine the intra prediction value of the chroma component of the current block by filtering the MIP prediction value. The second transform unit 1404 is configured to determine a reconstructed transform coefficient block of the current block and determine a second transform coefficient block by performing an LFNST on at least partial reconstructed transform coefficients in the reconstructed transform coefficient block, when the LFNST parameter indicates that the LFNST is to be performed on the current block; and obtain a reconstructed residual block of the chroma component of the current block by performing a first transform on the second transform coefficient block. The second determining unit 1402 is further configured to determine a reconstructed block of the chroma component of the current block according to the intra prediction value of the chroma component of the current block and the reconstructed residual block.

In some embodiments, the neighbouring sample values of the current block include left neighbouring sample values and above neighbouring sample values of the current block.

In some embodiments, the shifting parameter includes a shifting offset parameter and a shifting number parameter.

The second determining unit 1402 is specifically configured to: determine a product of the shifting offset parameter and a sum of the MIP input sample values according to a value of the shifting offset parameter, where the value of the shifting offset parameter is a fixed constant; determine a first constant value according to a value of the shifting number parameter, where the value of the shifting number parameter is a fixed constant; set a value of a first offset to be a difference between the first constant value and the product; determine the MIP weighting matrix of the current block according to the prediction parameter; and determine the MIP prediction value of the chroma component of the current block according to the MIP weighting matrix, the MIP input sample values, the shifting number parameter, and the first offset.

In some embodiments, the prediction parameter further includes size parameters of the current block.

In some embodiments, the second determining unit 1402 is further configured to: determine a block size index value of the current block according to the size parameters of the current block; obtain first temporal reference values by downsampling the neighbouring sample values of the current block; when the block size index value of the current block is within a preset range, determine a second constant value according to a bit depth of the neighbouring sample values of the current block, set a value corresponding to index 0 in the MIP input sample values to be a difference between the second constant value and a value corresponding to index 0 in the first temporal reference values, and set a value corresponding to index i in the MIP input sample values to be a difference between a value corresponding to index i in the first temporal reference values and the value corresponding to the index 0 in the first temporal reference values, where i is an integer greater than 0; and set a value corresponding to index j in the MIP input sample values to be a difference between a value corresponding to index (j+1) in the first temporal reference values and the value corresponding to the index 0 in the first temporal reference values, when the block size index value of the current block is beyond the preset range, where j is an integer greater than or equal to 0.

In some embodiments, the second determining unit 1402 is further configured to: determine the second constant value according to the bit depth of the neighbouring sample values of the current block; set the value corresponding to the index 0 in the MIP input sample values to be a difference between the value corresponding to the index 0 in the first temporal reference values and the second constant value; and set the value corresponding to the index i in the MIP input sample values to be the difference between the value corresponding to the index i in the first temporal reference values and the value corresponding to the index 0 in the first temporal reference values, where i is an integer greater than 0.

In some embodiments, the second determining unit 1402 is further configured to: set the block size index value of the current block to be 0 when both a width and a height of the current block are equal to 4; set the block size index value of the current block to be 1 when both the width and the height of the current block are equal to 8 or one of the width and the height of the current block is equal to 4; and set the block size index value of the current block to be 2 when the width and the height of the current block do not satisfy the above conditions.

In some embodiments, the second determining unit 1402 is further configured to: obtain first temporal reference values by downsampling the neighbouring sample values of the current block; determine a second constant value according to a bit depth of the neighbouring sample values of the current block, and obtain second temporal reference values by buffering the second constant value in a data unit subsequent to the first temporal reference values; and set a value corresponding to index j in the MIP input sample values to be a difference between a value corresponding to index (j+1) in the second temporal reference values and a value corresponding to index 0 in the second temporal reference values, where j is an integer greater than or equal to 0.

In some embodiments, the second determining unit 1402 is further configured to: set the second constant value to be an integer exponential power of 2, where the exponential is equal to the bit depth of the neighbouring sample values of the current block minus one.

In some embodiments, the second determining unit 1402 is further configured to: determine the second constant value by binary left-shifting "1", where the number of left shifted bits is equal to the bit depth of the neighbouring sample values of the current block minus one.

In some embodiments, the value of the shifting number parameter is a fixed constant independent of a block size index value and an MIP mode index value.

In some embodiments, the value of the shifting number parameter is set to be 6.

In some embodiments, the value of the shifting offset parameter is a fixed constant independent of a block size index value and an MIP mode index value.

In some embodiments, the value of the shifting offset parameter is set to be 32.

In some embodiments, the second determining unit 1402 is further configured to: set the first constant value to be an integer exponential power of 2, where the exponential is equal to the value of the shifting number parameter minus one.

In some embodiments, the second determining unit 1402 is further configured to: obtain the first constant value by binary left shifting "1", where the number of left shifted bits is equal to the value of the shifting number parameter minus one.

In some embodiments, referring to FIG. 14, the decoder 140 further includes a second calculating unit 1405 configured to: calculate a first weighted sum of the MIP weighting matrix and the MIP input sample values; calculate a first sum of the first weighted sum and the first offset; and determine a first right-shift value by binary right-shifting of the first sum, where the number of right shifted bits is equal to the value of the shifting number parameter.

The second determining unit 1402 is configured to set the MIP prediction value of the chroma component of the current block to be a sum of the first right-shift value and a value corresponding to index 0 in first temporal reference values, where the first temporal reference values are obtained by downsampling the neighbouring sample values of the current block.

In some embodiments, the second determining unit 1402 is further configured to: determine existence of an LFNST parameter in the bitstream.

The parsing unit 1401 is further configured to parse the bitstream to obtain the LFNST parameter on condition that the LFNST parameter exists in the bitstream.

In some embodiments, the second determining unit 1402 is further configured to: determine a minimum value among size parameters of the current block, when the MIP mode is used to determine the intra prediction value of the chroma component of the current block; and determine that the LFNST parameter exists in the bitstream, when the minimum value is greater than or equal to a first preset threshold.

In some embodiments, referring to FIG. 14, the decoder 140 further includes an inverse quantization unit 1406.

The parsing unit 1401 is further configured to parse the bitstream to obtain quantized coefficients of the current block when the LFNST parameter indicates that the LFNST is performed on the current block.

The inverse quantization unit 1406 is configured to obtain the reconstructed transform coefficient block of the current block by performing inverse quantization on the quantized coefficients.

In some embodiments, the inverse quantization unit 1406 is specifically configured to obtain the reconstructed transform coefficient block of the current block by scaling the quantized coefficients.

In some embodiments, the parsing unit 1401 is specifically configured to parse the bitstream to obtain a value of an LFNST index; determine to perform the LFNST on the current block when the value of the LFNST index is greater than 0; and determine not to perform the LFNST on the current block when the value of the LFNST index is equal to 0.

It can be understood that, in the embodiment, a "unit" may be a part of a circuit, a part of a processor, a part of a program, or software, etc., which can be a module or not. In addition, in the embodiment, the various components may be integrated into one processing unit, or each unit may be physically present, or two or more units may be integrated into one unit. The above-mentioned integrated unit can be implemented in the form of hardware or a software function unit.

The integrated unit may be stored in a computer readable storage medium if implemented in the form of a software functional unit and is sold or used as a separate product. Based on such understanding, embodiments of the present application provide a computer storage medium, which is applied to the decoder 140. The computer storage medium stores a computer program, and when the computer program is executed by the second processor, implements the method of any of the foregoing embodiments.

Figure 15:
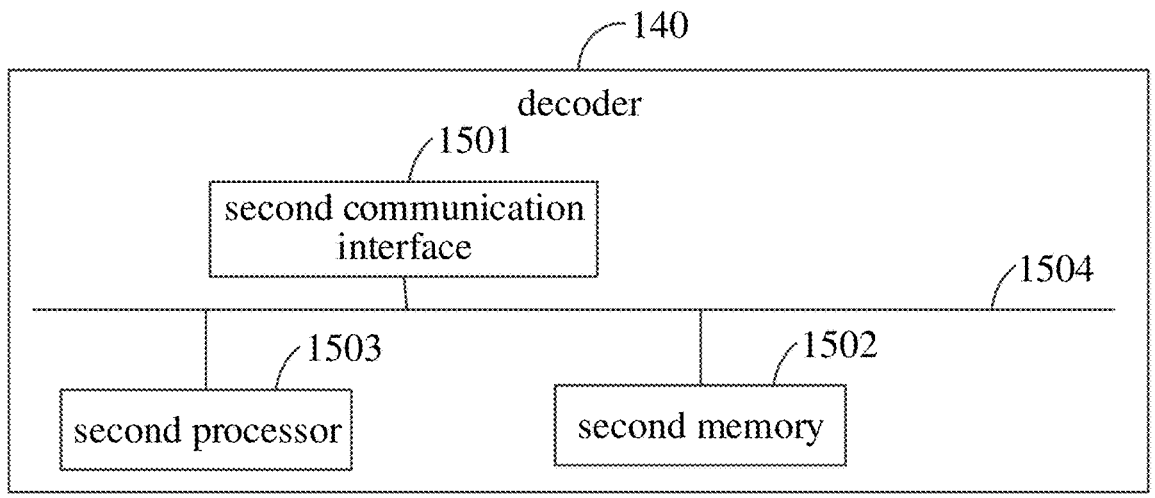
FIG. 15 is a schematic diagram of a specific hardware structure of a decoder provided in embodiments of the present application.

Based on the structure of the decoder 140 and the computer storage medium described above, referring to FIG. 15, it illustrates a schematic diagram of a specific hardware structure of the decoder 140 provided in embodiments of the present application. As illustrated in FIG. 15, the decoder 140 may include: a second communication interface 1501, a second memory 1502, a second processor 1503, and a second communication bus 1504. Various components in the terminal are coupled together through the second communication bus 1504. It can be understood that, the second communication bus 1504 is used to realize connection and communication among these components. In addition to the data bus, the second communication bus 1504 also includes a power bus, a control bus, and a status signal bus. However, for clarity, various buses are labeled as communication bus 1504 in FIG. 15.

The second communication interface 1501 is configured to receive and send signals in the process of receiving and sending information with other external network elements.

The second memory 1502 is configured to store computer programs that can be executed on the second processor 1503.

The second processor 1503 is configured to execute the following when running the computer program.

A bitstream is parsed to obtain a prediction parameter and an LFNST parameter of a current block, where the prediction parameter includes a prediction mode parameter. Neighbouring sample values of the current block are obtained and MIP input sample values of the current block are determined according to the neighbouring sample values of the current block, when the prediction mode parameter indicates that an MIP mode is used to determine an intra prediction value of a chroma component of the current block. An MIP prediction value of the chroma component of the current block is determined according to the MIP input sample values, an MIP weighting matrix, and a shifting parameter, where the MIP prediction value is prediction values of partial samples in the chroma component of the current block. The intra prediction value of the chroma component of the current block is determined by filtering the MIP prediction value. A reconstructed transform coefficient block of the current block is determined and a second transform coefficient block is determined by performing an LFNST on at least partial reconstructed transform coefficients in the reconstructed transform coefficient block, when the LFNST parameter indicates that the LFNST is to be performed on the current block. A reconstructed residual block of the chroma component of the current block is obtained by performing a first transform on the second transform coefficient block. A reconstructed block of the chroma component of the current block is determined according to the intra prediction value of the chroma component of the current block and the reconstructed residual block.

Optionally, as another embodiment, the second processor 1503 is further configured to execute the method of any of the foregoing embodiments when running the computer program.

It can be understood that the hardware functions of the second memory 1502 and the first memory 1302 are similar, and the hardware functions of the second processor 1503 and the first processor 1303 are similar, which are not described herein.

The decoder is provided in the embodiment. The decoder can include the parsing unit, the second determining unit, the second prediction unit, and the second transform unit. In this way, for the MIP mode, in addition to ensuring decoding performance, complexity can be reduced, a storage space required in the decoding process can be reduced, and decoding efficiency can be effectively improved. Furthermore, when the LFNST technology is applied to MIP mode prediction, due to introduction of the MIP parameter, the LFNST can be more flexible, and the decoding efficiency can be further improved.

Figure 16:
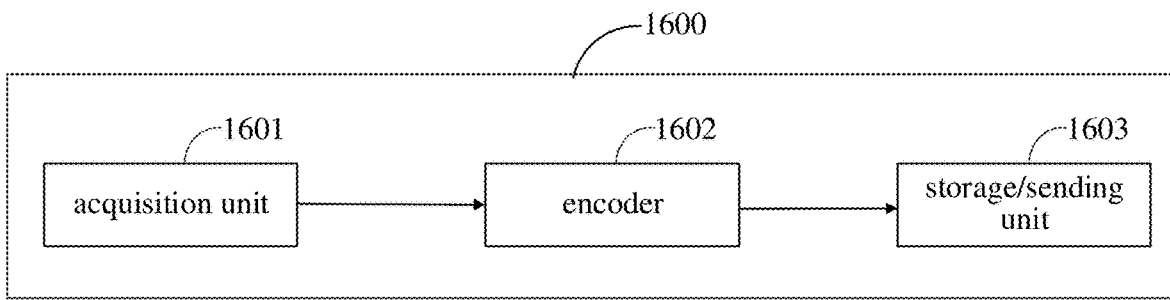
FIG. 16 is a schematic diagram of a structure of a sending device provided in embodiments of the present application.

In still another embodiment of the present application, referring to FIG. 16, it illustrates a schematic diagram of a structure of a sending device provided in embodiments of the present application. As illustrated in FIG. 16, an exemplary sending device 1600 is illustrated. The acquisition unit 1601 acquires the video signal and sends the video signal to the encoder 1602. The acquisition unit 1601 may be a device including one or more cameras (including a depth camera). The acquisition unit 1601 may be a device that partially or completely decodes the bitstream to obtain the video. The acquisition unit 1601 may also include one or more elements to capture audio signals. A specific implementation of the encoder 1602 is the encoder 100 or the encoder 120 described in the foregoing embodiments, which encodes the video signal from the acquisition unit 1601 as its input video and generates a video bitstream. The encoder 1602 may also include one or more audio encoders to encode the audio signals to generate an audio bitstream. The storage/sending unit 1603 receives the video bitstream from the encoder 1602. The storage/sending unit 1603 may also receive the audio bitstream from the encoder 1602 and encapsulate the video bitstream and the audio bitstream together to form a media file (e.g., an ISO-based media file format) or a transport stream.

Optionally, the storage/sending unit 1603 writes the media file or the transport stream to a storage unit, such as a hard disk, DVD disk, cloud, portable storage device.

Optionally, the storage/sending unit 1603 sends the bitstream to a transport network, such as the Internet, a wired network, a cellular network, a wireless local area network, and the like.

Figure 17:
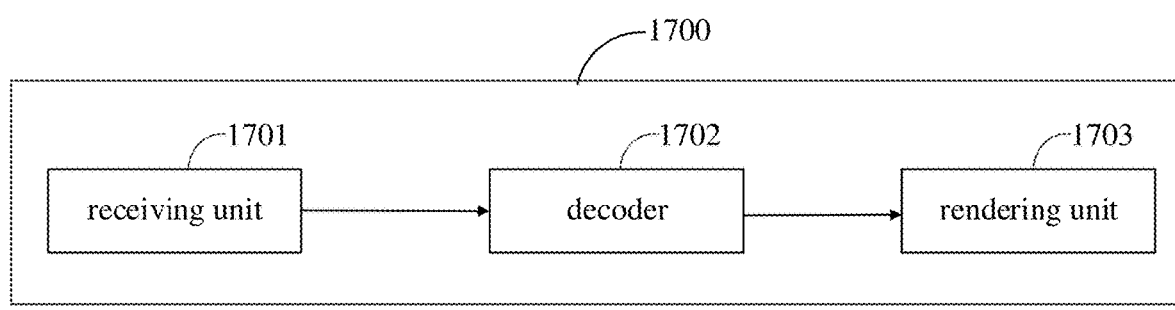
FIG. 17 is a schematic diagram of a structure of a destination device provided in embodiments of the present application.

In still another embodiment of the present application, referring to FIG. 17, it illustrates a schematic diagram of a structure of a destination device provided in embodiments of the present application. As illustrated in FIG. 17, an exemplary destination device 1700 is illustrated. The receiving unit 1701 receives the media file or the transport stream from the network, or reads the media file or the transport stream from the storage device. The receiving unit 1701 separates the video bitstream and the audio bitstream from the media file or the transport stream. The receiving unit 1701 can also generate a new video bitstream by extracting the video bitstream. The receiving unit 1701 can also generate a new audio bitstream by extracting the audio bitstream. The decoder 1702 includes one or more video decoders, for example, its specific implementation is the decoder 200 or the decoder 140 described in the foregoing embodiments.

The decoder 1702 may also include one or more audio decoders. The decoder 1702 decodes the video bitstream and the audio bitstream from the receiving unit 1701 to obtain decoded video and one or more decoded audios corresponding to one or more channels. The rendering unit 1703 performs operations on the reconstructed video to make it suitable for display. Such operations may include one or more of the following operations to improve perceptual quality: denoising, synthesis, conversion of color spaces, upsampling, downsampling, and the like. The rendering unit 1703 may also perform operations on the decoded audio to improve the perceptual quality of the displayed audio signal.

Figure 18:
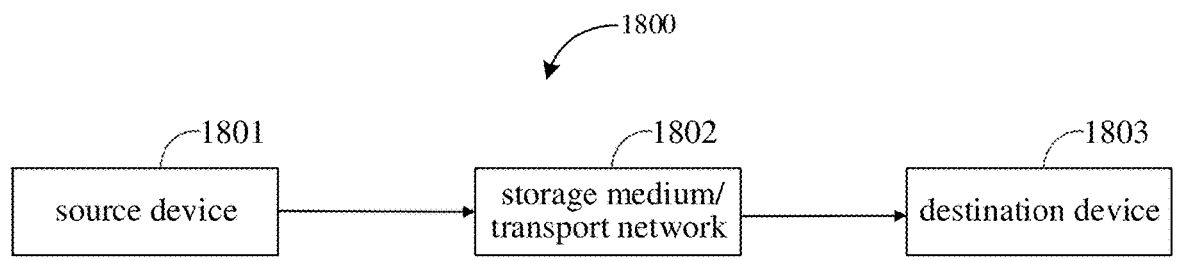
FIG. 18 is a schematic diagram of a structure of a communication system provided in embodiments of the present application.

In still another embodiment of the present application, referring to FIG. 18, it illustrates a schematic diagram of a structure of a communication system provided in embodiments of the present application. As illustrated in FIG. 18, an exemplary communication system 1800 is illustrated. The source device 1801 may be the sending device 1600 illustrated in FIG. 16. The output of the storage/sending unit 1603 is processed by the storage medium/transport network 1802 to store or transport the bitstream. The destination device 1803 may be the destination device 1700 illustrated in FIG. 17. Herein, the receiving unit 1701 may acquire the bitstream from the storage medium/transport network 1802. The receiving unit 1701 can extract a new video bitstream from the media file or transport stream. The receiving unit 1701 can also extract a new audio bitstream from the media file or transport stream.

It is noted that in the present application, the terms "including", "containing" or any other variations thereof are intended to cover non-exclusive inclusion. As a result, a process, method, article, or device that includes a series of elements includes not only those elements, but also other elements that are not explicitly listed, or further includes elements inherent to the process, method, article, or device. If there are no more restrictions, the element defined by the sentence "including one . . . " does not exclude the existence of other same elements in the process, method, article, or device that includes the element.

The serial numbers of the foregoing implementations of the present application are only for description, and do not represent the superiority of the implementations of the present application.

The methods disclosed in the several method implementations of the present application can be combined without conflict to obtain new method implementations.

The features disclosed in the several product implementations of the present application can be combined without conflict to obtain new product implementations.

The features disclosed in the several method implementations or device implementations of the present application can be combined without conflict to obtain new method implementations or device implementations.

The above are some implementations of the present application, but the protection scope of the present application is not limited thereto. Any changes or substitutions that can be easily conceived by those skilled in the art within the technical scope disclosed by the present application should be covered by the protection scope of the present application. Therefore, the protection scope of the present application should be subject to the protection scope of the claims.

INDUSTRIAL APPLICABILITY

In embodiments of the present application, at the encoder side, after the prediction parameter of the current block is determined, when the prediction mode parameter indicates that the MIP mode is used to determine the intra prediction value of the chroma component of the current block, the neighbouring sample values of the current block are obtained and the MIP input sample values of the current block are determined according to the neighbouring sample values of the current block; the MIP prediction value of the chroma component of the current block is determined according to the MIP input sample values, the MIP weighting matrix, and the shifting parameter; the intra prediction value of the chroma component of the current block is determined by filtering the MIP prediction value; the prediction residual value of the chroma component of the current block is determined according to the intra prediction value of the chroma component of the current block; the LFNST parameter is determined by performing the LFNST on the prediction residual value; and the LFNST parameter is encoded and the encoded LTNST parameter is signalled into the bitstream. At the decoder side, after the bitstream is parsed to obtain the prediction parameter and the LFNST parameter of the current block, when the prediction mode parameter indicates that the MIP mode is used to determine the intra prediction value of the chroma component of the current block, the neighbouring sample values of the current block are obtained and the MIP input sample values of the current block are determined according to the neighbouring sample values of the current block; the MIP prediction value of the chroma component of the current block is determined according to the MIP input sample values, the MIP weighting matrix, and the shifting parameter; the intra prediction value of the chroma component of the current block is determined by filtering the MIP prediction value; when the LFNST parameter indicates that the LFNST is to be performed on the current block, the reconstructed transform coefficient block of the current block is determined and the second transform coefficient block is obtained by performing the LFNST on the at least partial reconstructed transform coefficients in the reconstructed transform coefficient block; the reconstructed residual block of the chroma component of the current block is obtained by performing the first transform on the second transform coefficient block; and the reconstructed block of the chroma component of the current block is determined according to the intra prediction value of the chroma component of the current block and the reconstructed residual block. In this way, for the MIP mode, in addition to ensuring encoding and decoding performance, complexity can be reduced, a storage space required in the encoding and decoding process can be reduced, and encoding and decoding efficiency can be effectively improved. Furthermore, when the LFNST technology is applied to MIP mode prediction, due to introduction of the MIP parameter, the LFNST can be more flexible, and the encoding and decoding efficiency can be further improved.

What is claimed is:

1. An encoding method, for an encoder and comprising:
    determining a prediction parameter of a current block, the prediction parameter comprising a prediction mode parameter;
    obtaining neighbouring sample values of the current block and determining matrix-based intra prediction (MIP) input sample values of the current block according to the neighbouring sample values of the current block, when the prediction mode parameter indicates that an MIP mode is used to determine an intra prediction value of a chroma component of the current block;
    determining an MIP prediction value of the chroma component of the current block according to the MIP input sample values, an MIP weighting matrix, and a shifting parameter, the MIP prediction value being prediction values of partial samples in the chroma component of the current block;
    determining the intra prediction value of the chroma component of the current block by filtering the MIP prediction value;
    determining a prediction residual value of the chroma component of the current block according to the intra prediction value of the chroma component of the current block;
    determining a low-frequency non-separable transform (LFNST) parameter by performing an LFNST on the prediction residual value; and
    encoding the LFNST parameter and signalling the encoded LFNST parameter into a bitstream,
    wherein the shifting parameter comprises a shifting offset parameter and a shifting number parameter and determining the MIP prediction value of the chroma component of the current block according to the MIP input sample values, the MIP weighting matrix, and the shifting parameter comprises:

determining a product of the shifting offset parameter and a sum of the MIP input sample values according to a value of the shifting offset parameter, wherein the value of the shifting offset parameter is a fixed constant;

determining a first constant value according to a value of the shifting number parameter, wherein the value of the shifting number parameter is a fixed constant;

setting a value of a first offset to be a difference between the first constant value and the product;

determining the MIP weighting matrix of the current block according to the prediction parameter; and determining the MIP prediction value of the chroma component of the current block according to the MIP weighting matrix, the MIP input sample values, the shifting number parameter, and the first offset, wherein determining the MIP prediction value of the chroma component of the current block according to the MIP weighting matrix, the MIP input sample values, the shifting number parameter, and the first offset comprises:

calculating a first weighted sum of the MIP weighting matrix and the MIP input sample values;

calculating a first sum of the first weighted sum and the first offset;

determining a first right-shift value by binary right-shifting of the first sum, wherein the number of right shifted bits is equal to the value of the shifting number parameter; and setting the MIP prediction value of the chroma component of the current block to be a sum of the first right-shift value and a value corresponding to index 0 in first temporal reference values, wherein the first temporal reference values are obtained by downsampling the neighbouring sample values of the current block.

2. The method of claim 1, wherein the prediction parameter further comprises size parameters of the current block, and determining the MIP input sample values of the current block according to the neighbouring sample values of the current block comprises:

determining a block size index value of the current block according to the size parameters of the current block;

obtaining first temporal reference values by downsampling the neighbouring sample values of the current block;

when the block size index value of the current block is within a preset range, determining a second constant value according to a bit depth of the neighbouring sample values of the current block; Setting a value corresponding to index 0 in the MIP input sample values to be a difference between the second constant value and a value corresponding to index 0 in the first temporal reference values; and setting a value corresponding to index i in the MIP input sample values to be a difference between a value corresponding to index i in the first temporal reference values and the value corresponding to the index 0 in the first temporal reference values, wherein i is an integer greater than 0; and setting a value corresponding to index j in the MIP input sample values to be a difference between a value corresponding to index (j+1) in the first temporal reference values and the value corresponding to the index 0 in the first temporal reference values, when the block size index value of the current block is beyond the preset range, wherein j is an integer greater than or equal to 0.

3. The method of claim 2, wherein determining the second constant value according to the bit depth of the neighbouring sample values of the current block comprises:

setting the second constant value to be an exponential power of 2, wherein the exponential is an integer and equal to the bit depth of the neighbouring sample values of the current block minus one; or determining the second constant value by binary left-shifting of "1", wherein the number of left shifted bits is equal to the bit depth of the neighbouring sample values of the current block minus one.

4. The method of claim 1, wherein the value of the shifting number parameter is a fixed constant independent of a block size index value and an MIP mode index value;

the value of the shifting number parameter is set to be 6;

the value of the shifting offset parameter is a fixed constant independent of a block size index value and an MIP mode index value; and the value of the shifting offset parameter is set to be 32.

5. The method of claim 1, wherein determining the first constant value according to the value of the shifting number parameter comprises:

setting the first constant value to be an exponential power of 2, wherein the exponential is an integer and equal to the value of the shifting number parameter minus one; or determining the first constant value by binary left-shifting of "1", wherein the number of left shifted bits is equal to the value of the shifting number parameter minus one.

6. The method of claim 1, wherein determining the LFNST parameter by performing the LFNST on the prediction residual value comprises:

determining first transform coefficients by performing a first transform on prediction residual values of the current block;

determining whether to perform the LFNST on at least partial transform coefficients of the first transform coefficients; and determining the LFNST parameter by performing the LFNST on the at least partial transform coefficients of the first transform coefficients, based on a determination that the LFNST is determined to be performed on the at least partial transform coefficients; and determining whether to perform the LFNST on the at least partial transform coefficients of the first transform coefficients comprises:

determining a minimum value among size parameters of the current block, when the MIP mode is used to determine the intra prediction value of the chroma component of the current block; and determining to perform the LFNST on the at least partial transform coefficients of the first transform coefficients, when the minimum value is greater than or equal to a first preset threshold.

7. The method of claim 6, wherein the LFNST parameter comprises an LFNST index and determining the LFNST parameter comprises:

setting a value of the LFNST index to be greater than zero, when the LFNST is determined to be performed on the at least partial transform coefficients of the first transform coefficients; and setting the value of the LFNST index to be zero, when the LFNST is determined not to be performed on the at least partial transform coefficients of the first transform coefficients; and encoding the LFNST parameter and signalling the encoded LFNST parameter into the bitstream comprises:
  encoding the LFNST index and signalling the encoded LFNST index into the bitstream; or
the LFNST parameter further comprises LFNST coefficients and determining the LFNST parameter comprises:
  determining the LFNST coefficients by performing the LFNST on the at least partial transform coefficients of the first transform coefficients; and
encoding the LFNST parameter and signalling the encoded LFNST parameter into the bitstream comprises:
  determining quantized coefficients by quantizing the LFNST coefficients; and
  encoding the quantized coefficients and signalling the encoded quantized coefficients into the bitstream.

8. A decoding method, for a decoder and comprising:
parsing a bitstream to obtain a prediction parameter and a low-frequency non-separable transform (LFNST) parameter of a current block, the prediction parameter comprising a prediction mode parameter;
obtaining neighbouring sample values of the current block and determining matrix-based intra prediction (MIP) input sample values of the current block according to the neighbouring sample values of the current block, when the prediction mode parameter indicates that an MIP mode is used to determine an intra prediction value of a chroma component of the current block;
determining an MIP prediction value of the chroma component of the current block according to the MIP input sample values, an MIP weighting matrix, and a shifting parameter, the MIP prediction value being prediction values of partial samples in the chroma component of the current block;
determining the intra prediction value of the chroma component of the current block by filtering the MIP prediction value;
determining reconstructed transform coefficients of the current block and determining second transform coefficients by performing an LFNST on at least partial reconstructed transform coefficients of the reconstructed transform coefficients, when the LFNST parameter indicates that the LFNST is to be performed on the current block;
determining a reconstructed residual value of the chroma component of the current block by performing a first transform on the second transform coefficients; and
determining a reconstructed value of the chroma component of the current block according to the intra prediction value of the chroma component of the current block and the reconstructed residual value,
wherein the shifting parameter comprises a shifting offset parameter and a shifting number parameter and determining the MIP prediction value of the chroma component of the current block according to the MIP input sample values, the MIP weighting matrix, and the shifting parameter comprises:
determining a product of the shifting offset parameter and a sum of the MIP input sample values according to a value of the shifting offset parameter, wherein the value of the shifting offset parameter is a fixed constant;
determining a first constant value according to a value of the shifting number parameter, wherein the value of the shifting number parameter is a fixed constant;
setting a value of a first offset to be a difference between the first constant value and the product;
determining the MIP weighting matrix of the current block according to the prediction parameter; and
determining the MIP prediction value of the chroma component of the current block according to the MIP weighting matrix, the MIP input sample values, the shifting number parameter, and the first offset, wherein determining the MIP prediction value of the chroma component of the current block according to the MIP weighting matrix, the MIP input sample values, the shifting number parameter, and the first offset comprises:
  calculating a first weighted sum of the MIP weighting matrix and the MIP input sample values;
  calculating a first sum of the first weighted sum and the first offset;
  determining a first right-shift value by binary right-shifting of the first sum, wherein the number of right shifted bits is equal to the value of the shifting number parameter; and
  setting the MIP prediction value of the chroma component of the current block to be a sum of the first right-shift value and a value corresponding to index 0 in first temporal reference values, wherein the first temporal reference values are obtained by downsampling the neighbouring sample values of the current block.

9. The method of claim 8, wherein the prediction parameter further comprises size parameters of the current block, and determining the MIP input sample values of the current block according to the neighbouring sample values of the current block comprises:
determining a block size index value of the current block according to the size parameters of the current block;
obtaining first temporal reference values by downsampling the neighbouring sample values of the current block;
when the block size index value of the current block is within a preset range, determining a second constant value according to a bit depth of the neighbouring sample values of the current block; setting a value corresponding to index 0 in the MIP input sample values to be a difference between the second constant value and a value corresponding to index 0 in the first temporal reference values; and setting a value corresponding to index i in the MIP input sample values to be a difference between a value corresponding to index i in the first temporal reference values and the value corresponding to the index 0 in the first temporal reference values, wherein i is an integer greater than 0; and
setting a value corresponding to index j in the MIP input sample values to be a difference between a value corresponding to index (j+1) in the first temporal reference values and the value corresponding to the index 0 in the first temporal reference values, when the block size index value of the current block is beyond the preset range, wherein j is an integer greater than or equal to 0.

10. The method of claim 9, wherein determining the second constant value according to the bit depth of the neighbouring sample values of the current block comprises:

setting the second constant value to be an exponential power of 2, wherein the exponential is an integer and equal to the bit depth of the neighbouring sample values of the current block minus one; or determining the second constant value by binary left-shifting of "1", wherein the number of left shifted bits is equal to the bit depth of the neighbouring sample values of the current block minus one.

11. The method of claim 8, wherein the value of the shifting number parameter is a fixed constant independent of a block size index value and an MIP mode index value;

the value of the shifting number parameter is set to be 6;

the value of the shifting offset parameter is a fixed constant independent of a block size index value and an MIP mode index value; and the value of the shifting offset parameter is set to be 32.

12. The method of claim 8, wherein determining the first constant value according to the value of the shifting number parameter comprises:

setting the first constant value to be an exponential power of 2, wherein the exponential is an integer and equal to the value of the shifting number parameter minus one; or determining the first constant value by binary left-shifting of "1", wherein the number of left shifted bits is equal to the value of the shifting number parameter minus one.

13. The method of claim 8, wherein parsing the bitstream to obtain the LFNST parameter comprises:

determining existence of an LFNST parameter in the bitstream; and parsing the bitstream to obtain the LFNST parameter on condition that the LFNST parameter exists in the bitstream; or parsing the bitstream to obtain the LFNST parameter comprises:

parsing the bitstream to obtain a value of an LFNST index;

determining to perform the LFNST on the current block when the value of the LFNST index is greater than 0; and determining not to perform the LFNST on the current block when the value of the LFNST index is equal to 0; and determining existence of an LFNST parameter in the bitstream comprises:

determining a minimum value among size parameters of the current block, when the MIP mode is used to determine the intra prediction value of the chroma component of the current block; and determining that the LFNST parameter exists in the bitstream, when the minimum value is greater than or equal to a first preset threshold.

14. The method of claim 8, wherein when the LFNST parameter indicates that the LFNST is to be performed on the current block, determining the reconstructed transform coefficients of the current block comprises:

parsing the bitstream to obtain quantized coefficients of the current block; and obtaining the reconstructed transform coefficients of the current block by performing inverse quantization on the quantized coefficients, wherein obtaining the reconstructed transform coefficients of the current block by performing inverse quantization on the quantized coefficients comprises:

obtaining the reconstructed transform coefficients of the current block by scaling the quantized coefficients.

15. A decoder, comprising:

at least one processor; and a memory coupled to the at least one processor and storing at least one computer executable instruction thereon which, when executed by the at least one processor, causes the at least one processor to:

determine a prediction parameter of a current block, the prediction parameter comprising a prediction mode parameter;

obtain neighbouring sample values of the current block and determine matrix-based intra prediction (MIP) input sample values of the current block according to the neighbouring sample values of the current block, when the prediction mode parameter indicates that an MIP mode is used to determine an intra prediction value of a chroma component of the current block;

determine an MIP prediction value of the chroma component of the current block according to the MIP input sample values, an MIP weighting matrix, and a shifting parameter, the MIP prediction value being prediction values of partial samples in the chroma component of the current block;

determine the intra prediction value of the chroma component of the current block by filtering the MIP prediction value;

determine a prediction residual value of the chroma component of the current block according to the intra prediction value of the chroma component of the current block;

determine a low-frequency non-separable transform (LFNST) parameter by performing an LFNST on the prediction residual value; and encode the LFNST parameter and signal the encoded LFNST parameter into a bitstream, wherein the shifting parameter comprises a shifting offset parameter and a shifting number parameter and the at least one processor configured to determine the MIP prediction value of the chroma component of the current block according to the MIP input sample values, the MIP weighting matrix, and the shifting parameter is configured to:

determine a product of the shifting offset parameter and a sum of the MIP input sample values according to a value of the shifting offset parameter, wherein the value of the shifting offset parameter is a fixed constant;

determine a first constant value according to a value of the shifting number parameter, wherein the value of the shifting number parameter is a fixed constant;

set a value of a first offset to be a difference between the first constant value and the product;

determine the MIP weighting matrix of the current block according to the prediction parameter; and determine the MIP prediction value of the chroma component of the current block according to the MIP weighting matrix, the MIP input sample values, the shifting number parameter, and the first offset, wherein the at least one processor configured to determine the MIP prediction value of the chroma component of the current block according to the MIP weighting matrix, the MIP input sample values, the shifting number parameter, and the first offset is configured to:

calculate a first weighted sum of the MIP weighting matrix and the MIP input sample values;

calculate a first sum of the first weighted sum and the first offset;

determine a first right-shift value by binary right-shifting of the first sum, wherein the number of right shifted bits is equal to the value of the shifting number parameter; and set the MIP prediction value of the chroma component of the current block to be a sum of the first right-shift value and a value corresponding to index 0 in first temporal reference values, wherein the first temporal reference values are obtained by downsampling the neighbouring sample values of the current block.

16. The decoder of claim 15, wherein the prediction parameter further comprises size parameters of the current block, and the at least one processor configured to determine the MIP input sample values of the current block according to the neighbouring sample values of the current block is configured to:

determine a block size index value of the current block according to the size parameters of the current block;

obtain first temporal reference values by downsampling the neighbouring sample values of the current block;

when the block size index value of the current block is within a preset range, determine a second constant value according to a bit depth of the neighbouring sample values of the current block; set a value corresponding to index 0 in the MIP input sample values to be a difference between the second constant value and a value corresponding to index 0 in the first temporal reference values; and set a value corresponding to index i in the MIP input sample values to be a difference between a value corresponding to index i in the first temporal reference values and the value corresponding to the index 0 in the first temporal reference values, wherein i is an integer greater than 0; and set a value corresponding to index j in the MIP input sample values to be a difference between a value corresponding to index (j+1) in the first temporal reference values and the value corresponding to the index 0 in the first temporal reference values, when the block size index value of the current block is beyond the preset range, wherein j is an integer greater than or equal to 0.

17. The decoder of claim 16, wherein the at least one processor configured to determine the second constant value according to the bit depth of the neighbouring sample values of the current block is configured to:

set the second constant value to be an exponential power of 2, wherein the exponential is an integer and equal to the bit depth of the neighbouring sample values of the current block minus one; or determine the second constant value by binary left-shifting of "1", wherein the number of left shifted bits is equal to the bit depth of the neighbouring sample values of the current block minus one.

* * * * *

UNITED STATES PATENT AND TRADEMARK OFFICE
CERTIFICATE OF CORRECTION

PATENT NO. : 11,843,781 B2
APPLICATION NO. : 17/858161
DATED : December 12, 2023
INVENTOR(S) : Junyan Huo, Shuai Wan and Yanzhuo Ma It is certified that error appears in the above-identified patent and that said Letters Patent is hereby corrected as shown below:

In the Claims

At beginning of Claim 15 at Column 84, Line 4: replace "A decoder" with "An encoder".

At beginning of Claim 16 at Column 85, Line 15: replace "The decoder" with "The encoder".

At beginning of Claim 17 at Column 86, Line 17: replace "The decoder" with "The encoder".

Signed and Sealed this
Twenty-third Day of April, 2024

Katherine Kelly Vidal
*Director of the United States Patent and Trademark Office*